US012447594B2

(12) United States Patent
Okamura

(10) Patent No.: US 12,447,594 B2
(45) Date of Patent: Oct. 21, 2025

(54) REBAR TYING TOOL, REEL, AND ATTACHING METHOD

(71) Applicant: MAKITA CORPORATION, Anjo (JP)

(72) Inventor: Shun Okamura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 198 days.

(21) Appl. No.: 17/987,289

(22) Filed: Nov. 15, 2022

(65) Prior Publication Data

US 2023/0158649 A1 May 25, 2023

(30) Foreign Application Priority Data

Nov. 19, 2021 (JP) ................................. 2021-188812
Feb. 14, 2022 (JP) ................................. 2022-020733

(51) Int. Cl.

*B25B 25/00* (2006.01)
*B65B 13/28* (2006.01)
*B65H 75/18* (2006.01)
*E04G 21/12* (2006.01)

(52) U.S. Cl.

CPC ............ *B25B 25/00* (2013.01); *B65B 13/285* (2013.01); *B65H 75/182* (2013.01); *B65H 2701/36* (2013.01)

(58) Field of Classification Search

CPC .............. B25B 25/00; A01K 89/01127; A01K 89/01925; B65H 75/182; B65H 75/02; B65H 75/18; B65H 75/32; B65H 75/24; B65B 13/28; B65B 13/285; B65B 27/10; B65B 13/185; E04G 21/123; E04G 21/12

See application file for complete search history.

(56) References Cited

U.S. PATENT DOCUMENTS 5,988,547 A * 11/1999 Koelewyn .............. A01K 89/02 242/246
2005/0061389 A1* 3/2005 Nakagawa ............ E04G 21/122 140/119
2007/0227613 A1* 10/2007 Matsuoka ............ B65B 13/185 140/93.6
2008/0134908 A1* 6/2008 Nagaoka .............. B65B 13/185 100/2

(Continued)

FOREIGN PATENT DOCUMENTS

JP 2004-59017 A 2/2004
JP 2017-24908 A 2/2017

*Primary Examiner* — Jimmy T Nguyen
(74) *Attorney, Agent, or Firm* — Oliff PLC

(57) ABSTRACT

A rebar tying tool may include: a reel comprising a bobbin and a wire wound around the bobbin; a reel attaching part to which the reel is rotatably attached; a feeding unit configured to feed the wire from the bobbin around rebars; a twisting unit configured to twist the wire around the rebars; a type detector configured to detect a type of the reel; and a support supporting the reel attaching part, the feeding unit, the twisting unit, and the type detector. The type detector may include a movable member configured to move with respect to the support. The movable member may be at an initial position when the reel is not attached to the reel attaching part. The movable member may be at an attaching position according to the type of the reel when the reel is attached to the reel attaching part.

14 Claims, 47 Drawing Sheets

(56) References Cited

U.S. PATENT DOCUMENTS

| | | | | |
|---|---|---|---|---|
| 2009/0126824 | A1 | 5/2009 | Nakagawa et al. | |
| 2018/0170708 | A1 | 6/2018 | Kasahara | |
| 2020/0156224 | A1* | 5/2020 | Suenaga | B25B 25/00 |
| 2020/0255255 | A1 | 8/2020 | Kasahara | |
| 2020/0317465 | A1 | 10/2020 | Kasahara | |

* cited by examiner

REBAR TYING TOOL, REEL, AND ATTACHING METHOD

CROSS-REFERENCE TO RELATED APPLICATIONS

This application claims priority to Japanese Patent Application No. 2021-188812, filed on Nov. 19, 2021 and Japanese Patent Application No. 2022-020733, filed on Feb. 14, 2022, the entire contents of which are incorporated by reference herein.

TECHNICAL FIELD

The disclosure herein relates to rebar tying tools, reels, and attaching methods.

BACKGROUND

Japanese Patent Application Publication No. 2017-24908 describes a rebar tying tool. The rebar tying tool includes a reel including a bobbin and a wire wound around the bobbin; a reel attaching part to which the reel is rotatably attached; a feeding unit configured to feed the wire from the bobbin around rebars; a twisting unit configured to twist the wire around the rebars; two photointerrupters configured to detect the type of the reel; and a support supporting the reel attaching part, the feeding unit, the twisting unit, and the photointerrupters. The bobbin includes two annular ribs about an axis of the bobbin. The type of the reel is detected by the photointerrupters detecting the annular ribs as the reel rotates.

Japanese Patent Application Publication No. 2004-59017 describes a rebar tying tool. The rebar tying tool includes a reel including a bobbin and a wire wound around the bobbin; a reel attaching part to which the reel is attached; a feeding unit configured to feed the wire from the bobbin around rebars; and a twisting unit configured to twist the wire around the rebars. The bobbin includes a projection. The reel attaching part includes an opening configured to engage with the projection when the reel is attached to the reel attaching part.

SUMMARY

For example, if a photointerrupter is contaminated by a foreign matter, etc. or if the photointerrupter is exposed to scattering light, the detection sensitivity of the photointerrupter may be decreased. According to the rebar tying tool of Japanese Patent Application Publication No. 2017-24908, if one of the two photointerrupters is decreased in its detection sensitivity, the type of the reel cannot be detected accurately. Thus, it is desirable to use fewer photointerrupters.

According to the rebar tying tool of Japanese Patent Application Publication No. 2004-59017, in order to engage the projection with the opening, a user adjusts the position of the reel with respect to the reel attaching part in attaching the reel to the reel attaching part. The user then moves the reel closer to the reel attaching part while maintaining the adjusted position of the reel with respect to the reel attaching part, to engage the projection with the opening. Since it takes time and effort to attach the reel to the reel attaching part, there is a need for a technology for facilitating the positioning adjustment of the reel in attaching the reel to the reel attaching part.

The disclosure herein provides technologies that solve one of the problems above, that is, a technology that allows for a reduced number of photointerrupters and detection of the type of a reel and a technology that facilitates position adjustment of a reel in attaching the reel to a reel attaching part.

A rebar tying tool disclosed herein may comprise: a reel comprising a bobbin and a wire wound around the bobbin; a reel attaching part to which the reel is rotatably attached; a feeding unit configured to feed the wire from the bobbin around rebars; a twisting unit configured to twist the wire around the rebars; a type detector configured to detect a type of the reel; and a support supporting the reel attaching part, the feeding unit, the twisting unit, and the type detector. The type detector may comprise a movable member configured to move with respect to the support. The movable member may be at an initial position when the reel is not attached to the reel attaching part. The movable member may be at an attaching position according to the type of the reel when the reel is attached to the reel attaching part.

According to the configuration above, the type of the reel is detected based on the position of the movable member. A contact sensor and/or a contactless sensor other than the photointerrupter can be used to detect the position of the movable member. The configuration thus allows for detection of the type of the reel and a reduced number of photointerrupters.

A rebar tying tool disclosed herein may comprise: a reel attaching part to which a reel is rotatably attached, wherein the reel comprises a bobbin and a wire wound around the bobbin; a feeding unit configured to feed the wire from the bobbin around rebars; a twisting unit configured to twist the wire around the rebars; a type detector configured to detect a type of the reel; and a support supporting the reel attaching part, the feeding unit, the twisting unit, and the type detector. The type detector may comprise a movable member configured to move with respect to the support. The movable member may be at an initial position when the reel is not attached to the reel attaching part. The movable member may be at an attaching position according to the type of the reel when the reel is attached to the reel attaching part.

The configuration above can achieve the same effects as those of the rebar tying tool above.

A reel disclosed herein may comprise: a bobbin; and a wire wound around the bobbin. The reel may be used by being rotatably attached to a reel attaching part of a rebar tying tool. The rebar tying tool may comprise: a type detector configured to detect a type of the reel; and a support supporting the reel attaching part and the type detector. The type detector may comprise a movable member configured to move with respect to the support. The movable member may be at an initial position when the reel is not attached to the reel attaching part. The bobbin may be configured to move the movable member to an attaching position according to the type of the reel when the reel is attached to the reel attaching part.

According to the configuration above, when the reel is attached to the reel attaching part of the rebar tying tool, the type of the reel is detected based on the position of the movable member. A contact sensor and/or a contactless sensor other than the photointerrupter can be used to detect the position of the movable member. The configuration thus enables the rebar tying tool to detect the type of the reel and allows for a reduced number of photointerrupters used in the rebar tying tool.

A rebar tying tool disclosed herein may comprise a reel comprising a bobbin and a wire wound around the bobbin;

a reel attaching part to which the reel is rotatably attached; a feeding unit configured to feed the wire from the bobbin around rebars; a twisting unit configured to twist the wire around the rebars; a support supporting the reel attaching part, the feeding unit, and the twisting unit; a rotation-detecting magnet configured to integrally rotate with the reel; a rotation-detecting magnetic sensor fixed to the support and configured to detect rotation of the rotation-detecting magnet; and a photointerrupter configured to detect a shape of the bobbin as the reel rotates.

According to the configuration above, the rotation-detecting magnetic sensor detects that the reel has rotated once by detecting the rotation-detecting magnet which integrally rotates with the reel. Further, the photointerrupter detects the shape of the bobbin as the reel rotates. Thus, the shape of the bobbin can be detected as the reel rotates once. Where the shape of bobbin varies depending on types of reels, the type of a reel can be detected based on the detected shape of the bobbin. The configuration thus enables detection of the type of the reel and a reduced number of photointerrupters.

A rebar tying tool disclosed herein may comprise a reel attaching part to which a reel is rotatably attached, wherein the reel comprises a bobbin and a wire wound around the bobbin; a feeding unit configured to feed the wire from the bobbin around rebars; a twisting unit configured to twist the wire around the rebars; a support supporting the reel attaching part, the feeding unit, and the twisting unit; a rotation-detecting magnet configured to integrally rotate with the reel; a rotation-detecting magnetic sensor fixed to the support and configured to detect rotation of the rotation-detecting magnet; and a photointerrupter configured to detect a shape of the bobbin as the reel rotates.

The configuration above can achieve the same effects as those of the rebar tying tool above.

A reel disclosed herein may comprise a bobbin; and a wire wound around the bobbin. The reel may be used by being rotatably attached to a reel attaching part of a rebar tying tool. The rebar tying tool may comprise: a support supporting the reel attaching part; a rotation-detecting magnet configured to integrally rotate with the reel; a rotation-detecting magnetic sensor fixed to the support and configured to detect rotation of the rotation-detecting magnet; and a photointerrupter. The bobbin may comprise a shape that is detectable by the photointerrupter as the reel rotates.

According to the configuration above, the rotation-detecting magnetic sensor detects that the reel has rotated once by detecting the rotation-detecting magnet which integrally rotates with the reel, after the reel has been attached to the reel attaching part of the rebar tying tool. Further, the photointerrupter detects the shape of the bobbin as the reel rotates. These enable the rebar tying tool to detect the shape of the bobbin as the reel rotates once. Where the shape of bobbin varies depending on the types of reels, the type of a reel can be detected by the rebar tying tool based on the detected shape of the bobbin. The configuration thus enables the rebar tying tool to detect the type of the reel and allows for a reduced number of photointerrupters used in the rebar tying tool.

A rebar tying tool disclosed herein may comprise a reel comprising a bobbin and a wire wound around the bobbin; a reel attaching part comprising a first portion, wherein the reel is rotatably attached to the reel attaching part; a feeding unit configured to feed the wire from the bobbin around rebars; and a twisting unit configured to twist the wire around the rebars. One of the bobbin and the wire may comprise an information portion including information of the reel that is detected by the rebar tying tool when the reel is attached to the reel attaching part, wherein the information portion corresponds to the first portion. The reel may be configured to rotate about a rotation axis when the reel is attached to the reel attaching part. One of the reel and the reel attaching part may comprise a rib. The other of the reel and the reel attaching part may comprise a guide configured to guide the rib as the reel is attached to the reel attaching part along the rotation axis of the reel such that the information portion overlaps the first portion in a direction along the rotation axis of the reel.

According to the configuration above, the guide guides the rib as the reel is attached to the reel attaching part, so that the information portion overlaps the first portion in the direction along the rotation axis of the reel. Position adjustment of the reel with respect to the reel attaching part can be facilitated in attaching the reel to the reel attaching part.

A reel disclosed herein may be used by being attached to a reel attaching part of a rebar tying tool. The reel may comprise a bobbin and a wire wound around the bobbin. One of the bobbin and the wire may comprise an information portion including information of the reel that is detected by the rebar tying tool when the reel is attached to the reel attaching part. The bobbin may comprise a rib or a guide configured to position the information portion at a predetermined position with respect to the reel attaching part.

The reel attaching part of the rebar tying tool comprises a corresponding configuration. In a case where the corresponding configuration guides the rib or is guided by the guide to position the information portion at a predetermined position with respect to the reel attaching part, the information portion is positioned at the predetermined position with respect to the reel attaching part by the rib of the reel being guided by the corresponding configuration or by the guide of the reel guiding the corresponding configuration as the reel is attached to the reel attaching part. Thus, the position adjustment of the reel with respect to the reel attaching part can be facilitated in attaching the reel to the reel attaching part.

An attaching method disclosed herein may be a method of attaching a reel to a reel attaching part of a rebar tying tool configured to tie rebars with a wire. The reel may comprise an information portion including information of the reel and is configured to rotate about a rotation axis when the reel is attached to the reel attaching part. The reel attaching part may comprise a first portion corresponding to the information portion. One of the reel and the reel attaching part may comprise a rib. The other of the reel and the reel attaching part may comprise a guide. The attaching method may comprise: positioning the information portion to overlap the first portion in a direction along a rotation axis of the reel by causing the reel to rotate about the rotation axis of the reel with respect to the reel attaching part by moving the rib along the guide as the reel is inserted into the reel attaching part in a first direction; and bringing the information portion close to the first portion by inserting the reel into the reel attaching part in the first direction after the positioning.

According to the configuration above, the rib moves along the guide as the user inserts the reel to the reel attaching part in the first direction, so that the information portion overlaps the first portion in the direction along the rotation axis of the reel. Thus, the position adjustment of the reel with respect to the reel attaching part can be facilitated in attaching the reel to the reel attaching part.

A rebar tying tool disclosed herein may comprise a reel comprising a bobbin and a wire wound around the bobbin; a reel attaching part to which the reel is attached; a reel information detector configured to detect information of the reel when the reel is attached to the reel attaching part, a feeding unit configured to feed the wire from the bobbin around rebars; a twisting unit configured to twist the wire around the rebars; and a positioner configured to rotate the reel about a rotation axis of the reel with respect to the reel attaching part to position the reel with respect to the reel information detector as the reel is attached to the reel attaching part.

According to the configuration above, as the reel is attached to the reel attaching part, the positioner rotates the reel about the rotation axis of the reel with respect to the reel attaching part, so that the reel is positioned at a predetermined position with respect to the reel information detector. Thus, the position adjustment of the reel with respect to the reel attaching part can be facilitated in attaching the reel to the reel attaching part.

DETAILED DESCRIPTION

Figure 1:
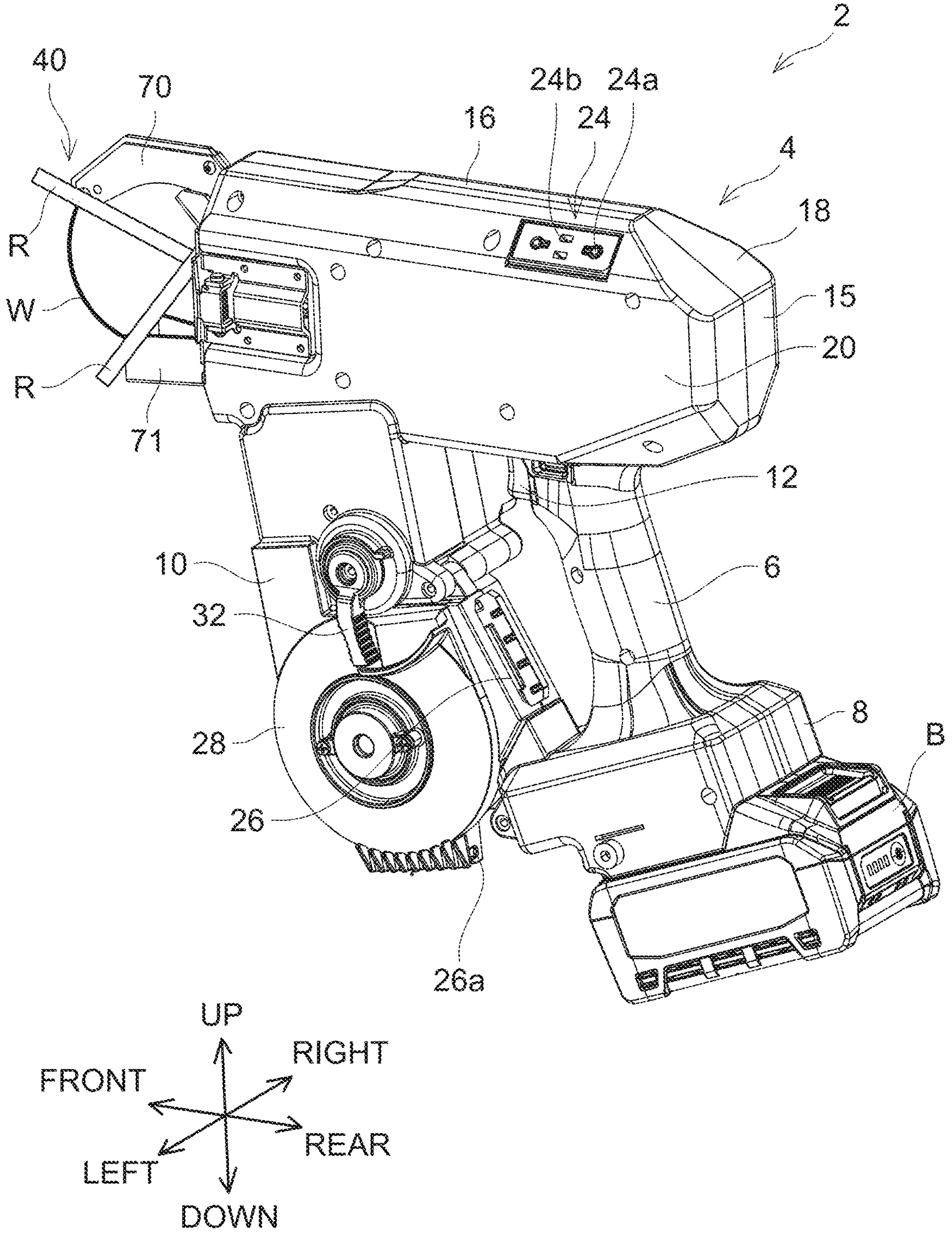
FIG. 1 is a perspective view of a rebar tying tool 2 according to a first embodiment, as viewed from the upper left rear side.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved rebar tying tools, reels, and attaching methods, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A rebar tying tool disclosed herein may comprise a reel comprising a bobbin and a wire wound around the bobbin; a reel attaching part to which the reel is rotatably attached; a feeding unit configured to feed the wire from the bobbin around rebars; a twisting unit configured to twist the wire around the rebars; a type detector configured to detect a type of the reel; and a support supporting the reel attaching part, the feeding unit, the twisting unit, and the type detector. The type detector may comprise a movable member configured to move with respect to the support. The movable member may be at an initial position when the reel is not attached to the reel attaching part. The movable member may be at an attaching position according to the type of the reel when the reel is attached to the reel attaching part.

In one or more embodiments, the reel attaching part may comprise a turntable rotatably supported by the support. The bobbin may be fixed to the turntable when the reel is attached to the reel attaching part.

According to the configuration above, since the turntable is supported by the support, there is no need to attach/detach the turntable to/from the support. Thus, displacement of a rotation axis of the turntable can be suppressed. Displacement of a rotation axis of the reel thus can be suppressed.

In one or more embodiments, the bobbin may comprise a trunk around which the wire is wound; a flange disposed at one end of the trunk; and a projection that projects outward beyond an outer surface of the flange along a rotation axis of the reel. The turntable may comprise a receiver configured to receive and engage with the projection.

According to the configuration above, the reel can be fixed to the turntable with a simple configuration.

In one or more embodiments, the projection may push the movable member from the initial position toward the attaching position when the projection is received in the receiver.

According to the configuration above, the movable member can be moved from the initial position to the attaching position, using the projection for attaching the reel to the reel attaching part.

In one or more embodiments, the movable member may be supported by the turntable such that the movable member is movable between the initial position and the attaching position.

If the movable member is not supported by the turntable and thus does not integrally rotate with the reel, this complicates the configuration of the reel attaching part. According to the configuration above, such a complicated configuration of the reel attaching part can be suppressed.

In one or more embodiments, the type detector may further comprise a type-detecting magnet fixed to the movable member; and a type-detecting magnetic sensor fixed to the support and configured to detect whether the movable member is at the attaching position by detecting the type-detecting magnet.

According to the configuration above, the type-detecting magnetic sensor detects whether the movable member is at the attaching position or not, for example, by detecting magnetic variations due to the type-detecting magnet. Whether the movable member is at the attaching position or not can be detected with less or no influence of contamination by foreign matters and scattering light, as compared with using a photointerrupter.

In one or more embodiments, the type detector may further comprise a biasing member configured to bias the movable member toward the initial position.

According to the configuration above, the movable member can be returned to the initial position when the reel is detached from the reel attaching part.

In one or more embodiments, the type detector may further comprise a rotation detector configured to detect a rotation angle of the reel.

According to the configuration above, the type detector can be used to detect not only the type of the reel but also the rotation of the reel.

In one or more embodiments, the rotation detector may comprise a rotation-detecting magnet fixed to the movable member; and a rotation-detecting magnetic sensor fixed to the support and configured to detect the rotation angle of the reel by detecting the rotation-detecting magnet.

According to the configuration above, the rotation-detecting magnetic sensor detects the rotation angle of the reel, for example, by detecting magnetic variations due to the rotation-detecting magnet. The rotation angle of the reel can be detected with less or no influence of contamination by foreign matters and scattering light, as compared with using a photointerrupter.

A rebar tying tool disclosed herein may comprise a reel comprising a bobbin and a wire wound around the bobbin; a reel attaching part to which the reel is rotatably attached; a feeding unit configured to feed the wire from the bobbin around rebars; a twisting unit configured to twist the wire around the rebars; a support supporting the reel attaching part, the feeding unit, and the twisting unit; a rotation-detecting magnet configured to integrally rotate with the reel; a rotation-detecting magnetic sensor fixed to the support and configured to detect rotation of the rotation-detecting magnet; and a photointerrupter configured to detect a shape of the bobbin as the reel rotates.

In one or more embodiments, the bobbin may comprise a uniquely shaped portion having a shape based on which the photointerrupter distinguishes the reel from another reel. The uniquely shaped portion may pass between a light emitter and a light receiver of the photointerrupter as the reel rotates.

According to the configuration above, the type of the reel can be detected accurately by detecting the uniquely shaped portion passing between the light emitter and the light receiver of the photointerrupter as the reel rotates.

In one or more embodiments, the uniquely shaped portion may comprise a plurality of ribs spaced apart from each other along a rotation direction of the reel. The rebar tying tool may further comprise a counter configured to count a number of the ribs passing between the light emitter and the light receiver of the photointerrupter as the reel rotates.

According to the configuration above, where the number of ribs varies depending on types of reels, the type of the reel can be detected by a simple method of counting the number of ribs.

In one or more embodiments, the reel attaching part may comprise a turntable rotatably supported by the support. The bobbin may be fixed to the turntable when the reel is attached to the reel attaching part.

According to the configuration above, since the turntable is supported by the support, there is no need to attach/detach the turntable to/froth the support. Thus, displacement of a rotation axis of the turntable can be suppressed. Displacement of the rotation axis of the reel thus can be suppressed.

In one or more embodiments, the rotation-detecting magnet may be supported by the turntable such that the rotation-detecting magnet is integrally rotatable with the turntable. The rotation-detecting magnetic sensor may be positioned to overlap at least a part of the turntable in a direction along a rotation axis of the reel.

According to the configuration above, the rotation of the reel can be detected accurately with a simple configuration.

In one or more embodiments, the bobbin may comprise a projection. The turntable may comprise a receiver configured to receive and engage with the projection.

According to the configuration above, the reel can be fixed to the turntable with a simple configuration.

In one or more embodiments, the photointerrupter may be fixed to the support.

According to the configuration above, the position of the photointerrupter does not change even when the reel rotates. Thus, the shape of the bobbin can be detected accurately by the photointerrupter.

In one or more embodiments, the photointerrupter may be disposed farther apart from a rotation axis of the reel than the rotation-detecting magnetic sensor.

According to the configuration above, the photointerrupter and the rotation-detecting magnetic sensor can be aligned in a direction perpendicular to the rotation axis of the reel.

A rebar tying tool disclosed herein may comprise a reel comprising a bobbin and a wire wound around the bobbin; a reel attaching part comprising a first portion, wherein the reel is rotatably attached to the reel attaching part; a feeding unit configured to feed the wire from the bobbin around rebars; and a twisting unit configured to twist the wire around the rebars. One of the bobbin and the wire may comprise an information portion including information of the reel that is detected by the rebar tying tool when the reel is attached to the reel attaching part, wherein the information portion corresponds to the first portion. The reel may be configured to rotate about a rotation axis when the reel is attached to the reel attaching part. One of the reel and the reel attaching part may comprise a rib. The other of the reel and the reel attaching part may comprise a guide configured to guide the rib when the reel is attached to the reel attaching part along the rotation axis of the reel such that the information portion overlaps the first portion in a direction along the rotation axis of the reel.

In one or more embodiments, the guide may comprise a first non-inclined surface extending along the rotation axis of the reel; and an inclined surface inclined to the first non-inclined surface. The first non-inclined surface may be connected to one end of the inclined surface. The guide may be configured to guide the rib from the inclined surface toward the first non-inclined surface as the reel is attached to the reel attaching part.

According to the configuration above, position adjustment of the reel with respect to the reel attaching part can be facilitated in attaching the reel to the reel attaching part with a simple configuration of guiding the rib from the inclined surface toward the first non-inclined surface.

In one or more embodiments, while the guide guides the rib along the first non-inclined surface, the information portion may be positioned to overlap the first portion in the direction along the rotation axis of the reel.

According to the configuration above, by bringing the reel closer to the reel attaching part along the rotation axis of the reel after the rib has reached the first non-inclined surface, the user can bring the information portion closer to the first portion while maintaining the information portion overlapping the first portion in the direction along the rotation axis of the reel.

In one or more embodiments, the information portion may comprise a projection projecting from the bobbin. The first portion may comprise a receiver configured to receive the projection when the reel is attached to the reel attaching part. The reel attaching part may comprise the guide. In the direction along the rotation axis of the reel, a length of the first non-inclined surface may be equal to or longer than a length of the projection.

If the length of the first non-inclined surface is shorter than the length of the projection, the projection contacts the reel attaching part while the rib is moving on the inclined surface and thus the projection cannot overlap the receiver in the direction along the rotation axis of the reel. According to the configuration above, the projection is suppressed from failing to overlap the receiver in the direction along the rotation axis of the reel.

In one or more embodiments, the guide may further comprise a second non-inclined surface connected to the other end of the inclined surface, wherein the inclined surface is inclined to the second non-inclined surface at an acute angle. The inclined surface and the second non-inclined surface may define a corner at their connection. The corner may be rounded.

For example, if the corner is not rounded, when the rib contacts the corner of the guide in attaching the reel to the reel attaching part, the rib cannot move to the inclined surface. According to the configuration above, even though the rib contacts the rounded corner in attaching the reel to the reel attaching part, the rib can move along the corner to the inclined surface.

In one or more embodiments, the first non-inclined surface may extend from the inclined surface to an end of the other of the reel and the reel attaching part in the direction along the rotation axis of the reel.

According to the configuration above, the reel can be attached to the reel attaching part by moving the rib along the first non-inclined surface all the way to the end of the other of the reel and the reel attaching part.

In one or more embodiments, the bobbin may comprise a trunk, wherein the trunk comprises an outer circumferential surface around which the wire is wound and an inner circumferential surface opposite to the outer circumferential surface and defining an insert space. The reel attaching part may comprise an insertion shaft configured to be inserted into the insert space of the trunk. The rib may be formed on one of the inner circumferential surface of the trunk and the insertion shaft. The guide may be formed on the other of the inner circumferential surface of the trunk and the insertion shaft.

According to the configuration above, the reel can be attached to the reel attaching part while positioned with respect to the reel attaching part, by a simple method of inserting the insertion shaft into the insert space of the trunk.

In one or more embodiments, the rebar tying tool may further comprise a support supporting the reel attaching part, the feeding unit, and the twisting unit. The reel attaching part may further comprise a turntable including the insertion shaft and rotatably supported by the support.

According to the configuration above, the turntable rotates as the rib is guided by the guide in attaching the reel to the reel attaching part. Thus, the position adjustment of the reel with respect to the reel attaching part can be further facilitated.

In one or more embodiments, the information portion may comprise a projection projecting from the bobbin. The first portion may comprise a receiver defined in the turntable and configured to receive the projection when the reel is attached to the reel attaching part.

According to the configuration above, displacement of the projection with respect to the receiver can be suppressed when the reel is attached to the reel attaching part.

In one or more embodiments, the rib may be formed on the inner circumferential surface of the trunk. The guide may be formed on the insertion shaft.

Typically, the rib has a simpler configuration than the guide. According to the configuration above, the configuration of the reel can be simplified.

In one or more embodiments, the rib may extend along the rotation axis of the reel.

According to the configuration above, the strength of the rib in the direction along the rotation axis of the reel can be increased. Thus, even when the rib contacts the guide in attaching the reel to the reel attaching part, damage to the rib can be suppressed.

In one or more embodiments, the rib may comprise one or more ribs. The guide may comprise one or more guides. One of the reel and the reel attaching part may comprise the one or more ribs. The other of the reel and the reel attaching part may comprise the one or more guides. A number of the ribs may be equal to or less than a number of the guides.

According to the configuration above, position adjustment of the reel with respect to the reel attaching part can be facilitated in attaching the reel to the reel attaching part, with a reduced number of ribs.

First Embodiment

As shown in FIG. 1, a rebar tying tool 2 is configured to tie a plurality of rebars R with a wire W. For example, the rebar tying tool 2 ties, with the wire W, rebars R having a small diameter of 16 mm or less or rebars R having a large diameter of greater than 16 mm (e.g., 25 mm or 32 mm). The diameter of the wire W is, for example, within a range from 0.5 mm to 2.0 mm.

As shown in FIG. 1, the rebar tying tool 2 comprises a main body 4, a grip 6, a battery attaching part 8, a battery pack B, and a reel holder 10. The grip 6 is configured to be gripped by an operator. The grip 6 is disposed at a lower rear portion of the main body 4. The grip 6 is integral with the main body 4. A trigger 12 is disposed at an upper front portion of the grip 6. A trigger switch 14 (see FIG. 3) configured to detect whether the trigger 12 is pressed or not is disposed within the grip 6. The battery attaching part 8 is disposed at a lower portion of the grip 6. The battery attaching part 8 is integral with the grip 6. The battery pack B can be attached to and detached from the battery attaching part 8 by being slid with respect to the battery attaching part 8. The battery pack B comprises, for example, secondary batteries such as lithium-ion batteries. The reel holder 10 is disposed at a lower front portion of the main body 4. The reel holder 10 is disposed forward of the grip 6. In the present embodiment, a longitudinal direction of a twisting unit 46 (which will be described later) is termed a front-rear direction, a direction perpendicular to the front-rear direction is termed an up-down direction, and a direction perpendicular to the front-rear direction and the up-down direction is termed a right-left direction.

Figure 2:
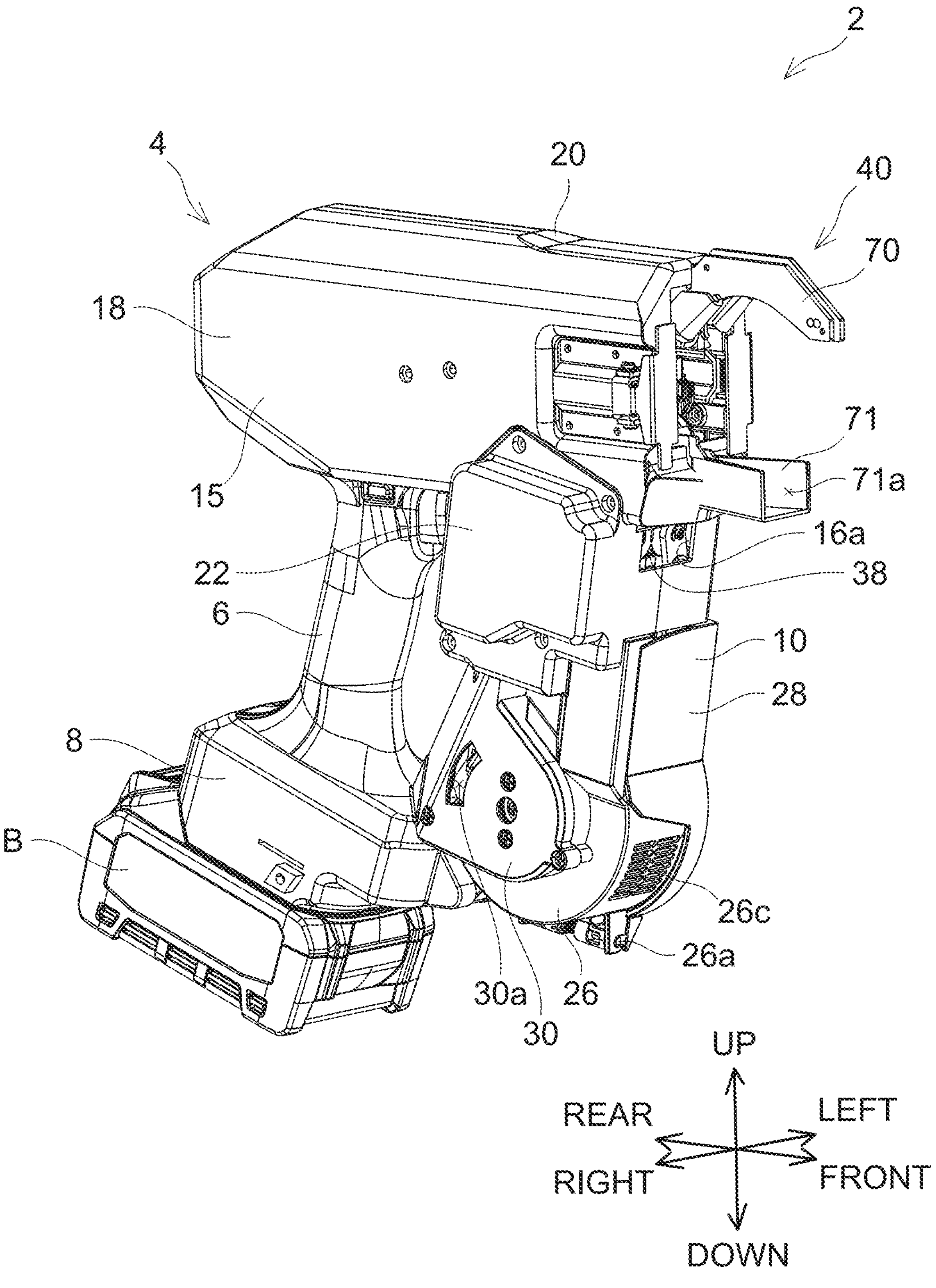
FIG. 2 is a perspective view of the rebar tying tool 2 according to the first embodiment, as viewed from the upper right front side.

The rebar tying tool 2 comprises a housing 16. The housing 16 constitutes a part of a support 15. As shown in FIG. 2, the housing 16 comprises a right housing 18, a left housing 20, and a motor cover 22. The right housing 18 defines shapes of right halves of the main body 4, the grip 6, and the battery attaching part 8. The left housing 20 defines shapes of left halves of the main body 4, the grip 6, and the battery attaching part 8. The motor cover 22 is attached to an outer side of the right housing 18. As shown in FIG. 1, an operation display 24 is disposed at an upper rear portion of the left housing 20. The operation display 24 comprises a main power switch **24*a* and a main power LED 24*b*. The main power switch 24*a* is configured to receive an operation to turn on/turn off the rebar tying tool 2 from the user. The main power LED 24*b* is configured to display whether the rebar tying tool 2** is on or off.

As shown in FIG. 2, the reel holder 10 comprises a holder housing 26, a main cover 28, and an auxiliary cover 30. The holder housing 26 and the auxiliary cover 30 constitute a part of the support 15. The holder housing 26 is fixed to the lower front portion of the main body 4 and a front portion of the battery attaching part 8. The holder housing 26 includes an opening at its left end. The main cover 28 is attached to the holder housing 26 such that the main cover 28 is pivotable about a pivot axis **26*a* at a lower portion of the holder housing 26. The main cover 28 is biased in its opening direction by a torsion spring 31 (see FIG. 3). A closed state detecting sensor (not shown) configured to detect that the main cover 28 is in a closed state is attached to the holder housing 26. The auxiliary cover 30 covers a right surface of the holder housing 26. The auxiliary cover 30 defines an auxiliary space 30***a* between the right surface of the holder housing 26 and the auxiliary cover 30.

As shown in FIG. 1, a lock lever 32 for keeping the main cover 28 closed is disposed at a lower front portion of the left housing 20. When the lock lever 32 is pivoted, the main cover 28 is opened with respect to the holder housing 26 by the biasing force of the torsion spring 31 (see FIG. 3). While the main cover 28 is in the closed state, a housing space 26*b* (see FIG. 3) is defined by the holder housing 26 and the main cover 28. A reel 33 (see FIG. 3) comprising the wire W is disposed in the housing space 26*b*. As shown in FIG. 2, a hole 26*c* is defined in a front surface of the holder housing 26. The user can check a remaining amount of the wire W on the reel 33 by seeing the reel 33 through the hole 26*c*.

Figure 3:
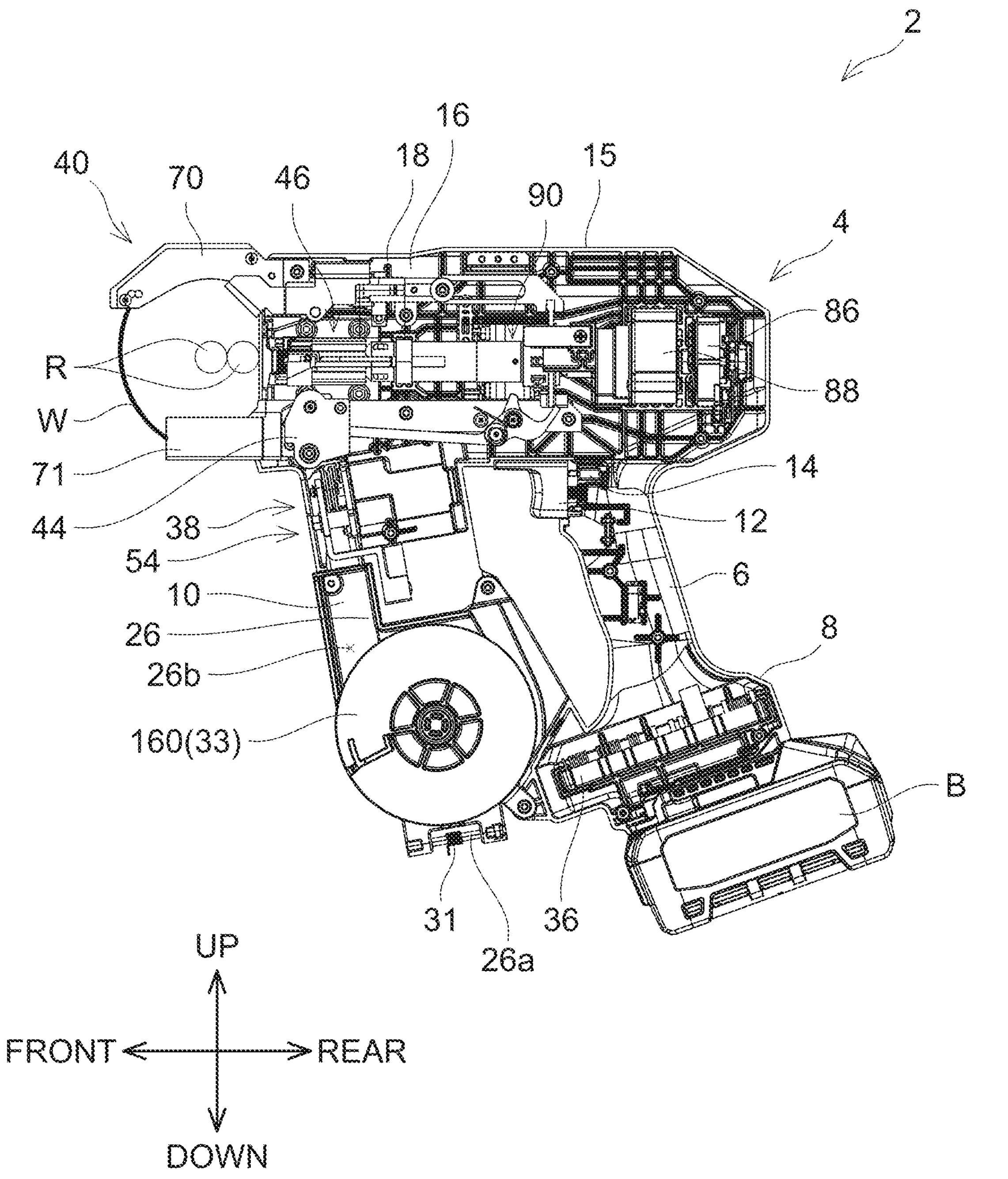
FIG. 3 is a side view of an internal configuration of the rebar tying tool 2 according to the first embodiment.

As shown in FIG. 3, the rebar tying tool 2 comprises a control circuit board 36. The control circuit board 36 is disposed within the battery attaching part 8. The control circuit board 36 is electrically connected to each of the battery pack B, the trigger switch 14, and the operation display 24 via wires which are not shown. Further, the control circuit board 36 is electrically connected to the closed state detecting sensor (not shown) attached to the holder housing 26 via a wire which is not shown.

The rebar tying tool 2 comprises a feeding unit 38, a guiding unit 40, a cutter unit 44, and a twisting unit 46. The feeding unit 38 is disposed within the front lower portion of the main body 4. The guiding unit 40 is disposed at a front portion of the main body 4. The cutter unit 44 is disposed within a lower portion of the main body 4. The twisting unit 46 is disposed within the body 4.

Figure 4:
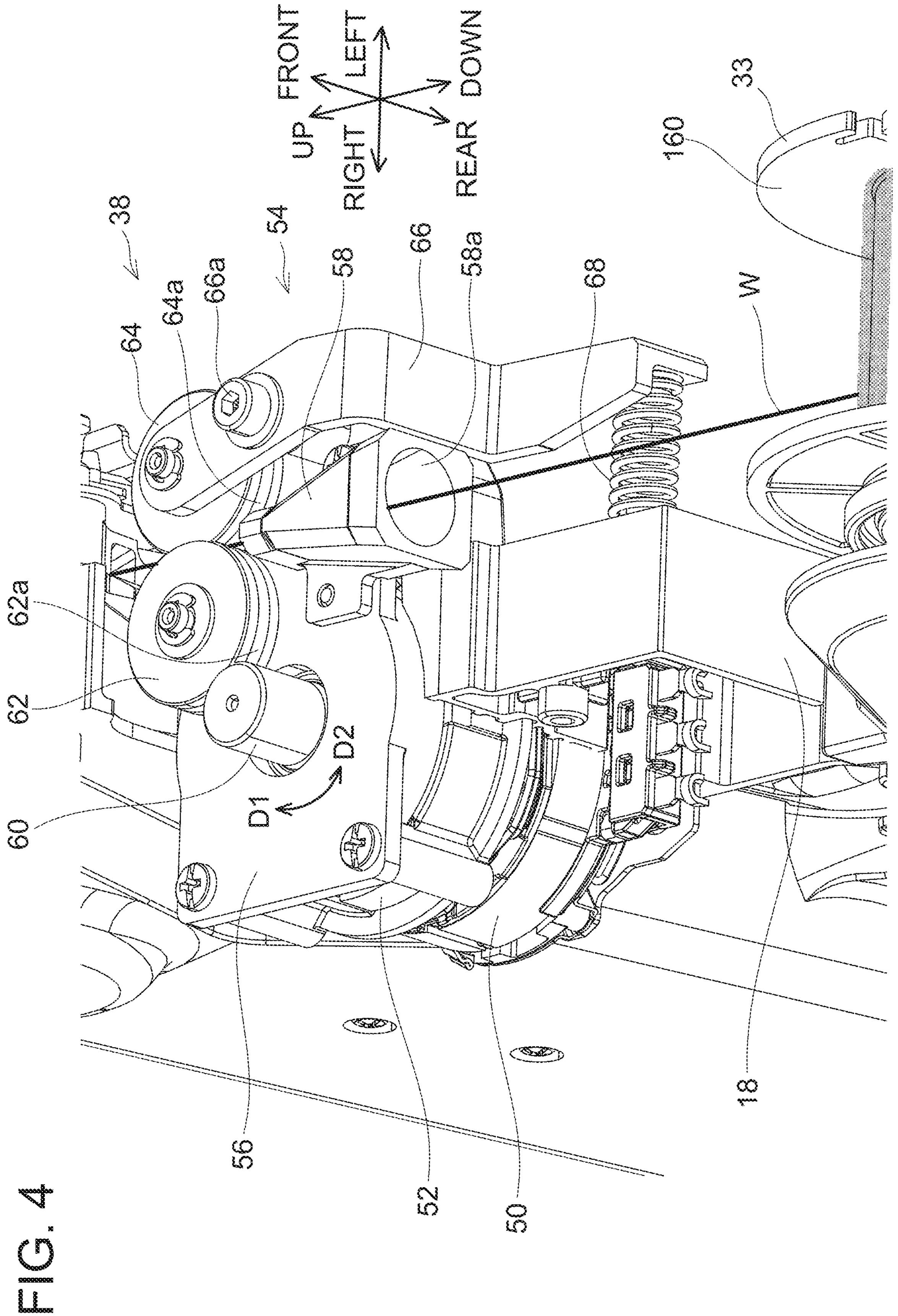
FIG. 4 is a perspective view of a feeding unit 38 according to the first embodiment.

As shown in FIG. 4, the feeding unit 38 comprises a feeding motor 50, a reducer 52, and a feeder 54. The feeding motor 50 is, for example, a brushless motor. The feeding motor 50 is disposed rightward of the right housing 18 (see FIG. 2) and is covered by the motor cover 22 (see FIG. 2). The feeding motor 50 is electrically connected to the control circuit board 36 via a wire which is not shown. The feeding motor 50 operates by electric power supplied from the battery pack B (see FIG. 2).

The reducer 52 comprises, for example, a planetary gear mechanism. The reducer 52 is configured to reduce the rotational speed of the feeding motor 50.

The feeder 54 comprises a base 56, a guide 58, a drive gear 60, a first feed gear 62, a second feed gear 64, a release lever 66, and a compression spring 68. The guide 58 is fixed to the base 56. The guide 58 has a guide hole 58*a*. The guide hole 58*a* has a tapered shape with a broad lower end and a narrower upper end. The wire W is inserted through the guide hole 58*a*.

Figure 5:
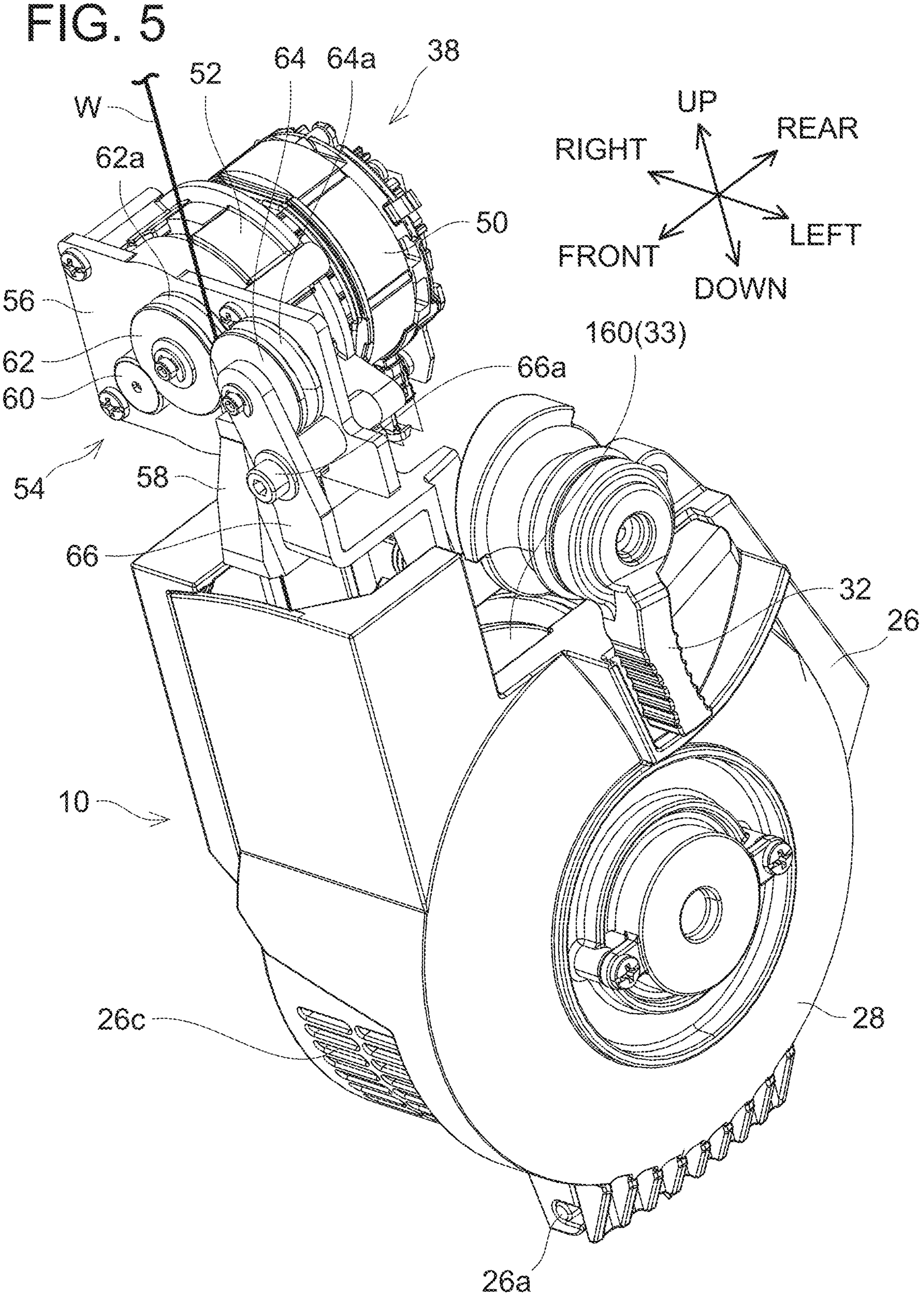
FIG. 5 is a perspective view of the feeding unit 38 and a reel holder 10 according to the first embodiment.

Rotation is transmitted to the drive gear 60 from the reducer 52. The first feed gear 62 is rotatably supported by the base 56. The first feed gear 62 is meshed with the drive gear 60. The first feed gear 62 is rotated by the rotation of the drive gear 60. The first feed gear 62 has a groove 62*a*. The groove 62*a* is defined in an outer circumferential surface of the first feed gear 62 and extends in a direction along a rotation direction of the first feed gear 62. The second feed gear 64 is configured to mesh with the first feed gear 62. The second feed gear 64 is rotatably supported by the release lever 66. The second feed gear 64 has a groove 64*a*. The groove 64*a* is defined in an outer circumferential surface of the second feed gear 64 and extends in a direction along a rotation direction of the second feed gear 64. The release lever 66 is swingably supported by the base 56 via a swing shaft 66*a*. The compression spring 68 biases the release lever 66 with respect to the right housing 18 (see FIG. 2) in a direction that brings the second feed gear 64 closer to the first feed gear 62. Thus, the second feed gear 64 is pressed against the first feed gear 62. The wire W is thereby held between the groove 62*a* of the first feed gear 62 and the groove 64*a* of the second feed gear 64. As shown in FIG. 5, when the lock lever 32 is pivoted in a direction that releases the retention of the main cover 28, a lower end of the release lever 66 is pushed by the lock lever 32 to move toward the right housing 18. The second feed gear 64 is thereby separated away from the first feed gear 62. In this state, the user can place the wire W of the reel 33 (see FIG. 4) between the groove 62*a* of the first feed gear 62 and the groove 64*a* of the second feed gear 64. As shown in FIG. 2, a window 16*a* is defined in front surfaces of the left housing 20 and the motor cover 22, and the user can see a site where the first feed gear 62 meshes with the second feed gear 64 through the window 16*a*.

The wire W is moved when the feeding motor 50 rotates with the wire W held between the groove 62*a* of the first feed gear 62 and the groove 64*a* of the second feed gear 64, as shown in FIG. 4. In the present embodiment, when the feeding motor 50 rotates forward, the drive gear 60 is rotated in a direction D1 shown in FIG. 4 and the wire W is fed out from the reel 33 toward the guiding unit 40. When the feeding motor 50 rotates in reverse, the drive gear 60 is rotated in a direction D2 shown in FIG. 4 and the wire W is pulled back toward the reel 33 from the feeding unit 38.

Figure 6:
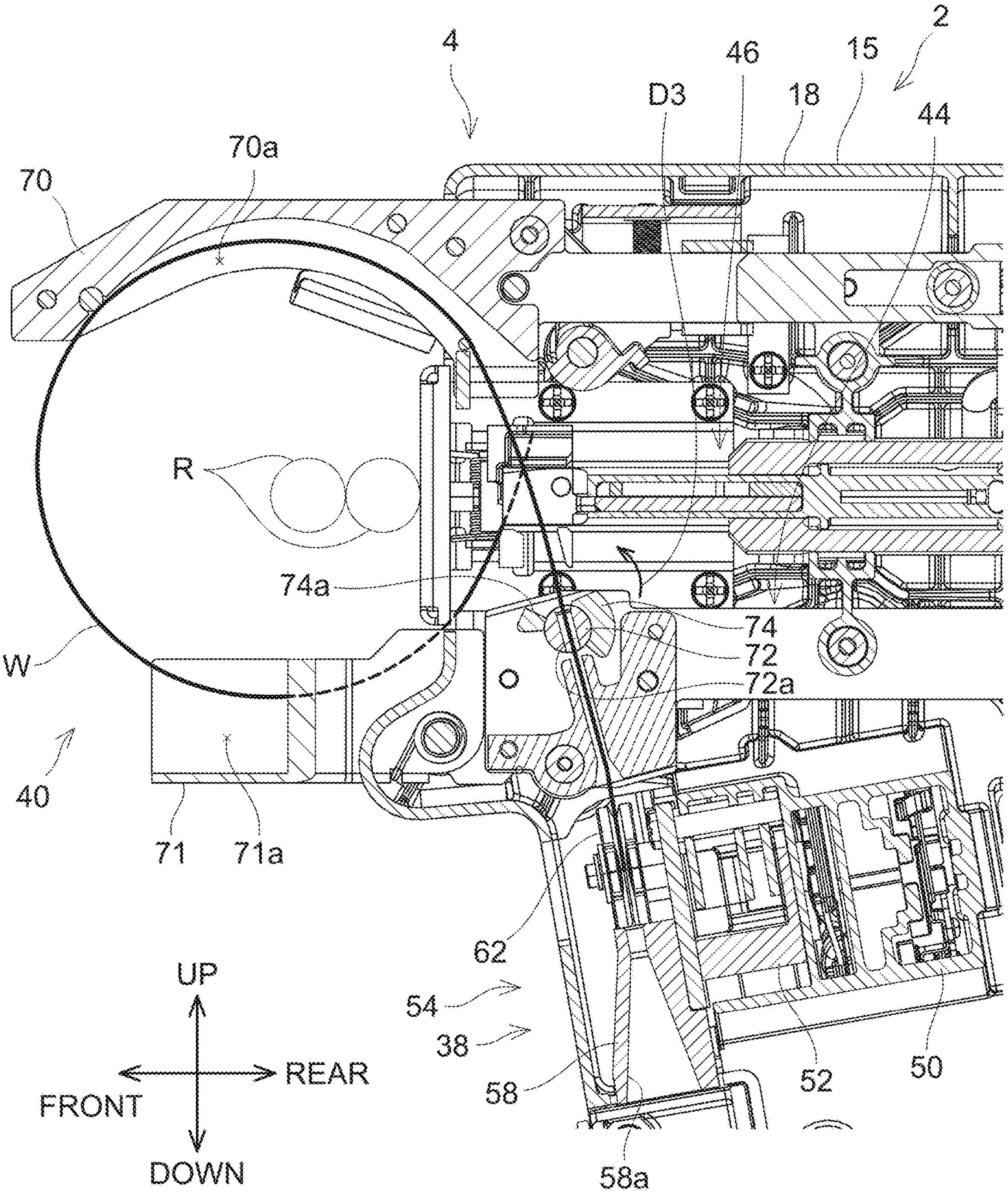
FIG. 6 is a cross-sectional view of the rebar tying tool 2 according to the first embodiment, in the vicinity of its upper front portion.

As shown in FIG. 6, the guiding unit 40 comprises an upper curl guide 70 and a lower curl guide 71. The upper curl guide 70 and the lower curl guide 71 are disposed at the front portion of the main body 4. A lower end of the upper curl guide 70 is open downward. Thereby, an upper wire passage 70*a* is defined in the upper curl guide 70. The lower curl guide 71 is disposed below the upper curl guide 70. An upper end of the upper curl guide 70 is open upward. Thereby, a lower wire passage 71*a* is defined in the lower curl guide 71.

The wire W fed out from the feeding unit 38 (see FIG. 4) is directed into the upper wire passage 70*a*. The wire W passes through the upper wire passage 70*a* from the rear toward the front. During this passing, a downward curl is given to the wire W. After passing through the upper wire passage 70*a*, the wire W is directed into the lower wire passage 71*a*. The wire W passes through the lower wire passage 71*a* from the front toward the rear. Thus, the wire W is wound around the rebars R.

Figure 7:
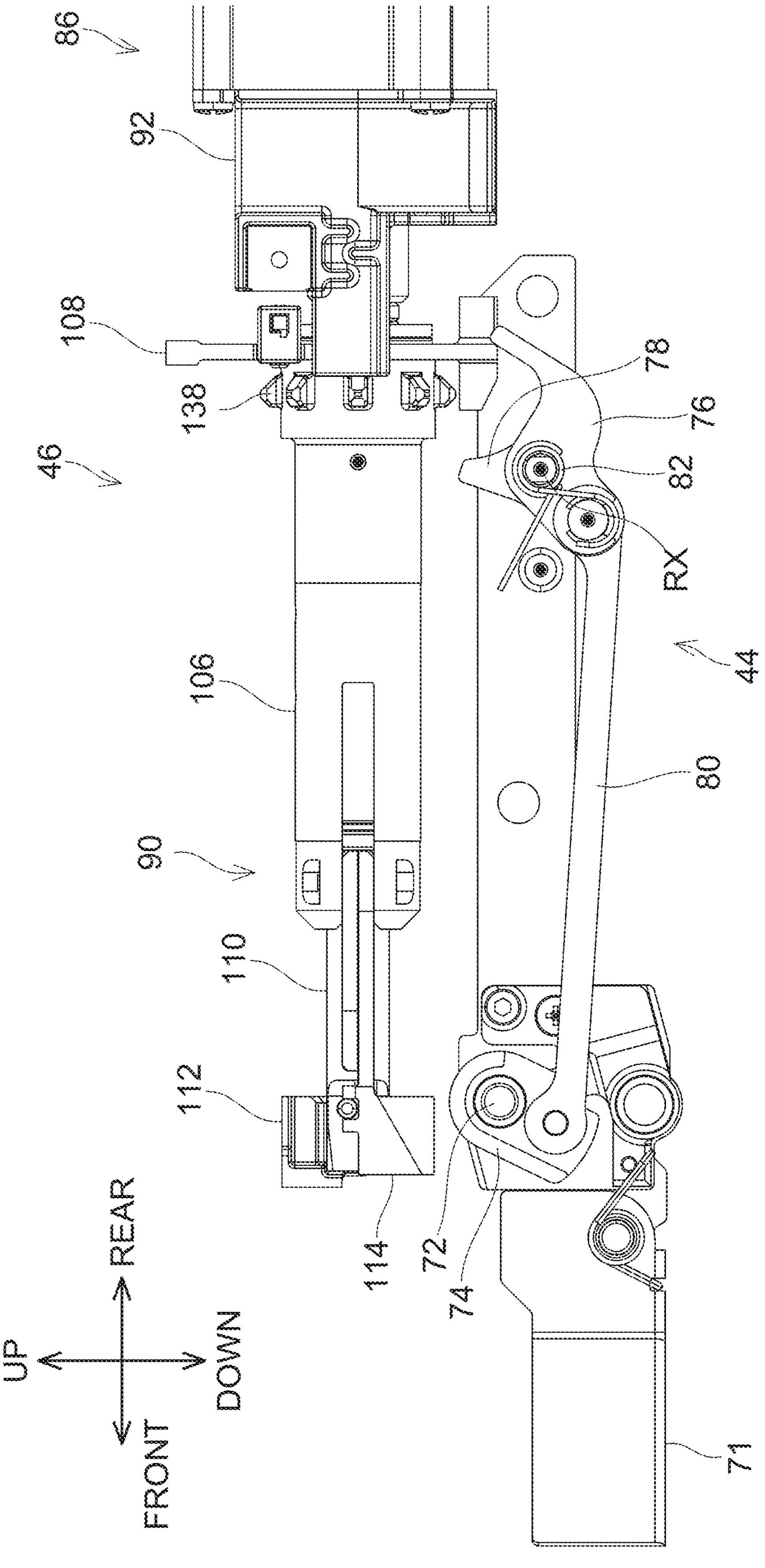
FIG. 7 is a side view of a cutter unit 44 according to the first embodiment, illustrating a state before a first lever 76 and a second lever 78 pivot.

As shown in FIG. 7, the cutter unit 44 comprises a fixed cutter 72, a movable cutter 74, a first lever 76, a second lever 78, a link 80, and a torsion spring 82. As shown in FIG. 6, the fixed cutter 72 and the movable cutter 74 are disposed on the path along which the wire W is directed to the guiding unit 40 from the feeding unit 38. The fixed cutter 72 has a hole 72*a* through which the wire W passes. The movable cutter 74 is supported by the fixed cutter 72 such that the movable cutter 74 can slide along and rotate about the fixed cutter 72. The movable cutter 74 has a hole 74*a* through which the wire W can pass. When the hole 74*a* of the movable cutter 74 is in communication with the hole 72*a* of the fixed cutter 72 (this state may be termed “communicated state” hereinbelow) as shown in FIG. 7, the wire W can pass through the hole 72*a* of the fixed cutter 72 and the hole 74*a* of the movable cutter 74. Then, when the movable cutter 74 is rotated with respect to the fixed cutter 72 in a direction D3 shown in FIG. 6 (this state may be termed "cutting state" hereinbelow), the wire W is cut by the fixed cutter 72 and the movable cutter 74.

As shown in FIG. 7, the first lever 76 and the second lever 78 are fixed to each other. The first lever 76 and the second lever 78 are swingable about an axis RX. Lower ends of the first lever 76 and the second lever 78 are rotatably coupled to a rear end of the link 80. A front end of the link 80 is rotatably coupled to a lower end of the movable cutter 74. The rear end of the link 80 is biased forward by the torsion spring 82. When the lower ends of the first lever 76 and the second lever 78 are swung forward, the link 80 is moved forward and the fixed cutter 72 and the movable cutter 74 are thereby brought into the communicated state. When the lower ends of the first lever 76 and the second lever 78 are swung rearward, the link 80 is moved rearward and the fixed cutter 72 and the movable cutter 74 are thereby brought into the cutting state.

Figure 9:
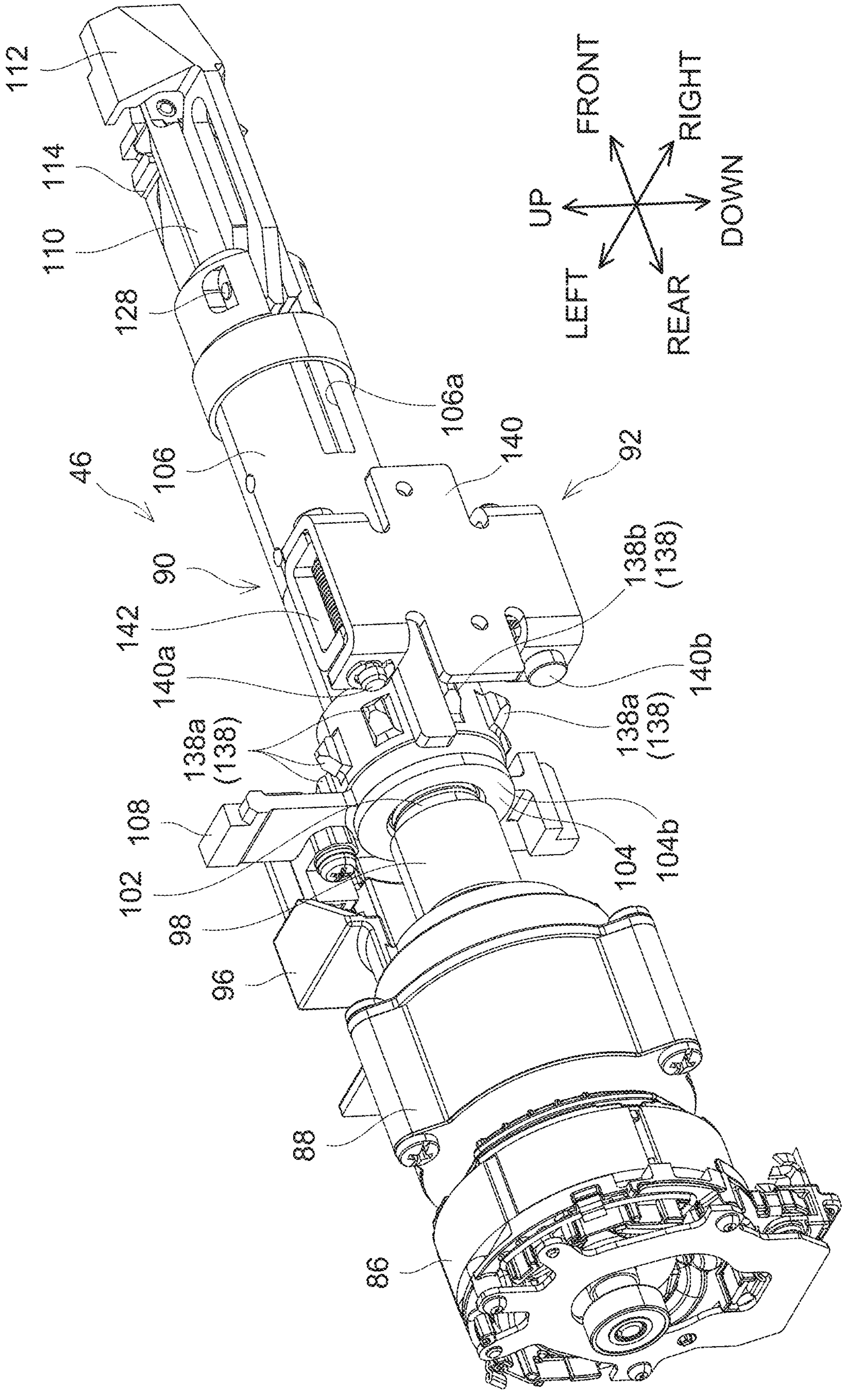
FIG. 9 is a perspective view of a twisting unit 46 according to the first embodiment.

As shown in FIG. 9, the twisting unit 46 comprises a twisting motor 86, a reducer 88, a retainer 90, and a rotation restrictor 92. The twisting motor 86 is, for example, a brushless motor. The twisting motor 86 is fixed to the right housing 18 (see FIG. 1) and the left housing 20 (see FIG. 1). The twisting motor 86 is electrically connected to the control circuit board 36 (see FIG. 3) via a wire which is not shown. The twisting motor 86 operates by electric power supplied from the battery pack B (see FIG. 1).

The reducer 88 is fixed to the right housing 18 and the left housing 20. The reducer 88 comprises, for example, a planetary gear mechanism. The reducer 88 is configured to reduce the rotational speed of the twisting motor 86.

Figure 10:
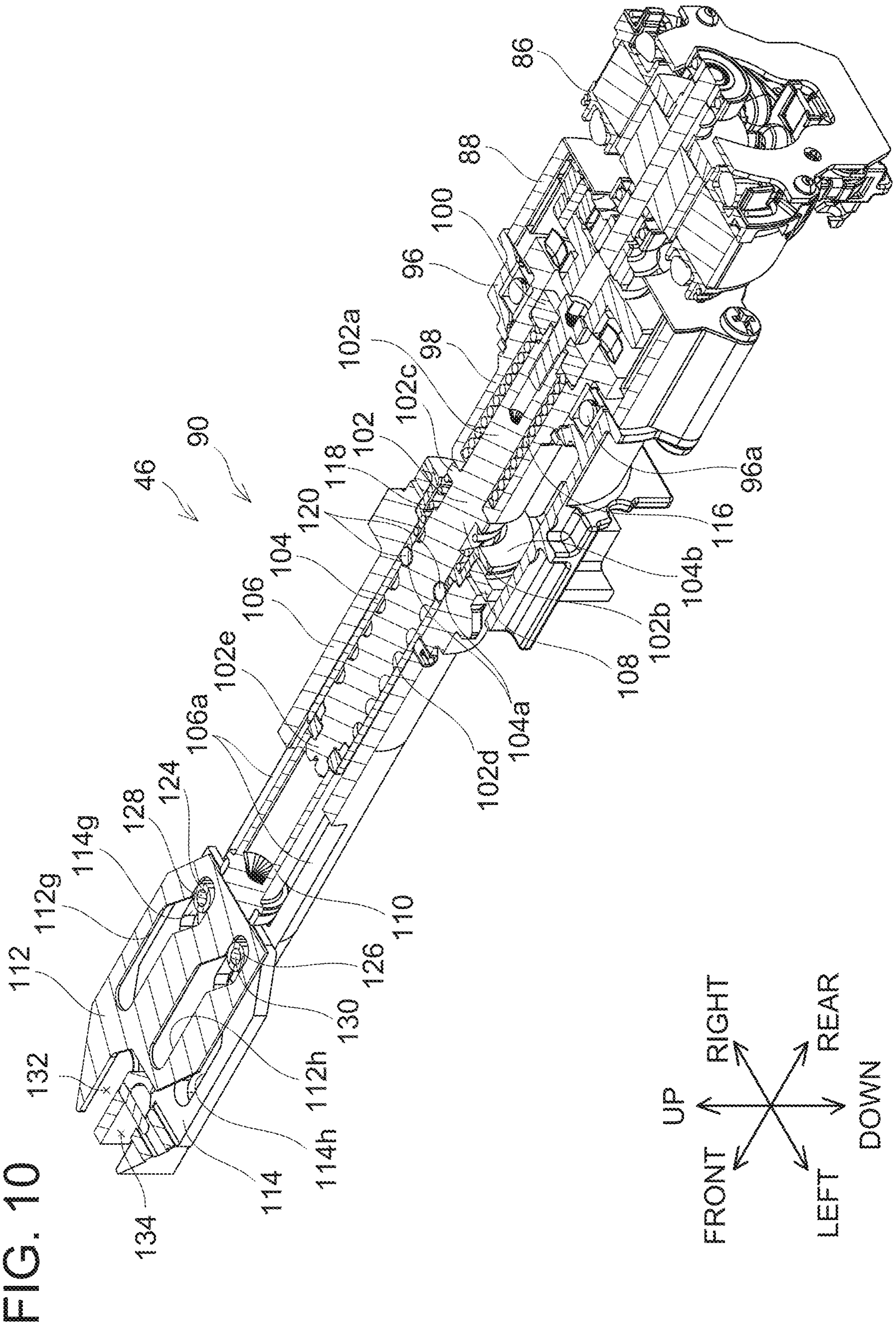
FIG. 10 is a cross-sectional view of a twisting motor 86, a reducer 88, and a retainer 90 according to the first embodiment.

As shown in FIG. 10, the retainer 90 comprises a bearing box 96, a carrier sleeve 98, a clutch plate 100, a screw shaft 102, an inner sleeve 104, an outer sleeve 106, a push plate 108, a clamp shaft 110, a right clamp 112, and a left clamp 114.

The bearing box 96 is fixed to the reducer 88. The bearing box 96 supports the carrier sleeve 98 via a bearing 96*a* such that the carrier sleeve 98 is rotatable. Rotation is transmitted to the carrier sleeve 98 from the reducer 88. When the twisting motor 86 rotates forward, the carrier sleeve 98 is rotated counterclockwise as viewed from the rear. When the twisting motor 86 rotates in reverse, the carrier sleeve 98 is rotated clockwise as viewed from the rear.

Figure 11:
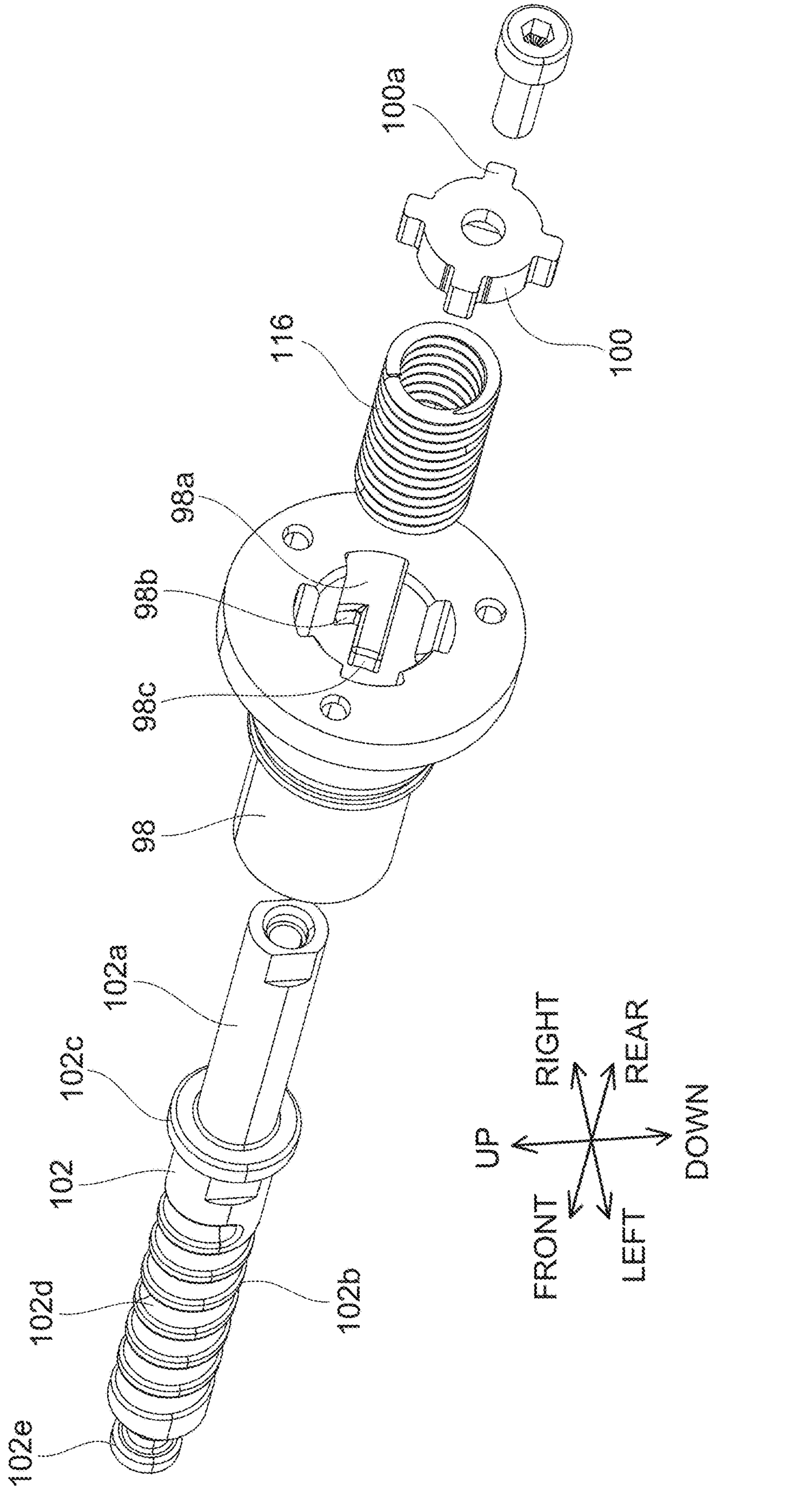
FIG. 11 is an exploded perspective view of a carrier sleeve 98, a clutch plate 100, and a screw shaft 102 according to the first embodiment.

As shown in FIG. 11, a clutch groove 98*a* extending in the front-rear direction is defined in an inner surface of a rear portion of the carrier sleeve 98. The clutch groove 98*a* includes a first wall 98*b* and a second wall 98*c* at its front ends. A distance from a rear end of the carrier sleeve 98 to the first wall 98*b* in the front-rear direction is shorter than a distance from the rear end of the carrier sleeve 98 to the second wall 98*c* in the front-rear direction. The clutch plate 100 is disposed inside the carrier sleeve 98. The clutch plate 100 includes a clutch piece 100*a* corresponding to the clutch groove 98*a*. The clutch plate 100 is biased rearward with respect to the carrier sleeve 98 by a compression spring 116 disposed inside the carrier sleeve 98. The clutch plate 100 is movable forward with respect to the carrier sleeve 98 until the clutch piece 100*a* contacts the first wall 98*b* of the clutch groove 98*a*. When the wire W is twisted, the carrier sleeve 98 is rotated counterclockwise with respect to the clutch plate 100 as viewed from the rear, and thus the clutch plate 100 can move forward with respect to the carrier sleeve 98 until the clutch piece 100*a* contacts the second wall 98*c* of the clutch groove 98*a*.

A rear portion 102*a* of the screw shaft 102 is inserted into the carrier sleeve 98 from the front and is fixed to the clutch plate 100. The screw shaft 102 includes a radially protruding flange 102*c* between the rear portion 102*a* and a front portion 102*b* of the screw shaft 102. A spiral ball groove 102*d* is defined in an outer surface of the front portion 102*b* of the screw shaft 102. The screw shaft 102 includes an engagement portion 102*e* at its front end, and a diameter of the engagement portion 102*e* is smaller than that of the front portion 102*b*.

As shown in FIG. 10, a compression spring 118 is attached to the front portion 102*b* of the screw shaft 102. The front portion 102*b* of the screw shaft 102 is inserted into the inner sleeve 104 from the rear. A ball hole 104*a* configured to hold balls 120 is defined in the inner sleeve 104. The balls 120 fit in a ball groove 102*d* of the screw shaft 102. The inner sleeve 104 includes a radially protruding flange 104*b* at its rear end. The inner sleeve 104 is inserted into the outer sleeve 106 from the rear. The outer sleeve 106 is fixed to the inner sleeve 104. In the case where the rotation restrictor 92 (see FIG. 17) permits the outer sleeve 106 to rotate, the inner sleeve 104 and the outer sleeve 106 are integrally rotated when the screw shaft 102 rotates. In the case where the rotation restrictor 92 prohibits the outer sleeve 106 from rotating, the inner sleeve 104 and the outer sleeve 106 are moved in the front-rear direction with respect to the screw shaft 102 when the screw shaft 102 rotates. Specifically, when the screw shaft 102 rotates counterclockwise as viewed from the rear by the twisting motor 86 rotating forward, the inner sleeve 104 and the outer sleeve 106 are moved forward with respect to the screw shaft 102. When the screw shaft 102 rotates clockwise as viewed from the rear by the twisting motor 86 rotating in reverse, the inner sleeve 104 and the outer sleeve 106 are moved rearward with respect to the screw shaft 102. The push plate 108 is disposed between the rear end of the outer sleeve 106 and the flange 104*b* of the inner sleeve 104. Thus, the push plate 108 is also moved in the front-rear direction when the inner sleeve 104 and the outer sleeve 106 are moved in the front-rear direction. Slits 106*a* extending rearward from a front end of the outer sleeve 106 are defined in the front portion of the outer sleeve 106.

Figure 12:
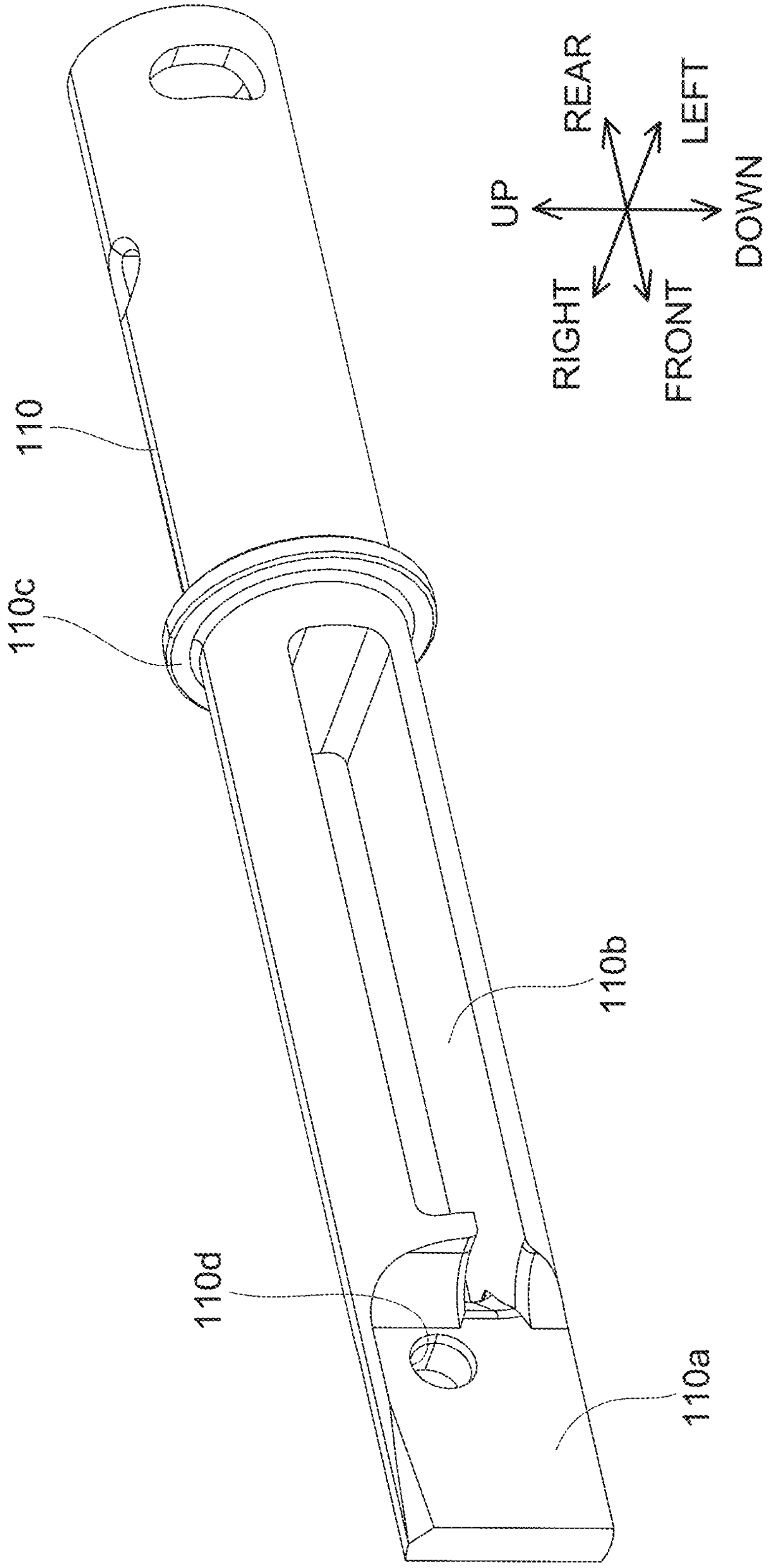
FIG. 12 is a perspective view of a clamp shaft 110 according to the first embodiment.

The clamp shaft 110 is inserted into the inner sleeve 104 from the front. The engagement portion 102*e* of the screw shaft 102 is inserted in a rear end of the clamp shaft 110. The clamp shaft 110 is fixed to the screw shaft 102. As shown in FIG. 12, the clamp shaft 110 includes a flat-plate portion 110*a*, an opening 110*b*, and a flange 110*c*. The flat-plate portion 110*a* is disposed at a front end of the clamp shaft 110 and has a flat-plate shape along the front-rear direction and the up-down direction. A hole 110*d* in which a pin 122 (see FIG. 13) fits is defined in the flat-plate portion 110*a*. The opening 110*b* is disposed rearward of the flat-plate portion 110*a*. The opening 110*b* penetrates the clamp shaft 110 in the right-left direction and extends in the front-rear direction. The flange 110*c* is disposed rearward of the opening 110*b* and protrudes radially.

Figure 13:
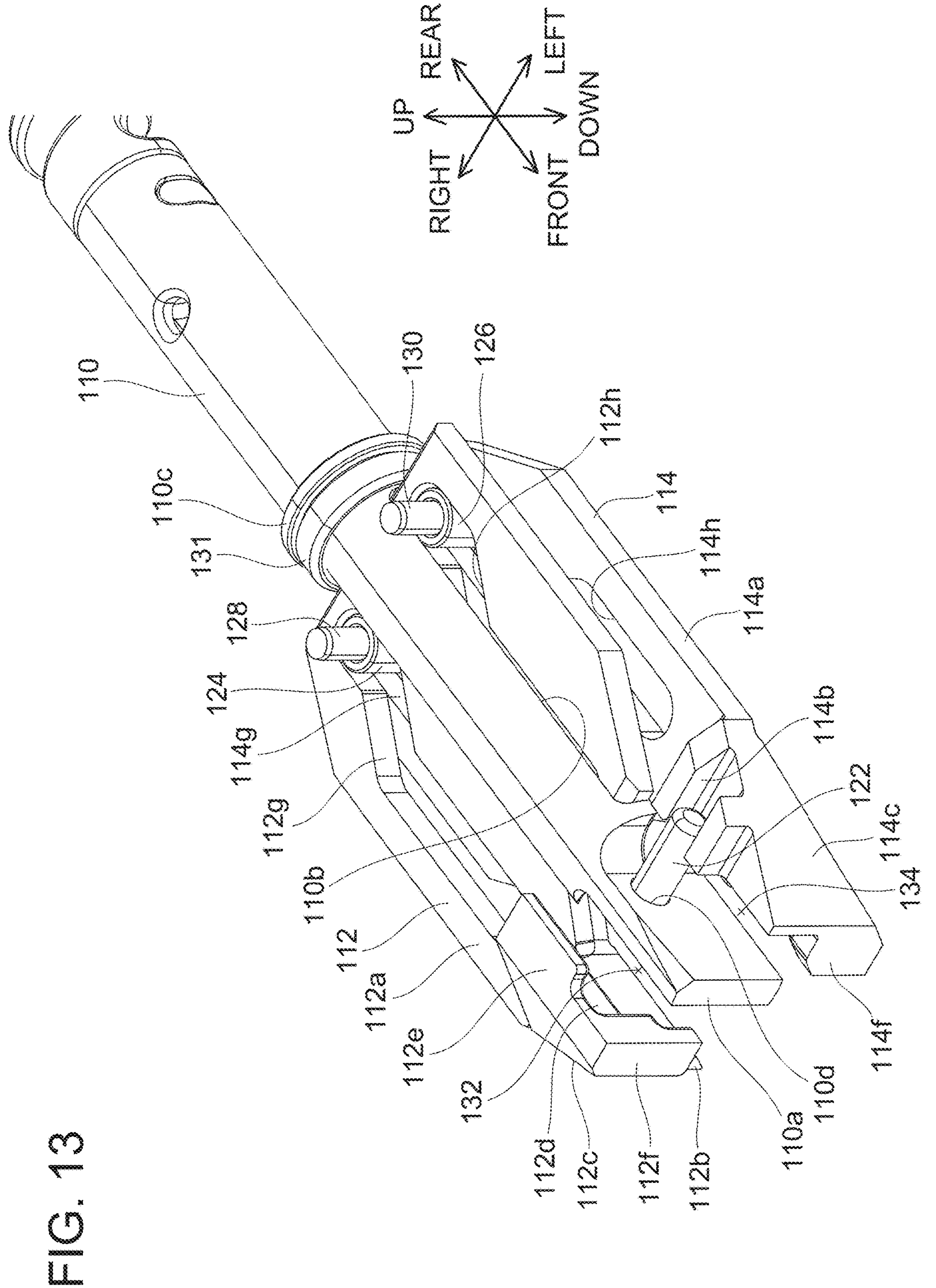
FIG. 13 is a perspective view of the twisting unit 46 according to the first embodiment, illustrating a state where a right clamp 112 and a left clamp 114 are attached to the clamp shaft 110.

As shown in FIG. 13, the right clamp 112 is attached to the clamp shaft 110 such that the right clamp 112 passes through the opening 110*b* of the clamp shaft 110 from the right to the left. Below the right clamp 112, the left clamp 114 is attached to the clamp shaft 110 such that the left clamp 114 passes through the opening 110*b* of the clamp shaft 110 from the left to the right.

Figure 14:
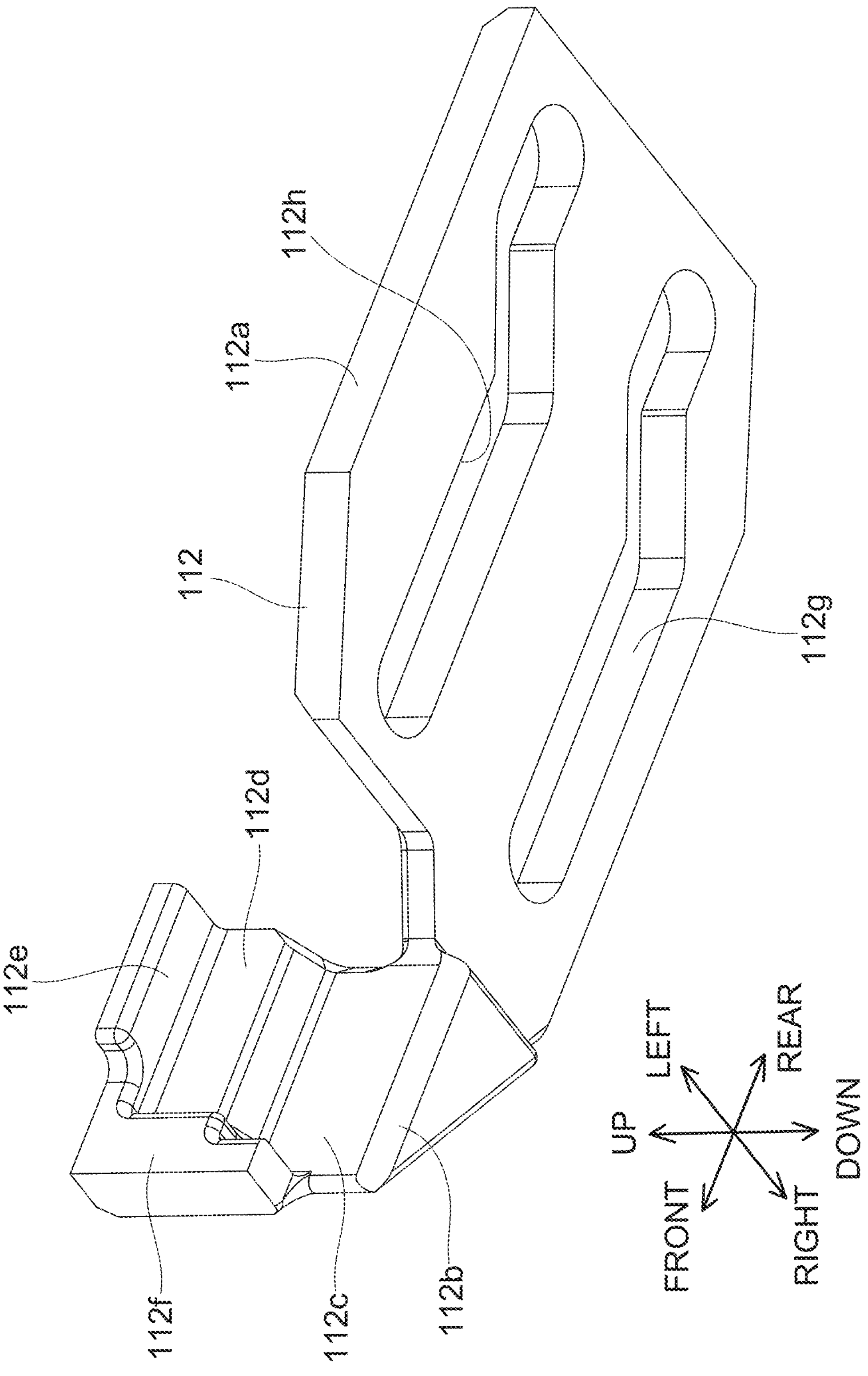
FIG. 14 is a perspective view of the right clamp 112 according to the first embodiment.

As shown in FIG. 14, the right clamp 112 comprises a base 112*a*, a downward protrusion 112*b*, an upward protrusion 112*c*, a contact portion 112*d*, an upper guard 112*e*, and a front guard 112*f*. The base 112*a* has a flat-plate shape along the front-rear direction and the right-left direction. The downward protrusion 112*b* is disposed at a right front end of the base 112*a* and protrudes downward from the base 112*a*. The upward protrusion 112*c* is disposed at the right front end of the base 112*a* and protrudes upward from the base 112*a*. The contact portion 112*d* protrudes leftward from an upper end of the upward protrusion 112*c*. The upper guard 112*e* protrudes leftward from an upper end of the contact portion 112*d*. The front guard 112*f* protrudes leftward from front ends of the upward protrusion 112*c* and the contact portion 112*d*. Cam holes 112*g*, 112*h* are defined in the base 112*a*. From their rear ends toward front ends, the cam holes 112*g*, 112*h* extend forward from their rear ends, bend to extend diagonally forward right, and then bend again to extend forward.

Figure 15:
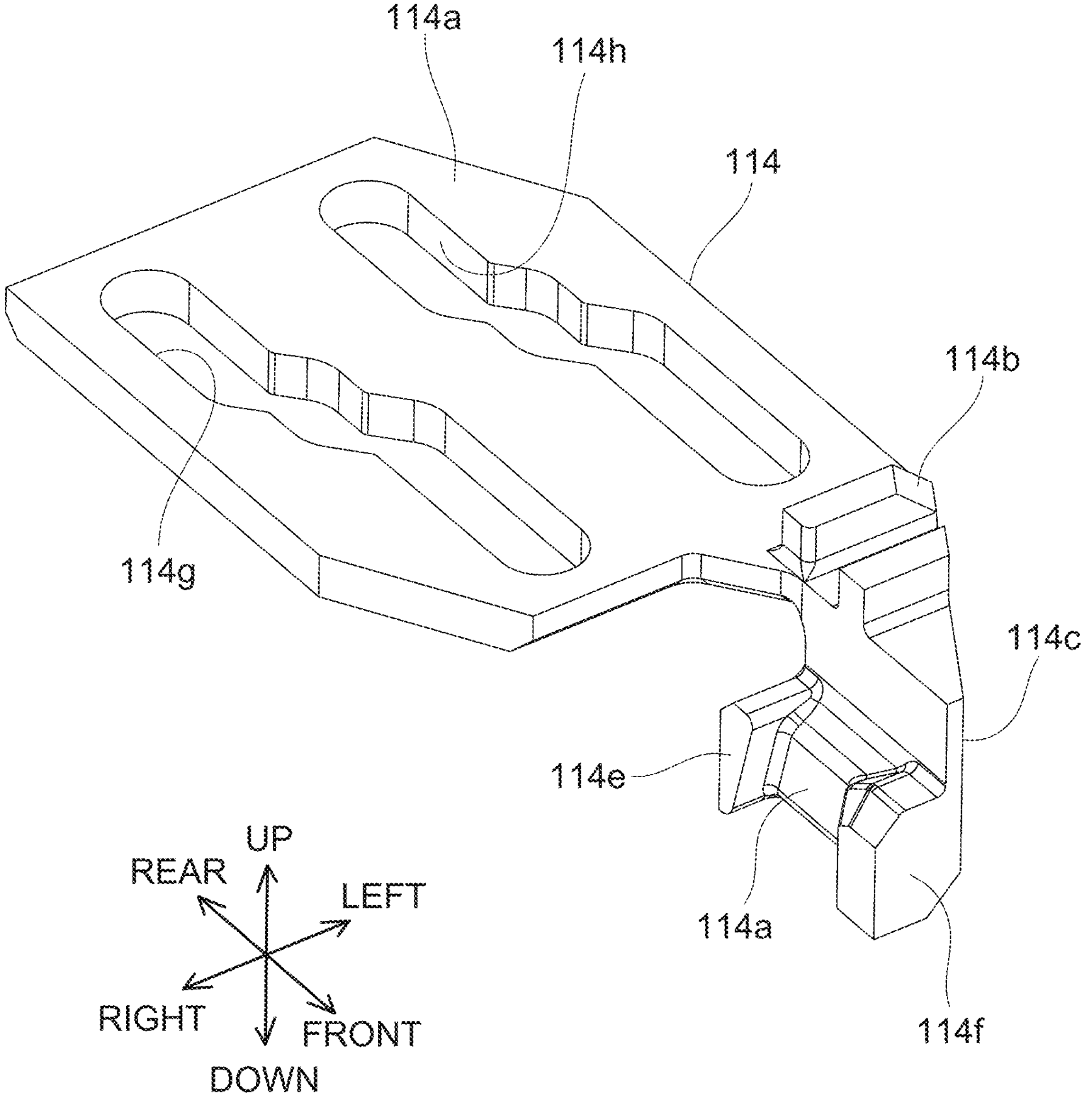
FIG. 15 is a perspective view of the left clamp 114 according to the first embodiment.

As shown in FIG. 15, the left clamp 114 comprises a base 114*a*, a pin retainer 114*b*, a downward protrusion 114*c*, a contact portion 114*d*, a rear guard 114*e*, and a front guard 114*f*. The base 114*a* has a flat-plate shape along the front-rear direction and the right-left direction. The pin retainer 114*b* is disposed at a left front end of the base 114*a* and retains the pin 122 (see FIG. 13) above the base 114*a* such that the pin 122 is slidable. The downward protrusion 114*c* is disposed at the left front end of the base 114*a* and protrudes downward from the base 114*a*. The contact portion 114*d* protrudes rightward from a lower end of the downward protrusion 114*c*. The rear guard 114*e* protrudes rightward from a rear end of the contact portion 114*d*. The front guard 114*f* protrudes rightward from a front end of the contact portion 114*d*. Cam holes 114*g*, 114*h* are defined in the base 114*a*. From their rear ends toward front ends, the cam holes 114*g*, 114*h* extend forward from their rear ends, bend to extend diagonally forward left, bend again to extend forward, bend to extend diagonally forward left again, and then bend to extend forward.

As shown in FIG. 13, in the state where the right clamp 112 and the left clamp 114 are attached to the clamp shaft 110, a cam sleeve 124 extend through the cam holes 112*g* and 114*g* and a cam sleeve 126 extends through the cam holes 112*h* and 114*h*. Further, a support pin 128 extends through the cam sleeve 124 and a support pin 130 extend through the cam sleeve 126. An annular cushion 131 is attached between the right clamp 112 and the left clamp 114 and the flange 110*c* of the clamp shaft 110.

As shown in FIG. 9, in the state where the clamp shaft 110 is attached to the inner sleeve 104, the right clamp 112 and the left clamp 114 are in the slits 106*a* of the outer sleeve 106 and the support pins 128, 130 are coupled with the outer sleeve 106. When the clamp shaft 110 is moved in the front-rear direction with respect to the outer sleeve 106, the cam sleeve 124 attached to the support pin 128 is moved within the cam holes 112*g*, 114*g* in the front-rear direction and the cam sleeve 126 attached to the support pin 130 is moved within the cam holes 112*h*, 114*h* in the front-rear direction, and thereby the right clamp 112 and the left clamp 114 are moved in the right-left direction.

As shown in FIG. 13, in an initial state where the clamp shaft 110 protrudes forward from the outer sleeve 106, the right clamp 112 is positioned furthest to the right from the left clamp 114. In this state, a right wire passage 132 through which the wire W can pass is defined between the upward protrusion 112*c* of the right clamp 112 and the flat-plate portion 110*a* of the clamp shaft 110, and the upper guard 112*e* covers the right wire passage 132 from above. This state of the right clamp 112 is termed a fully-open state. When the outer sleeve 106 is moved forward with respect to the clamp shaft 110 in that state, the right clamp 112 is moved leftward toward the clamp shaft 110. In this state, the wire W is held between a lower end of the contact portion 112*d* of the right clamp 112 and an upper end of the flat-plate portion 110*a* of the clamp shaft 110 and a front end of the right wire passage 132 is covered by the front guard 112*f*. This state of the right clamp 112 is termed a fully-closed state.

In the initial state where the clamp shaft 110 protrudes forward from the outer sleeve 106, the left clamp 114 is positioned furthest to the left from the clamp shaft 110. In this state, a left wire passage 134 through which the wire W can pass is defined between the downward protrusion 114*c* of the left clamp 114 and the flat-plate portion 110*a* of the clamp shaft 110. This state of the left clamp 114 is termed a fully-open state. When the outer sleeve 106 is moved forward with respect to the clamp shaft 110 in that state, the left clamp 114 is moved rightward toward the clamp shaft 110. The wire W can still pass through the left wire passage 134 in this state, while a rear end of the left wire passage 134 is covered by the rear guard 114*e* and a front end of the left wire passage 134 is covered by the front guard 114*f*. This state of the left clamp 114 is termed a half-open state. When the outer sleeve 106 is moved further forward with respect to the clamp shaft 110, the left clamp 114 is moved further rightward toward the clamp shaft 110. In this state, the wire W is held between an upper end of the contact portion 114*d* of the left clamp 114 and a lower end of the flat-plate portion 110*a* of the clamp shaft 110. This state of the left clamp 114 is termed a fully-closed state.

On the way from the feeding unit 38 (see FIG. 6) to the guiding unit 40 (see FIG. 6), the wire W passes through the left wire passage 134 before reaching the guiding unit 40. Thus, when the wire W is cut by the cutter unit 44 (see FIG. 6) with the left clamp 114 in the fully-closed state, a proximal end of the wire W wound around the rebars R is held by the left clamp 114 and the clamp shaft 110.

Further, the wire W guided through the guiding unit 40 passes through the right wire passage 132. Thus, when the right clamp 112 is brought into the fully-closed state, a distal end of the wire W wound around the rebars R is held by the right clamp 112 and the clamp shaft 110.

Figure 16:
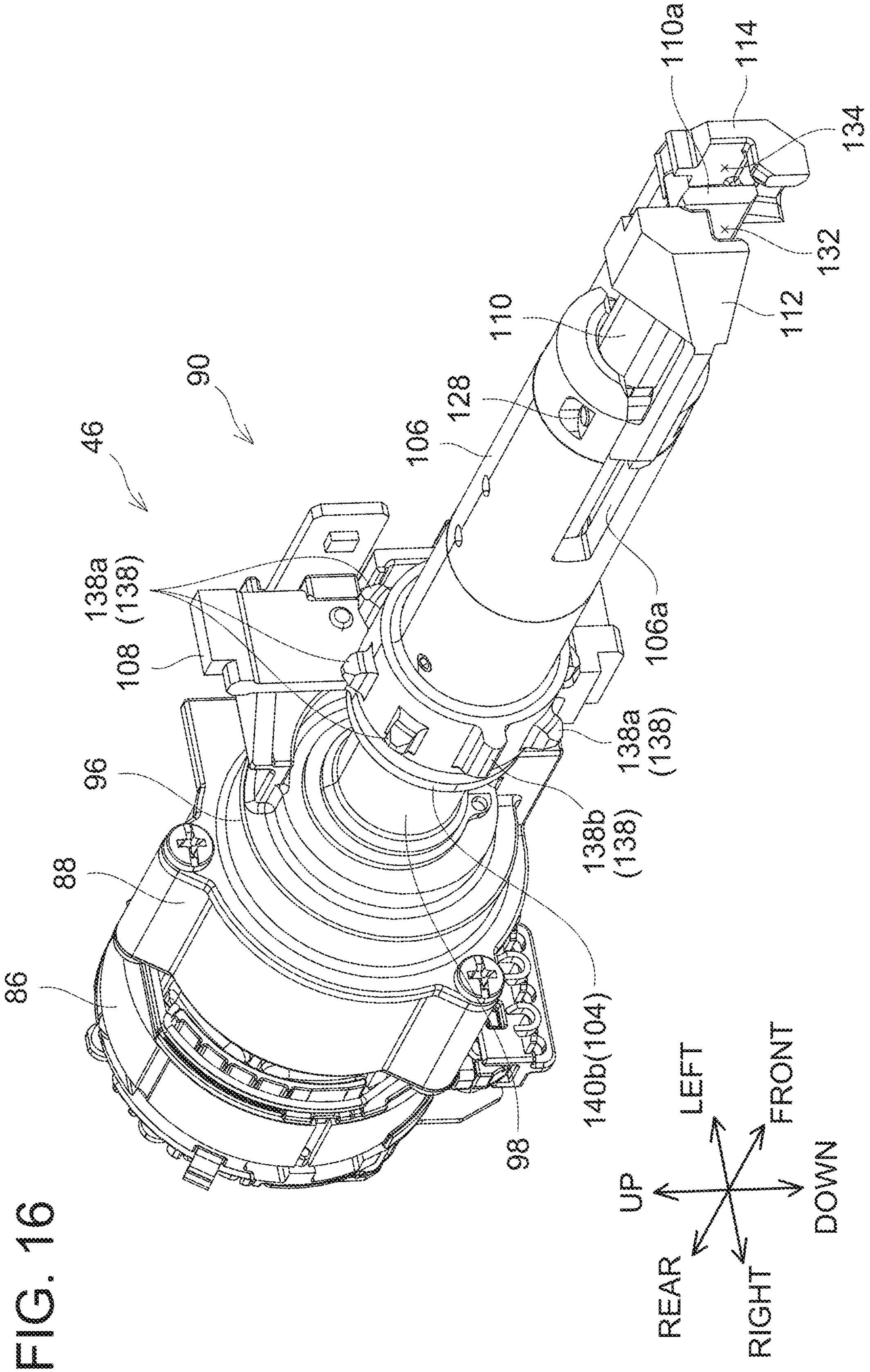
FIG. 16 is a perspective view of the twisting motor 86, the reducer 88, and the retainer 90 according to the first embodiment.

As shown in FIG. 16, the outer sleeve 106 includes fins 138 on an outer surface of its rear portion. The fins 138 extend in the front-rear direction. In the present embodiment, eight fins 138 are arranged on the outer surface of the outer sleeve 106 with intervals of 45 degrees from each other. Further, in the present embodiment, the eight fins 138 comprise seven short fins 138*a* and one long fin 138*b*. A length of the long fin 138*b* in the front-rear direction is greater than a length of the short fins 138*a* in the front-rear direction. In the front-rear direction, the position of a rear end of the long fin 138*b* is coincident with the positions of rear ends of the short fins 138*a*. In the front-rear direction, the position of a front end of the long fin 138*b* is forward of the positions of front ends of the short fins 138*a*.

Figure 17:
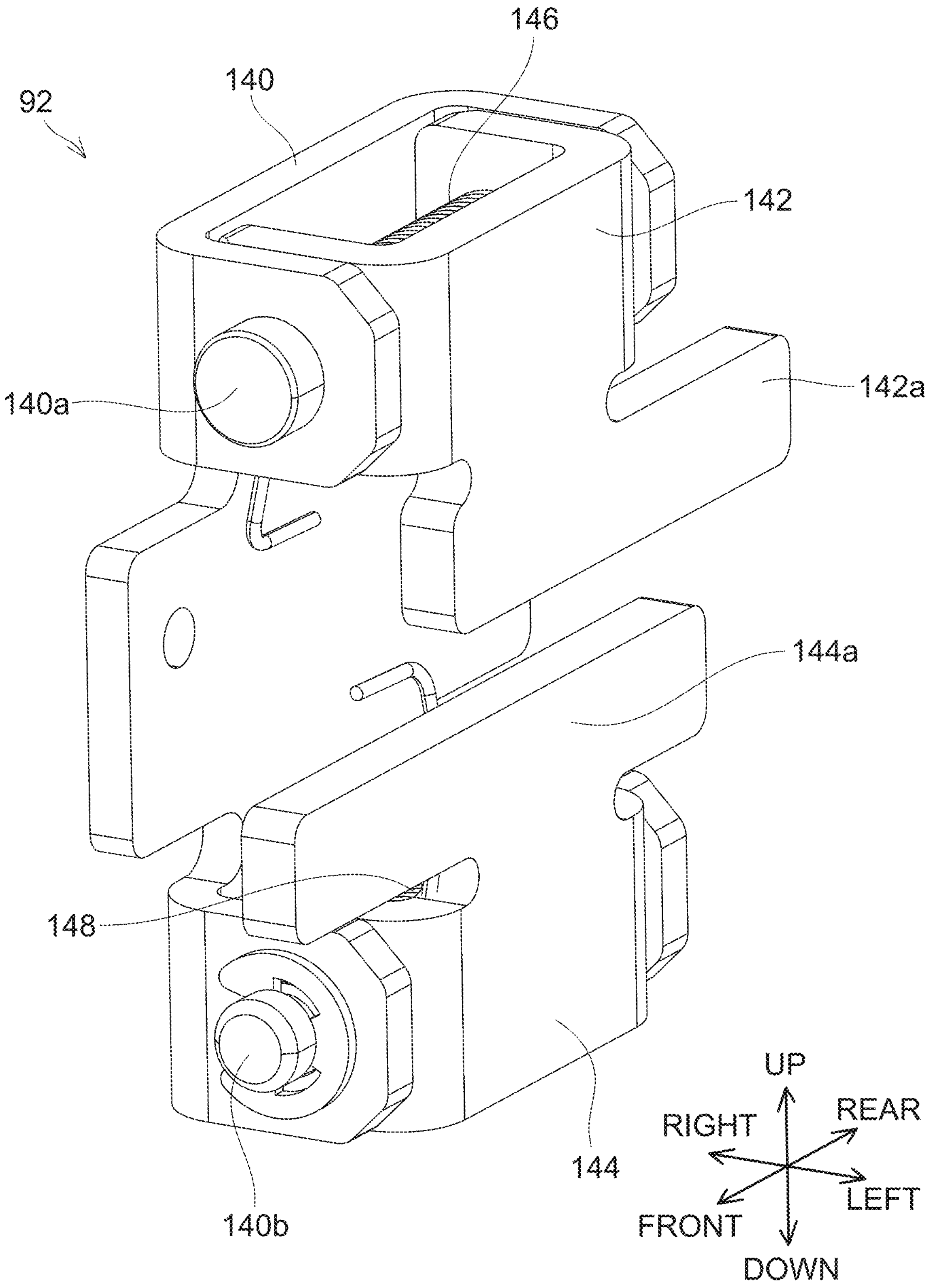
FIG. 17 is a perspective view of a rotation restrictor 92 according to the first embodiment.

The rotation restrictor 92 is disposed corresponding to the fins 138 of the outer sleeve 106. The rotation restrictor 92 is configured to permit or prohibit the rotation of the outer sleeve 106 in cooperation with the fins 138. As shown in FIG. 17, the rotation restrictor 92 comprises a base 140, an upper stopper 142, a lower stopper 144, and torsion springs 146, 148. The base 140 is fixed to the right housing 18 (see FIG. 1). The upper stopper 142 is swingably supported by an upper portion of the base 140 via a swing shaft 140*a*. The upper stopper 142 comprises a restriction piece 142*a*. The restriction piece 142*a* is disposed at a lower portion of the upper stopper 142. The torsion spring 146 biases the restriction piece 142*a* in an outwardly opening direction (i.e., in a direction that brings the restriction piece 142*a* away from the base 140). The lower stopper 144 is swingably supported by a lower portion of the base 140 via a swing shaft 140*b*. The lower stopper 144 comprises a restriction piece 144*a*. The restriction piece 144*a* is disposed at an upper portion of the lower stopper 144. A rear end of the restriction piece 144*a* is positioned forward of a rear end of the restriction piece 142*a*. The torsion spring 148 biases the restriction piece 144*a* in an outwardly opening direction (i.e., in a direction that brings the restriction piece 144*a* away from the base 140).

When the screw shaft 102 (see FIG. 10) is rotated counterclockwise as viewed from the rear by the twisting motor 86 (see FIG. 10) rotating forward, the rotation of the outer sleeve 106 is prohibited by the upper stopper 142 upon the restriction piece 142*a* contacting one of the fins 138 (see FIG. 16) of the outer sleeve 106. To the contrary, when the screw shaft 102 is rotated clockwise as viewed from the rear by the twisting motor 86 rotating in reverse, one of the fins 138 of the outer sleeve 106 contacts the restriction piece 142*a* and pushes in the restriction piece 142*a*. In this case, the upper stopper 142 does not prohibit the rotation of the outer sleeve 106.

When the screw shaft 102 is rotated counterclockwise as viewed from the rear by the twisting motor 86 rotating forward, one of the fins 138 of the outer sleeve 106 contacts the restriction piece 144*a* of the lower stopper 144 and pushes in the restriction piece 144*a*. In this case, the lower stopper 144 does not prohibit the rotation of the outer sleeve 106. To the contrary, when the screw shaft 102 is rotated clockwise as viewed from the rear, the rotation of the outer sleeve 106 is prohibited by the lower stopper 144 upon the restriction piece 144*a* contacting one of the fins 138 of the outer sleeve 106.

Next, operation of the rebar tying tool 2 shown in FIG. 1 will be described. The rebar tying tool 2 performs a tying operation when the trigger 12 is operated by the operator. During the tying operation by the rebar tying tool 2, a feeding process, a distal end retaining process, a pull-back process, a proximal end retaining process, a cutting process, a twisting process, and a returning process are performed.

Feeding Process

When the feeding motor 50 shown in FIG. 4 rotates forward (that is, rotates in the direction D1 shown in FIG. 4) in the initial state of the rebar tying tool 2, the feeding unit 38 feeds out the wire W on the reel 33 by a predetermined length. The distal end of the wire W passes through the fixed cutter 72, the movable cutter 74, the left wire passage 134, the guiding unit 40, and the right wire passage 132 in this order. As a result, the wire W is wound around the rebars R in a loop shape. The feeding motor 50 is stopped upon completion of the feed-out of the wire W.

Distal End Retaining Process

When the twisting motor 86 shown in FIG. 10 rotates forward after the completion of the feeding process, the screw shaft 102 rotates counterclockwise. At this occasion, the outer sleeve 106 is prohibited from rotating counterclockwise by the rotation restrictor 92. Thus, the outer sleeve 106 moves forward together with the inner sleeve 104 with respect to the clamp shaft 110, the right clamp 112 is brought into the fully-closed state, and the left clamp 114 is brought into the half-open state. The distal end of the wire W is thereby retained by the right clamp 112 and the clamp shaft 110. The twisting motor 86 is stopped when the retention of the distal end of the wire W is detected.

Pull-Back Process

When the feeding motor 50 shown in FIG. 4 rotates in reverse (that is, in the direction D2 shown in FIG. 4) after the completion of the distal end retaining process, the feeding unit 38 pulls back the wire \V wound around the rebars R. Since the distal end of the wire W is retained by the right clamp 112 and the clamp shaft 110, the diameter of the loop formed by the wire W around the rebars R is decreased. The feeding motor 50 is stopped upon completion of the pull-back of the wire W.

Proximal End Retaining Process

When the twisting motor 86 shown in FIG. 10 rotates forward after the completion of the pull-back process, the screw shaft 102 rotates counterclockwise. At this occasion, the outer sleeve 106 is prohibited from rotating counterclockwise by the rotation restrictor 92. Thus, the outer sleeve 106 further moves forward together with the inner sleeve 104 with respect to the clamp shaft 110 and the left clamp 114 is brought into the fully-closed state. The proximal end of the wire W is thereby retained by the left clamp 114 and the clamp shaft 110.

Cutting Process

Figure 8:
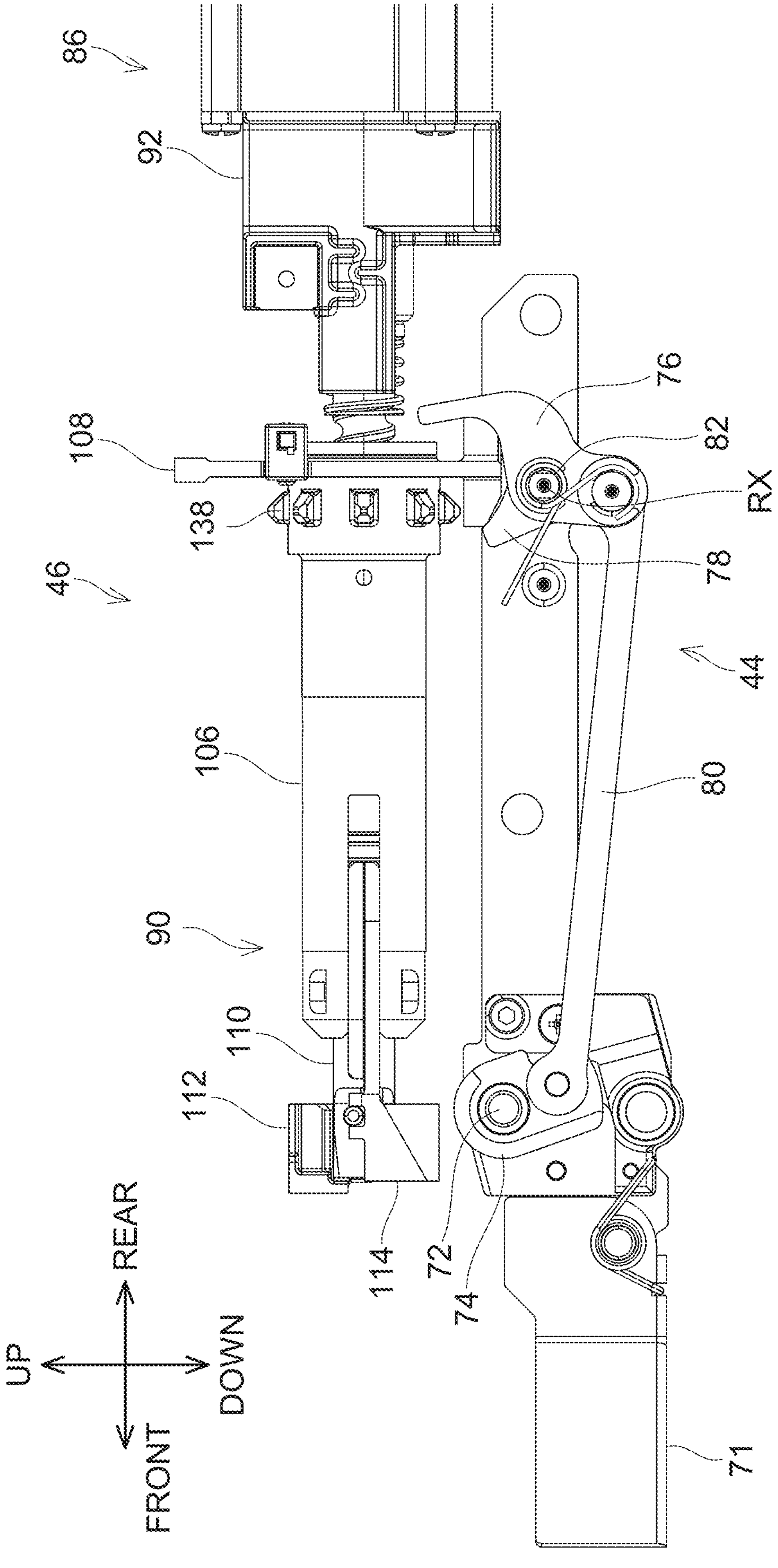
FIG. 8 is a side view of the cutter unit 44 according to the first embodiment, illustrating a state after the first lever 76 and the second lever 78 has pivoted.

When the twisting motor 86 shown in FIG. 10 further rotates forward after the completion of the proximal end retaining process, the screw shaft 102 rotates counterclockwise. At this occasion, the outer sleeve 106 is prohibited from rotating counterclockwise by the rotation restrictor 92. Thus, the outer sleeve 106 further moves forward together with the inner sleeve 104 with respect to the clamp shaft 110 and the push plate 108 pushes the upper end of the second lever 78 forward as shown in FIG. 8. As a result, the wire W is cut by the fixed cutter 72 and the movable cutter 74. The twisting motor 86 is stopped upon completion of the cutting of the wire W.

Twisting Process

When the twisting motor 86 shown in FIG. 10 further rotates forward after the completion of the cutting process, the screw shaft 102 rotates counterclockwise. At this occasion, the outer sleeve 106 is permitted to rotate counterclockwise by the rotation restrictor 92. Thus, the outer sleeve 106, the inner sleeve 104, the clamp shaft 110, the right clamp 112, and the left clamp 114 integrally rotate counterclockwise. The wire W wound around the rebars R is thereby twisted. The twisting motor 86 is stopped upon completion of the twisting of the wire W.

Returning Process

When the twisting motor 86 shown in FIG. 10 rotates in reverse after the completion of the twisting process, the screw shaft 102 rotates clockwise. At this occasion, the outer sleeve 106 is prohibited from rotating clockwise by the rotation restrictor 92. Thus, the outer sleeve 106 moves rearward together with the inner sleeve 104 with respect to the clamp shaft 110, the left clamp 114 is brought into the fully-open state through the half-open state, and the right clamp 112 is brought into the fully-open state. Thereafter, when the clockwise rotation is permitted by the rotation restrictor 92, the outer sleeve 106, the inner sleeve 104, the clamp shaft 110, the right clamp 112, and the left clamp 114 integrally rotate clockwise. When the long fin 138*b* contacts the lower stopper 144, the rotation of the outer sleeve 106 is prohibited again and thus the outer sleeve 106 moves rearward again together with the inner sleeve 104 with respect to the clamp shaft 110. The twisting motor 86 is stopped when the return of the twisting unit 46 to the initial state is detected.

For the rebar tying tool 2, the thickness of the wire W varies depending on diameters of rebars R to be used. Further, depending on the environment in which the rebars R are used, etc., a wire W coated by a coat (e.g., a resin material) or a plated wire W can be used. The type of the reel 33 (see FIG. 18) varies depending on the thickness of wire W, whether the wire W is coated or not, and/or whether the wire W is plated or not. Thus, the rebar tying tool 2 comprises a type detector 158 (see FIG. 18) for detecting the type of the reel 33.

Figure 18:
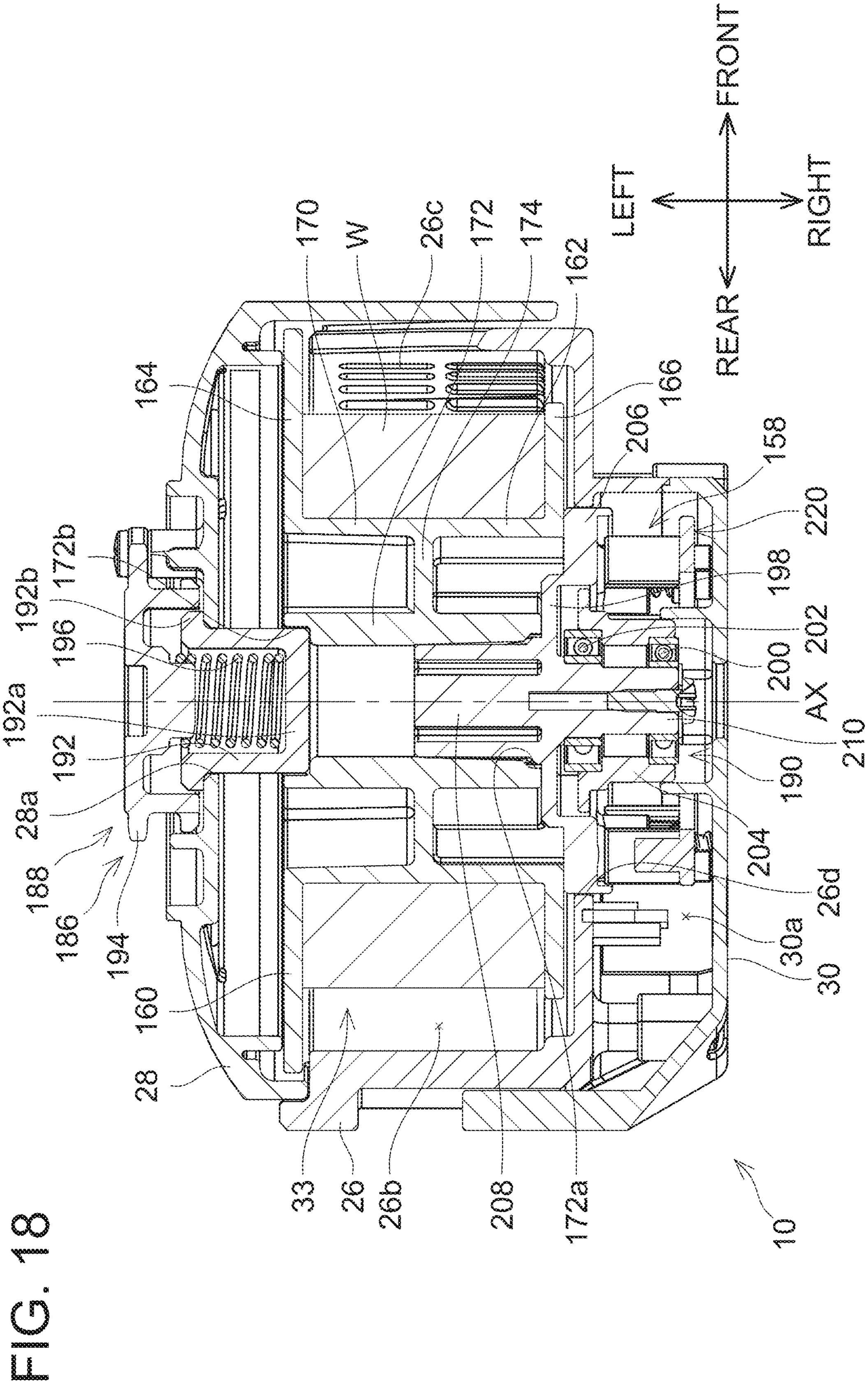
FIG. 18 is a cross-sectional view of the reel holder 10 and a reel 33 according to the first embodiment.

First, the reel 33 will be described. As shown in FIG. 18, the reel 33 is disposed in the housing space 26*b* of the reel holder 10. The reel 33 is supported by the reel holder 10 such that the reel 33 is rotatable about a rotation axis AX extending in the right-left direction. The reel 33 comprises a bobbin 160 and the wire W. The central axis of the bobbin 160 is coincident with the rotation axis AX of the reel 33.

Figure 19:
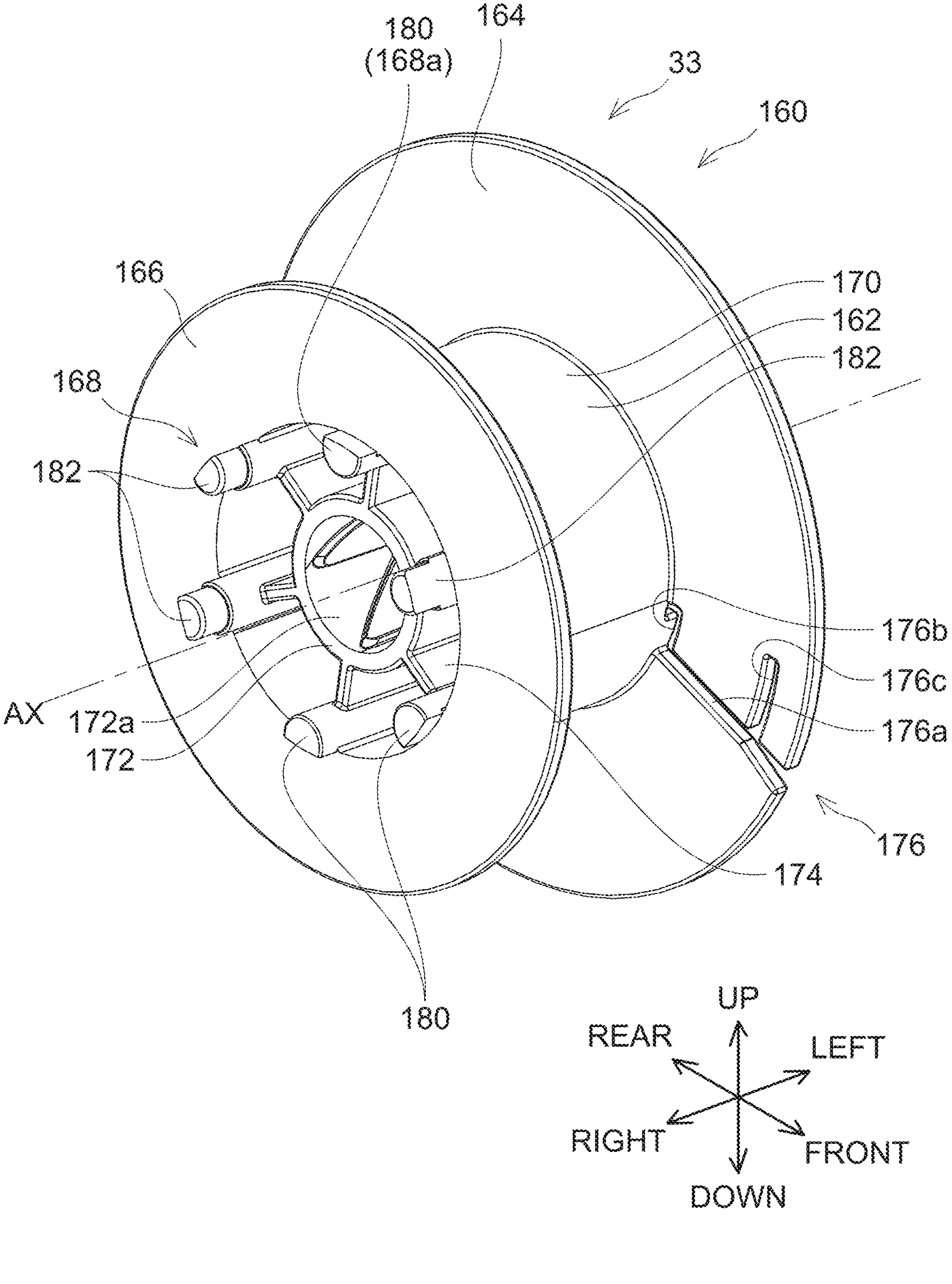
FIG. 19 is a perspective view of a bobbin 160 of the reel 33 according to the first embodiment.

As shown in FIG. 19, the bobbin 160 comprises a trunk 162, a pair of flanges 164, 166, and a plurality of projections 168 (six projections 168 in the present embodiment). Hereinafter, the pair of flanges 164, 166 may be separately termed a left flange 164 and a right flange 166. For example, the trunk 162, the pair of flanges 164, 166, and the six projections 168 are constituted of a resin material. The trunk 162, the pair of flanges 164, 166, and the six projections 168 are integral with each other.

The trunk 162 comprises an outer cylinder 170, an inner cylinder 172, and a connection 174. The outer cylinder 170 and the inner cylinder 172 have substantially cylindrical shapes. The wire W (see FIG. 18) is wound around an outer circumferential surface of the outer cylinder 170 in multiple layers. The inner cylinder 172 is disposed inside the outer cylinder 170. As shown in FIG. 18, an engagement groove 172*a* is defined in a right end portion of an inner circumferential surface of the inner cylinder 172. A shaft receiving groove 172*b* is defined in a left end portion of the inner circumferential surface of the inner cylinder 172. The connection 174 is disposed between an inner circumferential surface of the outer cylinder 170 and an outer circumferential surface of the inner cylinder 172. The connection 174 connects the outer cylinder 170 to the inner cylinder 172.

As shown in FIG. 19, the left flange 164 and the right flange 166 have broad annular shapes. The wire W (see FIG. 18) is disposed between the left flange 164 and the right flange 166. The left flange 164 is disposed at a left end of the trunk 162. The left flange 164 extends radially outward from the outer circumferential surface of the outer cylinder 170. The left flange 164 includes a lock groove 176 penetrating the left flange 164 in its thickness direction (in the right-left direction). The lock groove 176 comprises a guide portion 176*a* extending from an inner circumferential surface of the left flange 164 to an outer circumferential surface thereof, a base end locking portion 176*b* connected to the guide portion 176*a* near the inner circumferential surface of the left flange 164, and a terminal end locking portion 176*c* connected to the guide portion 176*a* near the outer circumferential surface of the left flange 164. One end of the wire W wound around the outer cylinder 170 is locked to the left flange 164 at the base end locking portion 176*b*. The other end of the wire \V wound around the outer cylinder 170 is locked to the left flange 164 at the terminal end locking portion 176*c*.

The right flange 166 is disposed at a right end of the trunk 162. The right flange 166 extends radially outward from the outer circumferential surface of the outer cylinder 170. The diameter of the outer circumferential surface of the right flange 166 is smaller than the diameter of the outer circumferential surface of the left flange 164.

The six projections 168 extend outward (rightward) along the rotation axis AX of the reel 33, beyond an outer surface (right surface) of the right flange 166, from between the inner circumferential surface of the outer cylinder 170 and the outer circumferential surface of the inner cylinder 172. The projections 168 each have a substantially semicircular column shape formed by dividing a cylindrical column into two. The six projections 168 are arranged at regular intervals around the rotation axis AX of the reel 33 (along a rotation direction of the reel 33). In the present embodiment, adjacent projections 168 are arranged at intervals corresponding to an angle of 60 degrees around the rotation axis AX of the reel 33.

The six projections 168 comprise three short projections 180 and three long projections 182. A length of the long projections 182 in their longitudinal direction is greater than a length of the short projections 180 in their longitudinal direction. The long projections 182 extend farther away from the outer surface (right surface) of the right flange 166 than the short projections 180 do. Starting from one projection 168 (which is termed a reference projection 168*a*) among the six projections 168, the three short projections 180 are arranged at a position of 0 degree, at a position of 120 degrees, and at a position of 180 degrees along the rotation direction of the reel 33. Further, starting from the reference projection 168*a*, the three long projections 182 are arranged at a position of 60 degrees, at a position of 240 degrees, and a position of 300 degrees along the rotation axis of the reel 33.

The number of the short projections 180, the number of the long projections 182, and the arrangement of the short projections 180 and the long projections 182 vary depending on types of reels 33. For example, in a reel 33 of another type, the six projections 168 comprise two short projections 180 and four long projections 182. Starting from the reference projection 168*a*, the two short projections 180 are arranged at the position of 0 degree and at the position of 180 degrees, and the four long projections 182 are arranged at the position of 60 degrees, at the position of 120 degrees, at the position of 240 degrees, and at the position of 300 degrees.

As shown in FIG. 18, the reel holder 10 further comprises a reel attaching part 186 for attaching the reel 33 such that the reel 33 is rotatable with respect to the reel holder 10. The reel attaching part 186 comprises a left reel attaching part 188 and a right reel attaching part 190.

The left reel attaching part 188 is attached to the main cover 28. The left reel attaching part 188 comprises a stopper 192, a cap 194, and a compression spring 196. The stopper 192 has a cylindrical shape and includes a bottom wall 192*a* at its right end. An insertion opening 28*a* is defined in the main cover 28 and the stopper 192 is inserted in the insertion opening 28*a* from the left. The stopper 192 comprises a flange 192*b* disposed at a left end of the stopper 192. The flange 192*b* can contact the main cover 28 from the left. Thereby, the stopper 192 is suppressed from falling out from the insertion opening 28*a* from the left toward the right. The cap 194 is fixed to a left surface of the main cover 28. The cap 194 suppresses the stopper 192 from falling out of the insertion opening 28*a* from the right toward the left. One end of the compression spring 196 is fixed to the cap 194 and the other end of the compression spring 196 is in contact with the bottom wall 192*a* of the stopper 192. When the main cover 28 is in the closed state with respect to the holder housing 26 and the reel 33 is in the housing space 26*b*, the compression spring 196 biases the stopper 192 toward the shaft receiving groove 172*b* defined in the inner cylinder 172 of the bobbin 160. The stopper 192 is received by the shaft receiving groove 172*b* and supports the inner cylinder 172 such that the inner cylinder 172 is slidable.

The right reel attaching part 190 comprises a turntable 198, bearings 200, 202, and a ring member 204.

Figure 20:
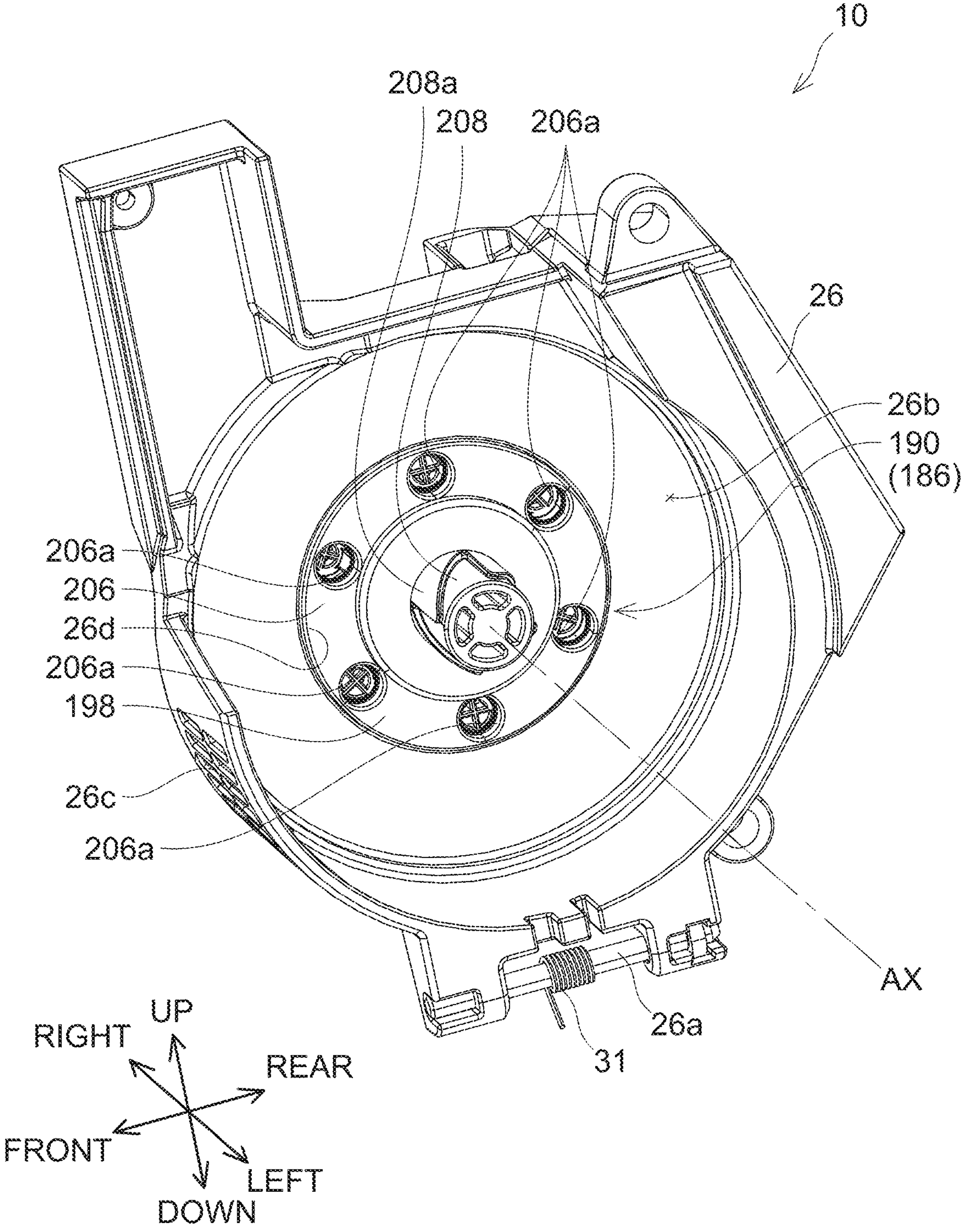
FIG. 20 is a perspective view of the reel holder 10 according to the first embodiment, illustrating a state where a main cover 28 is removed.

An insertion opening 26*d* is defined in a right surface of the holder housing 26 and the turntable 198 is inserted in the insertion opening 26*d*. In the insertion opening 26*d*, the turntable 198 is spaced from the holder housing 26. The turntable 198 is rotatable about a rotation axis extending in the right-left direction. The rotation axis of the turntable 198 is coincident with the rotation axis AX of the reel 33. The turntable 198 comprises a turntable body 206, an engagement member 208, and a shaft 210. The turntable body 206 has a substantially circular disk shape. As shown in FIG. 20, the turntable body 206 comprises a plurality of receivers 206*a* (six receivers 206*a* in the present embodiment). The number of the receivers 206*a* is equal to the number of the projections 168. The receivers 206*a* are circular in cross section. The receivers 206*a* penetrate the turntable body 206 in its thickness direction. The six receivers 206*a* are arranged at regular intervals around the rotation axis AX of the reel 33 (along the rotation direction of the reel 33). In the present embodiment, adjacent receivers 206*a* are arranged at intervals corresponding to an angle of 60 degrees around the rotation axis AX of the reel 33.

The engagement member 208 has a substantially cylindrical shape. The engagement member 208 extends leftward from a left surface of the turntable body 206. The engagement member 208 includes an engagement wall 208*a* around its outer circumferential surface. As shown in FIG. 18, when the reel 33 is in the housing space 26*b*, the engagement member 208 is inserted in the inner cylinder 172 of the bobbin 160 from the right. In this state, the engagement wall 208*a* (see FIG. 20) is engaged with the engagement groove 172*a* of the inner cylinder 172. The reel 33 is thus fixed to the turntable 198.

The shaft 210 extends rightward from a right surface of the turntable body 206. The shaft 210 has a substantially cylindrical shape.

Figure 21:
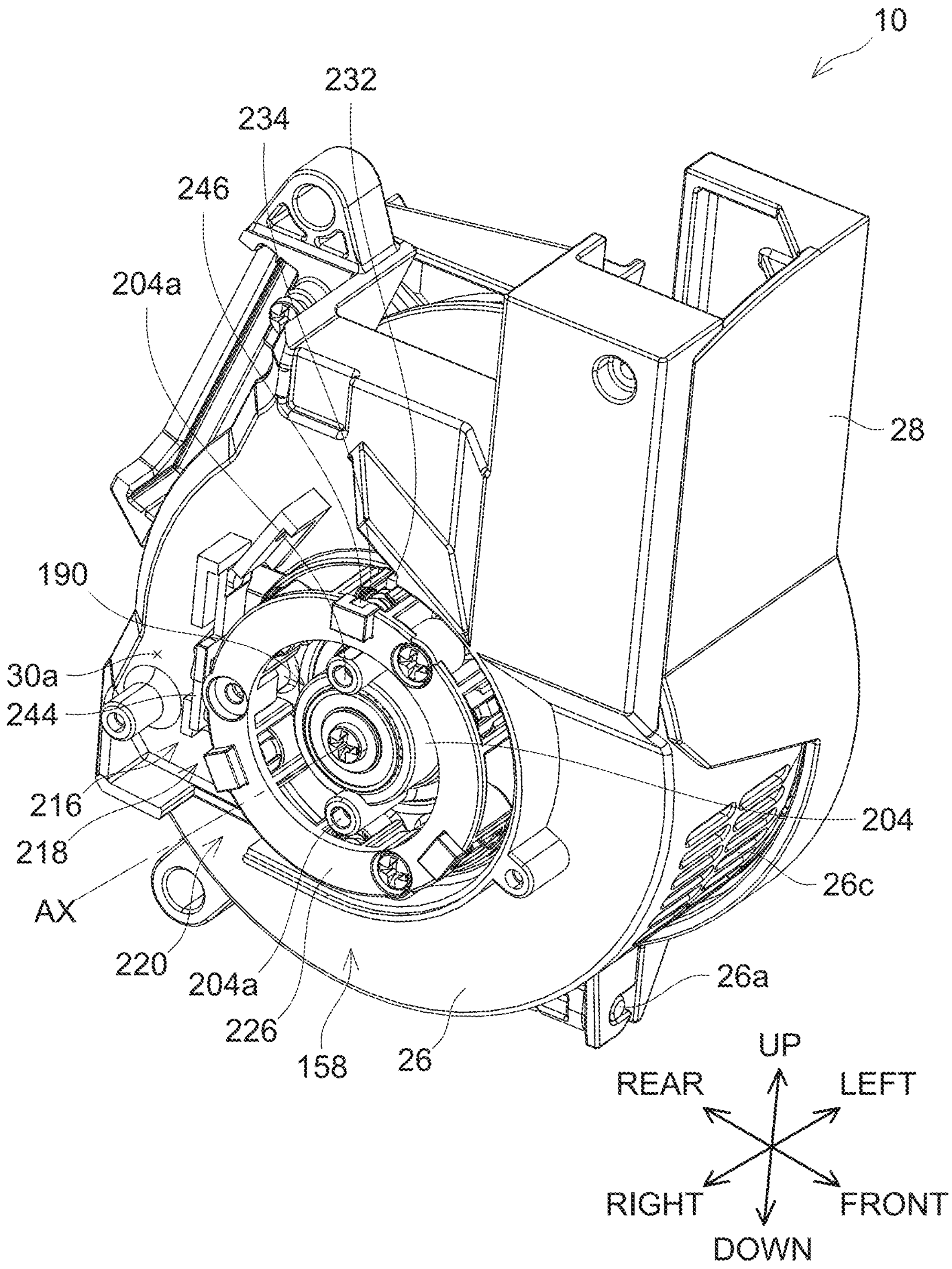
FIG. 21 is a perspective view of the reel holder 10 according to the first embodiment, illustrating a state where an auxiliary cover 30 is removed.

The ring member 204 is disposed in the auxiliary space 30*a*. The ring member 204 surrounds an outer circumferential surface of the shaft 210 in its circumferential direction. The ring member 204 supports the shaft 210 via the bearings 200, 202 such that the shaft 210 is rotatable. As shown in FIG. 21, the ring member 204 includes two screw holes 204*a*. The ring member 204 is fixed to the auxiliary cover 30 (see FIG. 18) by screws (not shown) being screwed in the screw holes 204*a*. Thus, the turntable 198 is rotatably supported by the auxiliary cover 30 via the ring member 204 and the bearings 200, 202.

Next, the type detector 158 will be described. As shown in FIG. 21, the type detector 158 comprises a type detecting unit 216 and a rotation detecting unit 218. The type detecting unit 216 comprises a type detecting device 220 and a type-detecting magnetic sensor 222 (see FIG. 25).

Figure 22:
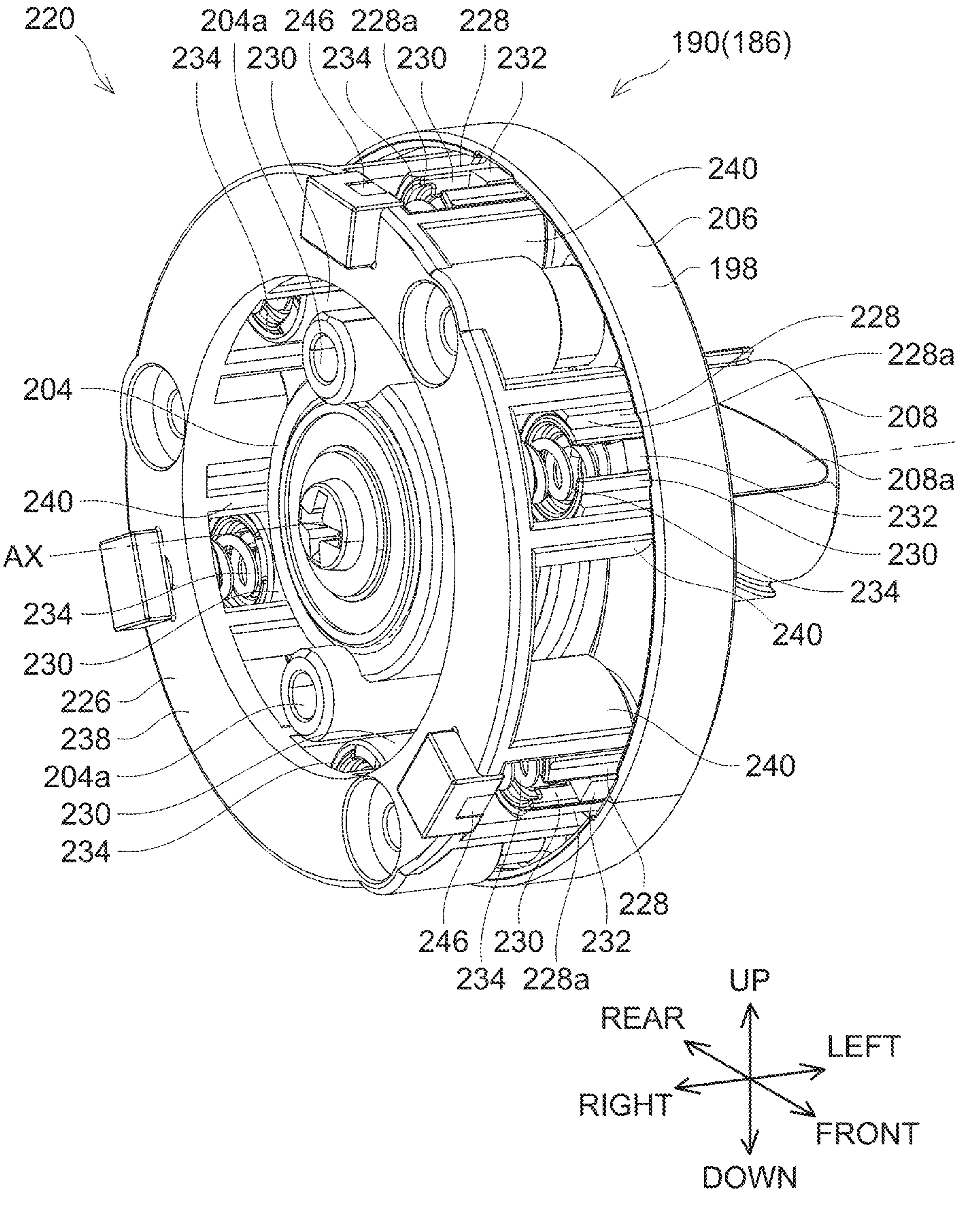
FIG. 22 is a perspective view of a right reel attaching part 190 and a type detecting device 220 according to the first embodiment.

As shown in FIG. 22, the type detecting device 220 is fixed to the turntable 198. The type detecting device 220 comprises a cover member 226, a plurality of support members 228 (six support members 228 in the present embodiment), a plurality of movable members 230 (six movable members 230 in the present embodiment), a plurality of type-detecting magnets 232 (six type-detecting magnets 232 in the present embodiment), and a plurality of compression springs 234 (six compression springs 234 in the present embodiment).

Figure 23:
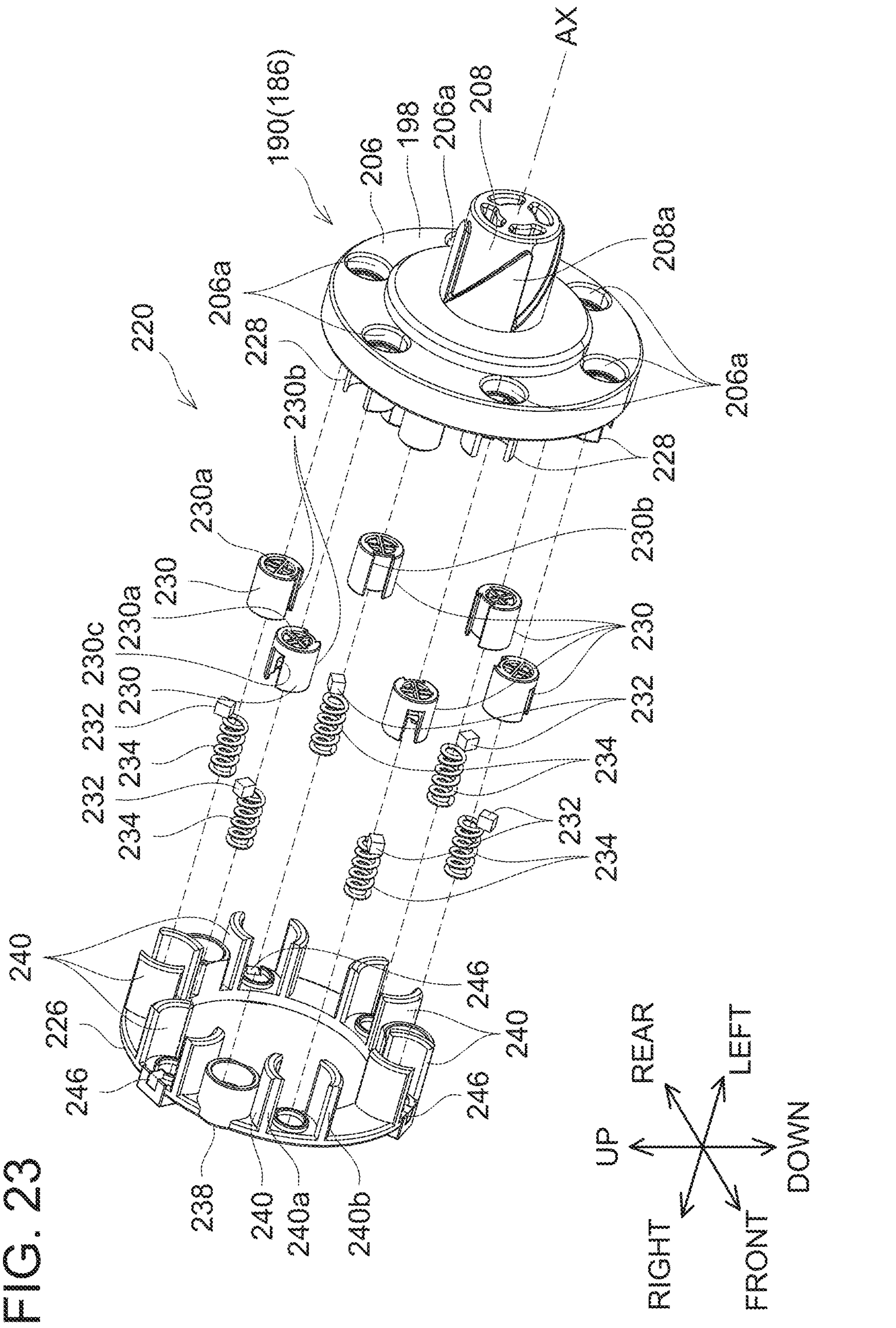
FIG. 23 is an exploded perspective view of a turntable 198 and the type detecting device 220 according to the first embodiment.

As shown in FIG. 23, the cover member 226 comprises a base 238 and a plurality of holding members 240 (six holding members 240 in the present embodiment). The base 238 has a circular disk shape and includes an opening at the center. The central axis of the base 238 is coincident with the rotation axis AX of the reel 33. The six holding members 240 extend leftward from a left surface of the base 238. The holding members 240 each comprise a pair of holding walls 240*a*, 240*b* opposing each other. The six holding members 240 are arranged at regular intervals around the rotation axis AX of the reel 33 (along the rotation direction of the reel 33). In the present embodiment, adjacent holding members 240 are arranged at intervals corresponding to an angle of 60 degrees around the rotation axis AX of the reel 33.

Figure 24:
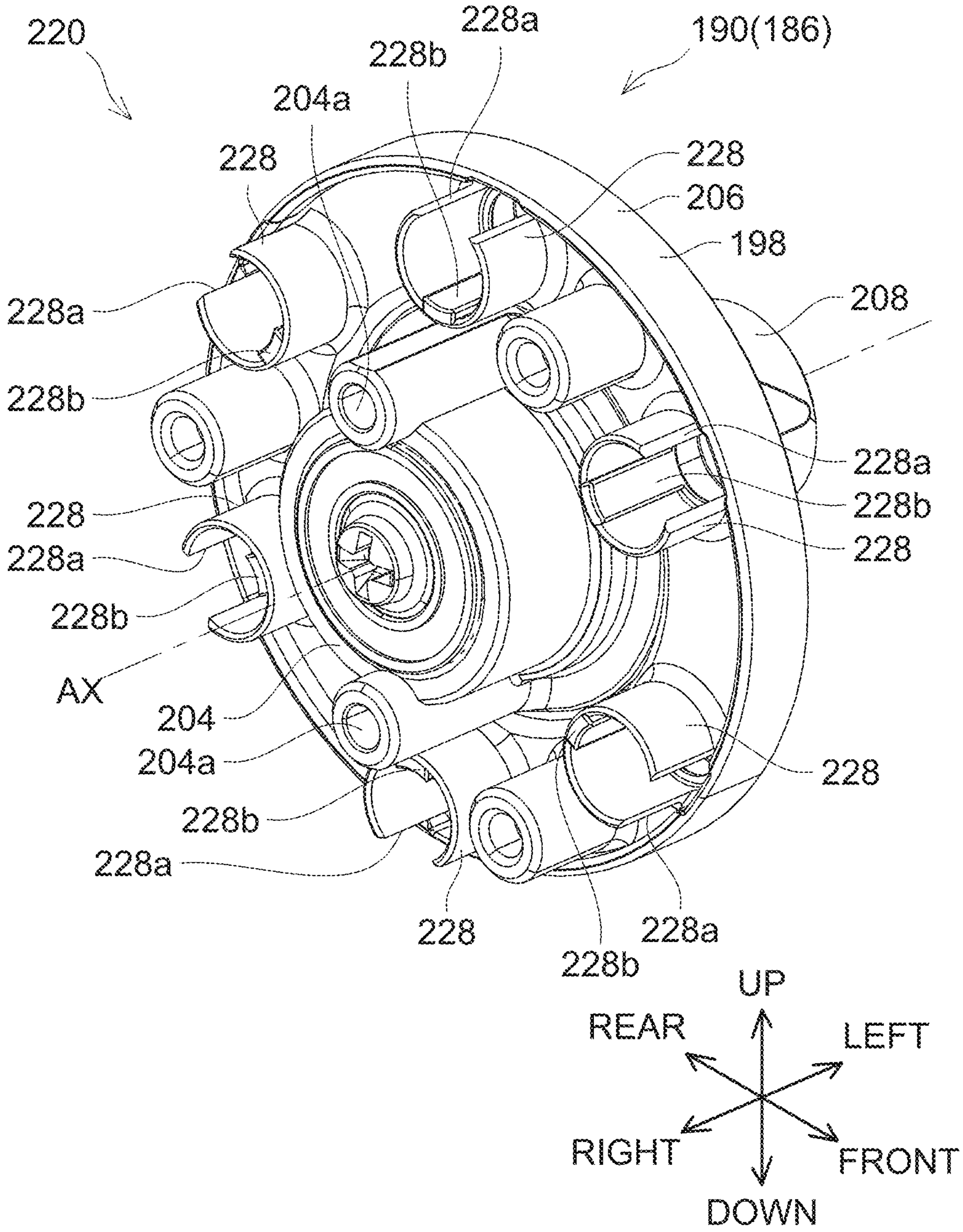
FIG. 24 is a perspective view of the right reel attaching part 190 and support members 228 according to the first embodiment.

As shown in FIG. 24 the six support members 228 are integral with the turntable 198. The six support members 228 extend rightward from the right surface of the turntable body 206. The support members 228 are disposed at peripheral edges of the receivers 206*a* (see FIG. 20) of the turntable body 206. The support members 228 have a cylindrical shape that is partially interrupted in the circumferential direction. The support members 228 each comprise a notch 228*a* corresponding to the partial interruption in the circumferential direction and an inner projection 228*b* opposing the notch 228*a*. The notches 228*a* are disposed outward of the inner projections 228*b* in a radial direction of the turntable body 206. The six support members 228 are arranged to surround the ring member 204. The six support members 228 are arranged at regular intervals around the rotation axis AX of the reel 33 (along the rotation direction of the reel 33). In the present embodiment, adjacent support members 228 are arranged at intervals corresponding to an angle of 60 degrees around the rotation axis AX of the reel 33.

The movable members 230 shown in FIG. 23 are supported by the support members 228 such that the movable members 230 are slidable in the right-left direction. The movable members 230 are disposed within the support members 228. The movable members 230 each have a substantially cylindrical shape and include a bottom wall 230*a* at its left end. The movable members 230 each include a receiver groove 230*b* extending from its right end toward the bottom wall 230*a* and a fixture groove 230*c*. The receiver groove 230*b* and the fixture groove 230*c* are arranged at intervals corresponding to an angle of 180 degrees in a circumferential direction of an outer circumferential surface of each movable member 230. The receiver grooves 230*b* receive the inner projections 228*b* (see FIG. 24) of the support members 228. Thus, the movable members 230 are suppressed from rotating. The type-detecting magnets 232 are fitted in the fixture grooves 230*c*. Thus, the type-detecting magnets 232 are fixed to the movable members 230.

Each compression spring 234 is disposed between the pair of holding walls 240*a*, 240*b* of its corresponding holding member 240. One end of each compression spring 234 is in contact with the base 238 and the other end thereof is in contact with the bottom wall 230*a* of its corresponding movable member 230. The compression springs 234 bias the movable members 230 in a direction away from the base 238 toward an initial position. Thus, the movable members 230 are slidable between the initial position and a specific position. Here, the initial position means the position of the movable members 230 in the state where the reel 33 is not attached in the reel holder 10.

Figure 25:
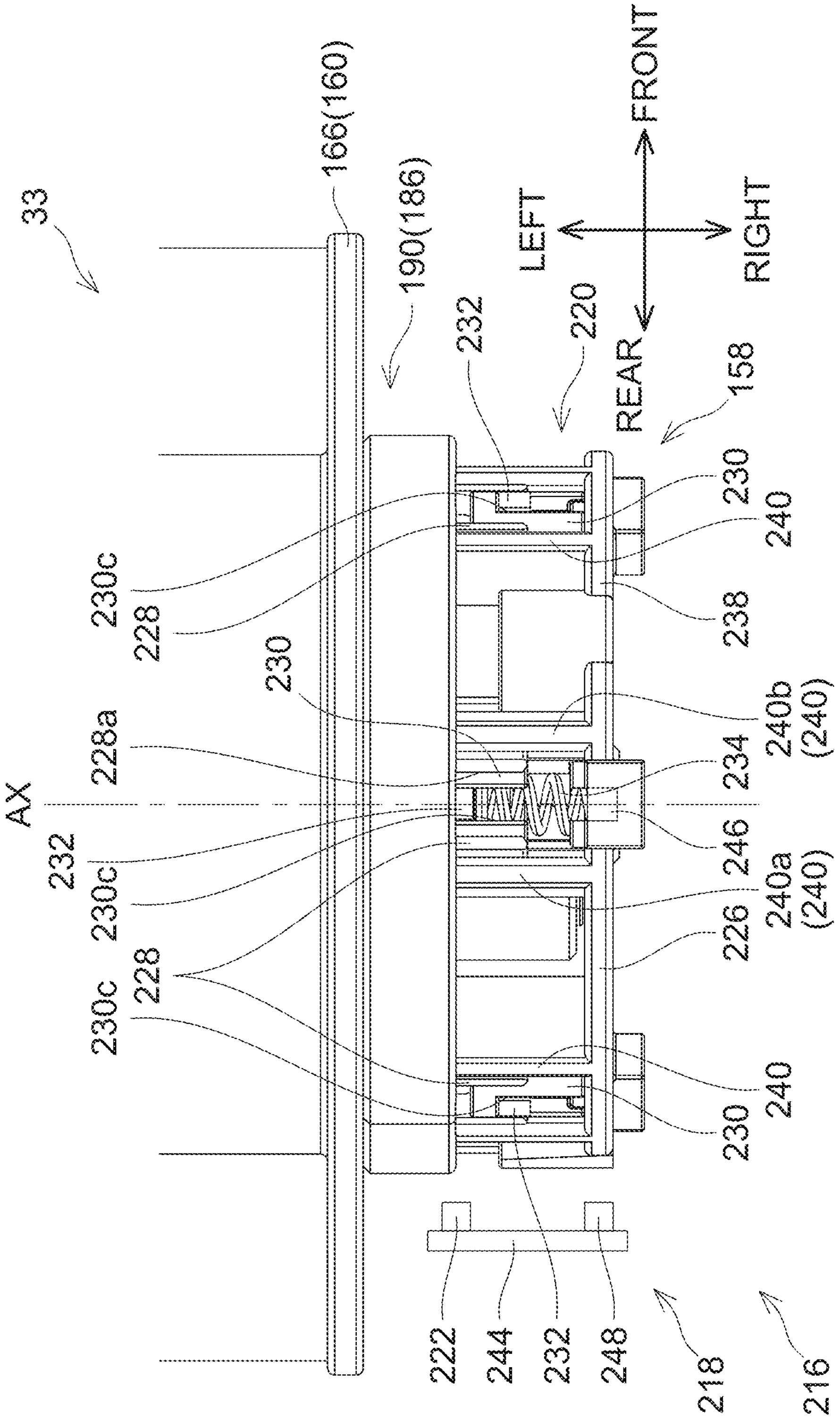
FIG. 25 is a top view of the reel 33, a type detector 158, and the right reel attaching part 190 according to the first embodiment.

As shown in FIG. 25, the type-detecting magnetic sensor 222 is fixed to a sensor substrate 244. The sensor substrate 244 faces the type detecting device 220. The type-detecting magnetic sensor 222 is electrically connected to the control circuit board 36 (see FIG. 3) via a wire which is not shown.

Figure 26:
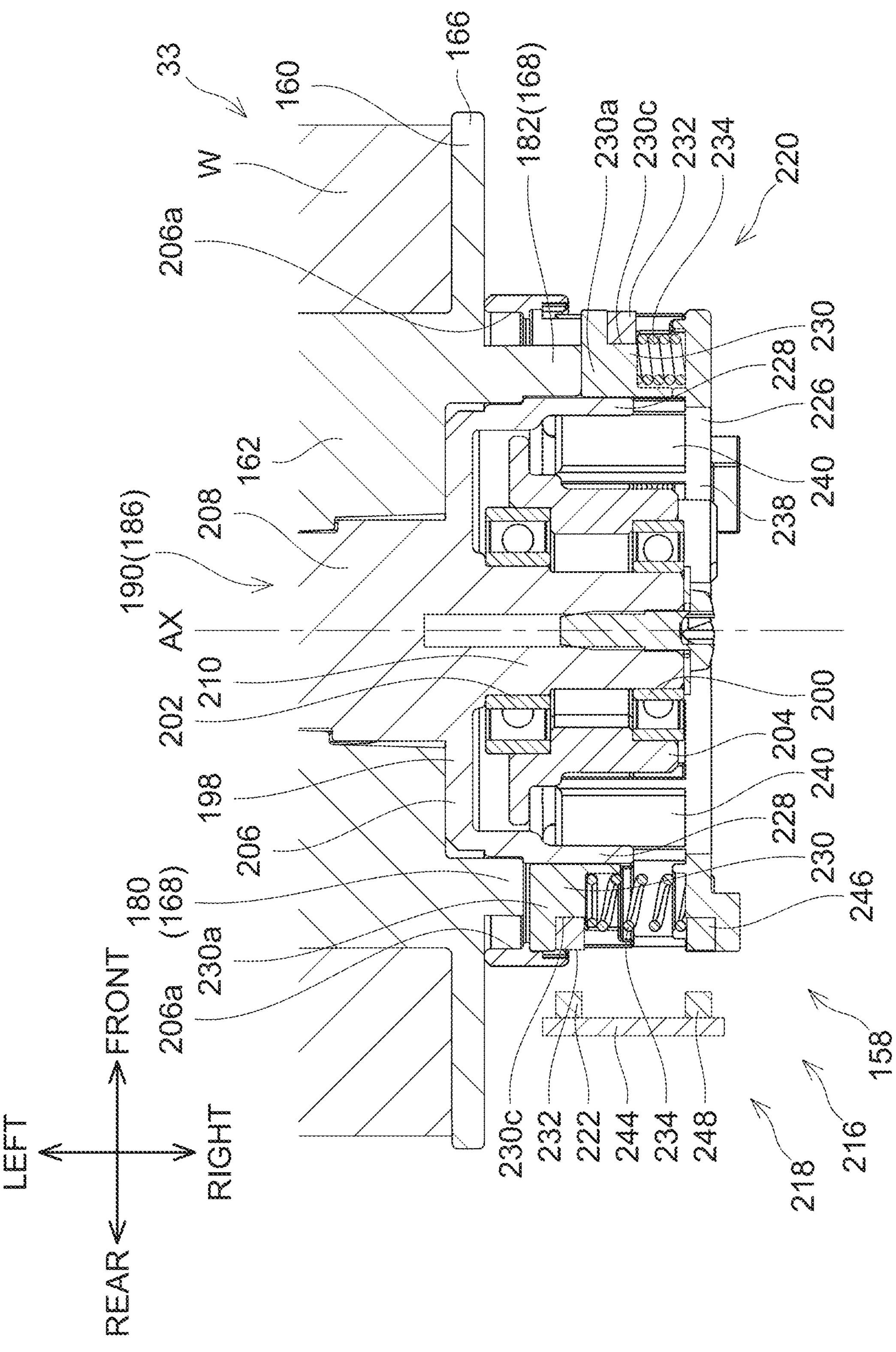
FIG. 26 is a cross-sectional view of the reel 33, the type detector 158, and the right reel attaching part 190 according to the first embodiment.

The rotation detecting unit 218 shown in FIG. 26 comprises a plurality of rotation-detecting magnets 246 (three rotation-detecting magnets 246 in the present embodiment) and a rotation-detecting magnetic sensor 248. The rotation-detecting magnets 246 are fixed to the base 238. The three rotation-detecting magnets 246 are arranged at regular intervals along a circumferential direction of an outer circumferential surface of the base 238 (around the rotation axis AX of the reel 33). In the present embodiment, adjacent rotation-detecting magnets 246 are arranged at intervals corresponding to an angle of 120 degrees along the circumferential direction of the outer circumferential surface of the base 238.

The rotation-detecting magnetic sensor 248 is fixed to the sensor substrate 244. The rotation-detecting magnetic sensor 248 is electrically connected to the control circuit board 36 (see FIG. 3) via a wire which is not shown. The rotation-detecting magnetic sensor 248 is aligned with the type-detecting magnetic sensor 222 in a direction along the rotation axis AX of the reel 33. When one of the rotation-detecting magnets 246 comes to a position corresponding to the rotation-detecting magnetic sensor 248, the rotation-detecting magnetic sensor 248 detects the rotation-detecting magnet 246.

Next, a method of detecting the type of the reel 33 will be described. First, in the state where the main cover 28 (see FIG. 18) of the reel holder 10 is open, the projections 168 (see FIG. 26) of the reel 33 are inserted into corresponding receivers 206*a* (see FIG. 26) of the turntable 198. Thus, the projections 168 engage with the receivers 206*a*. Then, the main cover 28 is closed and the lock lever 32 (see FIG. 1) is pivoted to maintain the main cover 28 in the closed state. As a result, as shown in FIG. 18, the engagement wall 208*a* (see FIG. 20) of the engagement member 208 of the turntable 198 engages with the engagement groove 172*a* and the stopper 192 is received into the shaft receiving groove 172*b* of the reel 33. In this way, the reel 33 is attached to the reel attaching part 186 such that the reel 33 is rotatable with respect to the holder housing 26.

As shown in FIG. 26, as the reel 33 is attached to the reel attaching part 186, the three long projections 182 push corresponding movable members 230 to an attaching position from the initial position. In the direction along the rotation axis AX of the reel 33, the attaching position is closer to the base 238 of the cover member 226 than the initial position is. The attaching position may vary depending on the types of reels 33. As the movable members 230 are pushed to the attaching position, the type-detecting magnets 232 are also pushed. In the state where the movable members 230 are at the attaching position, the type-detecting magnets 232 do not face the type-detecting magnetic sensor 222 even when the reel 33 rotates (see the movable member 230 on the front in FIG. 26). On the other hand, since the length of the short projections 180 is shorter than the length of the long projections 182, the three short projections 180 do not contact corresponding movable members 230 even when the reel 33 is attached to the reel attaching part 186. These movable members 230 are not pushed by the short projections 180 and thus maintained at the initial position by the biasing force of the compression springs 234. In the state where the movable members 230 are at the initial position, the type-detecting magnets 232 come to face the type-detecting magnetic sensor 222 when the reel 33 rotates (see the movable member 230 on the rear in FIG. 26). Since the number of the short projections 180, the number of the long projections 182, and the arrangement of the short projections 180 and the long projections 182 vary depending on the types of reels 33, the number of the movable members 230 that are pushed to the attaching position varies depending on the types of reels 33.

Next, the control circuit board 36 (see FIG. 3) executes a type detecting process for detecting the type of the reel 33. The control circuit board 36 executes the type detecting process in response to detecting that the main cover 28 is in the closed state via a closed state detecting sensor (not shown) attached to the holder housing 26. The type detecting process is executed, for example, when the reel 33 is attached to the reel holder 10 of a newly purchased rebar tying tool 2 and/or when a new reel 33 is attached to the reel holder 10 in replacement of the used reel 33. The type detecting process is different from the tying operation of tying the rebars R with the wire W.

Figure 27:
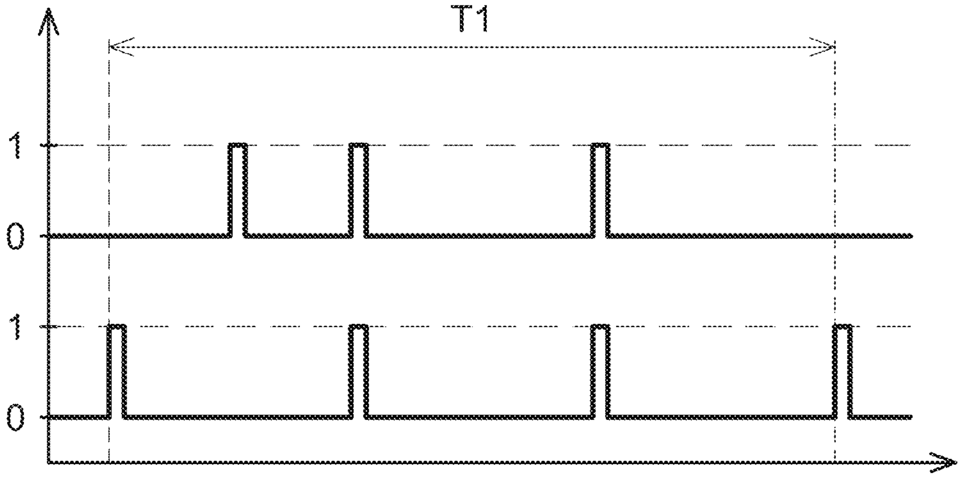
FIG. 27 illustrates signal charts detected by a type-detecting magnetic sensor 222 and a rotation-detecting magnetic sensor 248.

When the control circuit board 36 rotates the feeding motor 50 (see FIG. 4) forward (in the direction D1 in FIG. 4), the reel 33 thereby rotates. With the rotation of the reel 33, the type detecting device 220 and the rotation-detecting magnets 246 integrally rotate with the turntable 198. Every time each movable member 230 at the initial position passes a position facing the type-detecting magnetic sensor 222, the type-detecting magnetic sensor 222 detects the type-detecting magnet 232, for example, by detecting a magnetic variation. The control circuit board 36 detects that the type-detecting magnets 232 were detected. Further, every time each rotation-detecting magnet 246 passes a position facing the rotation-detecting magnetic sensor 248, the rotation-detecting magnetic sensor 248 detects the rotation-detecting magnet 246, for example, by detecting a magnetic variation. The control circuit board 36 detects that the rotation-detecting magnets 246 were detected. The control circuit board 36 detects signal charts shown in FIG. 27 as the reel 33 rotates. In FIG. 27, the upper signal chart depicted with a solid line is a signal chart associated with the detection of the type-detecting magnets 232, and the lower signal chart depicted with a solid line is a signal chart associated with the detection of the rotation-detecting magnets 246. In the example of FIG. 27, signal strength indicates "1" for when the type-detecting magnet 232 is detected and when the rotation-detecting magnet 246 is detected, whereas the signal strength indicates "0" for when the type-detecting magnet 232 is not detected and when the rotation-detecting magnet 246 is not detected.

Upon when the signal strength "1" takes place three times after the signal strength "1" took place for the first time in the signal chart associated with the detection of the rotation-detecting magnets 246, the control circuit board 36 determines that the reel 33 has rotated once and stops the feeding motor 50. The control circuit board 36 determines that the feeding motor 50 stops when the number of rotations of the feeding motor 50 is decreased to or less than a predetermined number of rotations (e.g., 0). Then, the control circuit board 36 specifies a shape of the signal chart associated with the detection of the type-detecting magnets 232 within a time period T1 in FIG. 27. The control circuit board 36 then specifies a reference signal chart that matches the specified shape of the signal chart. Since the movable members 230 pushed to the attaching position varies depending on the types of reels 33, the shape of the reference signal chart varies depending on the types of reels 33. The control circuit board 36 stores a plurality of reference signal charts corresponding to types of reels 33. The control circuit board 36 specifies the type of the reel 33 based on the specified reference signal chart. Then, the control circuit board 36 sets conditions for tying the rebars R with the wire W using the rebar tying tool 2 according to the specified type of the reel 33. Finally, the control circuit board 36 rotates the feeding motor 50 in reverse (in the direction D2 in FIG. 4) to pull back the wire W toward the reel 33.

The rebar tying tool 2 comprises the reel 33 comprising the bobbin 160 and the wire W wound around the bobbin 160; the reel attaching part 186 to which the reel 33 is rotatably attached; the feeding unit 38 configured to feed the wire W from the bobbin 160 around the rebars R; the twisting unit 46 configured to twist the wire W around the rebars R; the type detector 158 configured to detect the type of the reel 33; and the support 15 supporting the reel attaching part 186, the feeding unit 38, the twisting unit 46, and the type detector 158. The type detector 158 comprises the movable members 230 configured to move with respect to the support 15. The movable members 230 are at the initial position when the reel 33 is not attached to the reel attaching part 186. The movable members 230 are at the attaching position according to the type of the reel when the reel 33 is attached to the reel attaching part 186.

According to the configuration above, the type of the reel 33 is detected based on the position of the movable members 230. A contact sensor and/or a contactless sensor other than the photointerrupter can be used to detect the position of the movable members 230. The configuration thus allows for detection of the type of the reel 33 and a reduced number of photointerrupters.

Further, the rebar tying tool 2 comprises the reel attaching part 186 to which the reel 33 is rotatably attached, wherein the reel 33 comprises the bobbin 160 and the wire W wound around the bobbin 160; the feeding unit 38 configured to feed the wire W from the bobbin 160 around the rebars R; the twisting unit 46 configured to twist the wire W around the rebars R; the type detector 158 configured to detect the type of the reel 33; and the support 15 supporting the reel attaching part 186, the feeding unit 38, the twisting unit 46, and the type detector 158. The type detector 158 comprises the movable members 230 configured to move with respect to the support 15. The movable members 230 are at the initial position when the reel 33 is not attached to the reel attaching part 186. The movable members 230 are at the attaching position according to the type of the reel 33 when the reel 33 is attached to the reel attaching part 186.

The configuration above can achieve the same effects as those of the rebar tying tool 2 above.

Further, the reel 33 comprises the bobbin 160 and the wire W wound around the bobbin 160. The reel 33 is used by being rotatably attached to the reel attaching part 186 of the rebar tying tool 2. The rebar tying tool 2 comprises the type detector 158 configured to detect the type of the reel 33 and the support 15 supporting the reel attaching part 186 and the type detector 158. The type detector 158 comprises the movable members 230 configured to move with respect to the support 15. The movable members 230 are at the initial position when the reel 33 is not attached to the reel attaching part 186. The bobbin 160 is configured to move the movable members 230 to the attaching position according to the type of the reel 33 when the reel 33 is attached to the reel attaching part 186.

According to the configuration above, when the reel 33 is attached to the reel attaching part 186 of the rebar tying tool 2, the type of the reel 33 is detected based on the position of the movable members 230. A contact sensor and/or a contactless sensor other than the photointerrupter can be used to detect the position of the movable members 230. The configuration thus enables the rebar tying tool 2 to detect the type of the reel 33 and allows for a reduced number of photointerrupters used in the rebar tying tool 2.

Further, the reel attaching part 186 comprises the turntable 198 rotatably supported by the support 15. The bobbin 160 is fixed to the turntable 198 when the reel 33 is attached to the reel attaching part 186.

According to the configuration above, since the turntable 198 is supported by the support 15, there is no need to attach/detach the turntable 198 to/from the support 15. Thus, displacement of the rotation axis of the turntable 198 can be suppressed. Displacement of the rotation axis AX of the reel 33 thus can be suppressed.

Further, the bobbin 160 comprises the trunk 162 around which the wire W is wound; the flange 166 disposed at one end of the trunk 162; and the long projections 182 that project outward beyond the outer surface of the flange 166 along the rotation axis AX of the reel 33. The turntable 198 comprises the receivers **206*a* configured to receive and engage with the long projections 182**.

According to the configuration above, the reel 33 can be fixed to the turntable 198 with a simple configuration.

Further, the long projections 182 push the movable members 230 from the initial position toward the attaching position when the long projections 182 are received in the receivers **206*a***.

According to the configuration above, the movable members 230 can be moved from the initial position to the attaching position, using the long projections 182 for attaching the reel 33 to the reel attaching part 186.

Further, the movable members 230 are supported by the turntable 198 such that the movable members 230 are movable between the initial position and the attaching position.

If the movable members 230 are not supported by the turntable 198 and thus do not integrally rotate with the reel 33, this complicates the configuration of the reel attaching part 186. According to the configuration above, such a complicated configuration of the reel attaching part 186 can be suppressed.

Further, the type detector 158 further comprises the type-detecting magnets 232 fixed to the movable members 230 and the type-detecting magnetic sensor 222 fixed to the support 15 and configured to detect whether the movable members 230 are at the attaching position by detecting the type-detecting magnets 232.

According to the configuration above, the type-detecting magnetic sensor 222 detects whether the movable members 230 are at the attaching position or not, for example, by detecting magnetic variations due to the type-detecting magnets 232. Whether the movable members 230 are at the attaching position or not can be detected with less or no influence of contamination by foreign matters and scattering light, as compared with using a photointerrupter.

Further, the type detector 158 further comprises the compression springs 234 configured to bias the movable members 230 toward the initial position.

According to the configuration above, the movable members 230 can be returned to the initial position when the reel 33 is detached from the reel attaching part 186.

Further, the type detector 158 further comprises the rotation detecting unit 218 configured to detect a rotation angle of the reel 33.

According to the configuration above, the type detector 158 can be used to detect not only the type of the reel 33 but also the rotation of the reel 33.

Further, the rotation detecting unit 218 comprises the rotation-detecting magnets 246 fixed to the movable members 230 and the rotation-detecting magnetic sensor 248 fixed to the support 15 and configured to detect the rotation angle of the reel 33 by detecting the rotation-detecting magnets 246.

According to the configuration above, the rotation-detecting magnetic sensor 248 detects the rotation angle of the reel 33, for example, by detecting magnetic variations due to the rotation-detecting magnets 246. The rotation angle of the reel 33 can be detected with less or no influence of contamination by foreign matters and scattering light, as compared with using a photointerrupter.

Correspondence Relationships

The long projections 182 are an example of "projection". The compression springs 234 are an example of "biasing member". The rotation detecting unit 218 is an example of "rotation detector".

Second Embodiment

Figure 28:
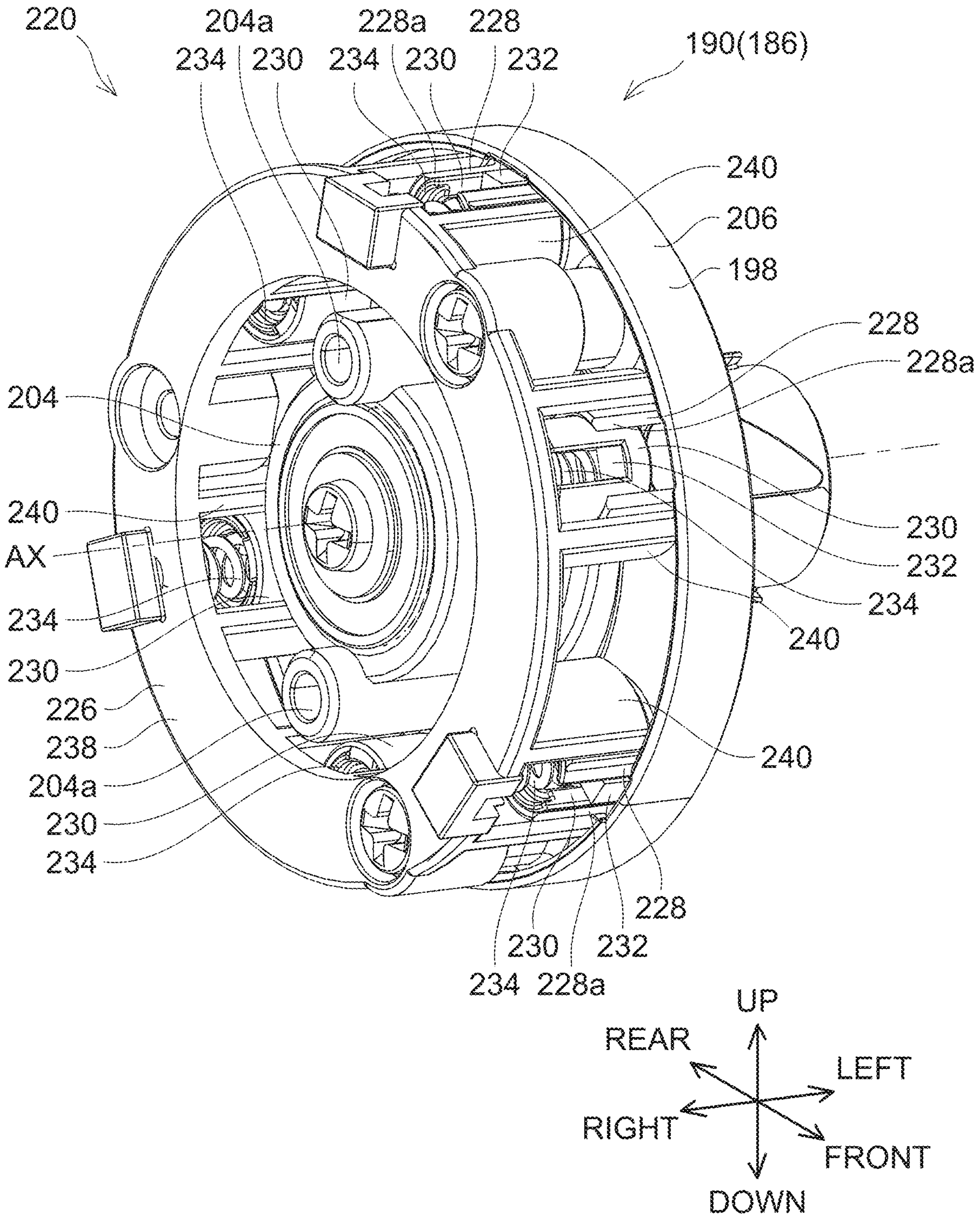
FIG. 28 is a perspective view of a right reel attaching part 190 and a type detecting device 220 according to a second embodiment.
Figure 29:
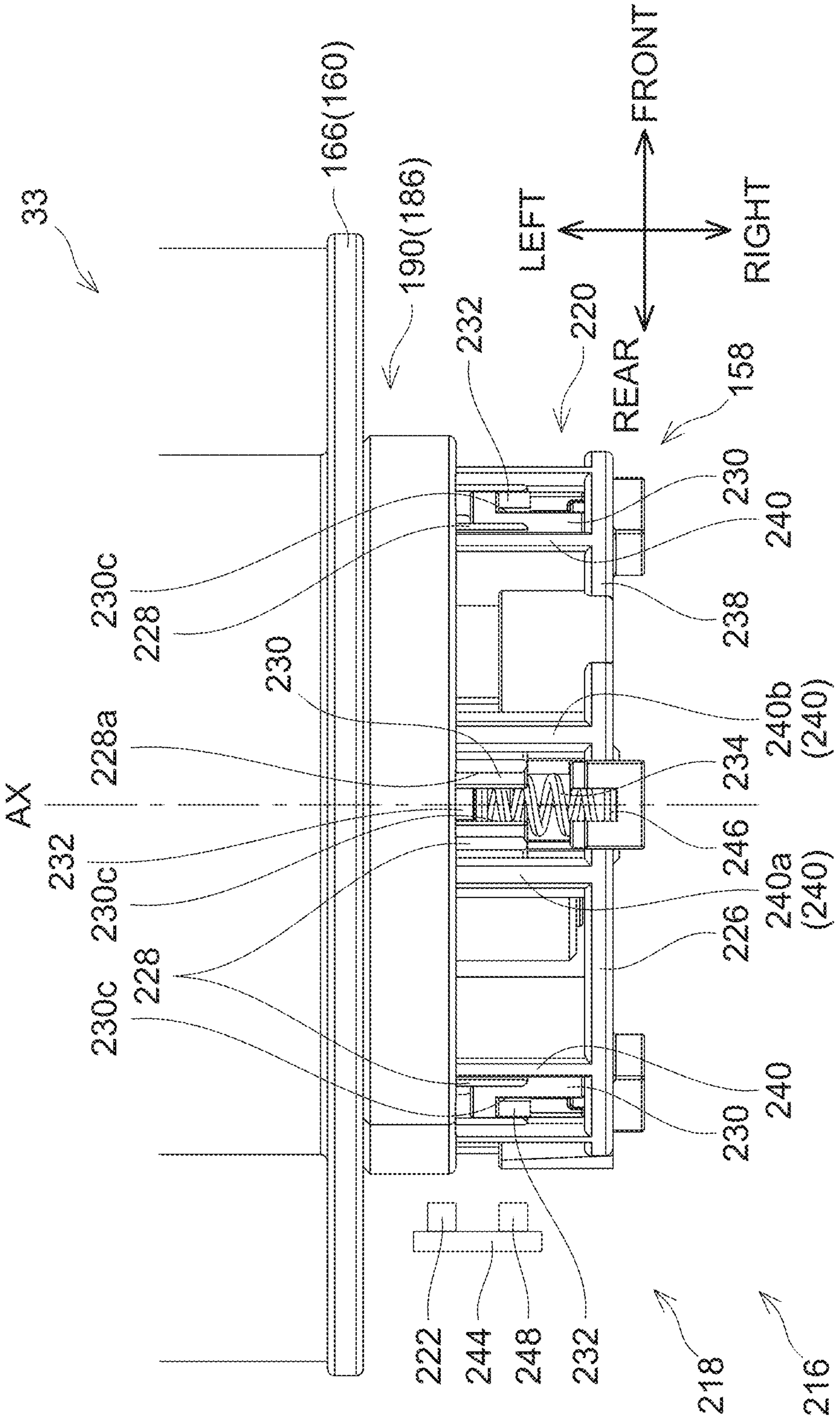
FIG. 29 is a top view of a reel 33, a type detector 158, and the right reel attaching part 190 according to the second embodiment.

Referring to the drawings, a second embodiment will be described. For the second embodiment, only differences from the first embodiment will be described, and like/same elements from the first embodiment will be labeled with like/same reference signs and description for them will be omitted. As shown in FIG. 28, the second embodiment does not comprise the rotation-detecting magnets 246 of the first embodiment. As shown in FIG. 29, in the state where movable members 230 are at the attaching position, a rotation-detecting magnetic sensor 248 is positioned such that the rotation-detecting magnetic sensor 248 faces type-detecting magnets 232 as the reel 33 rotates.

Figure 30:
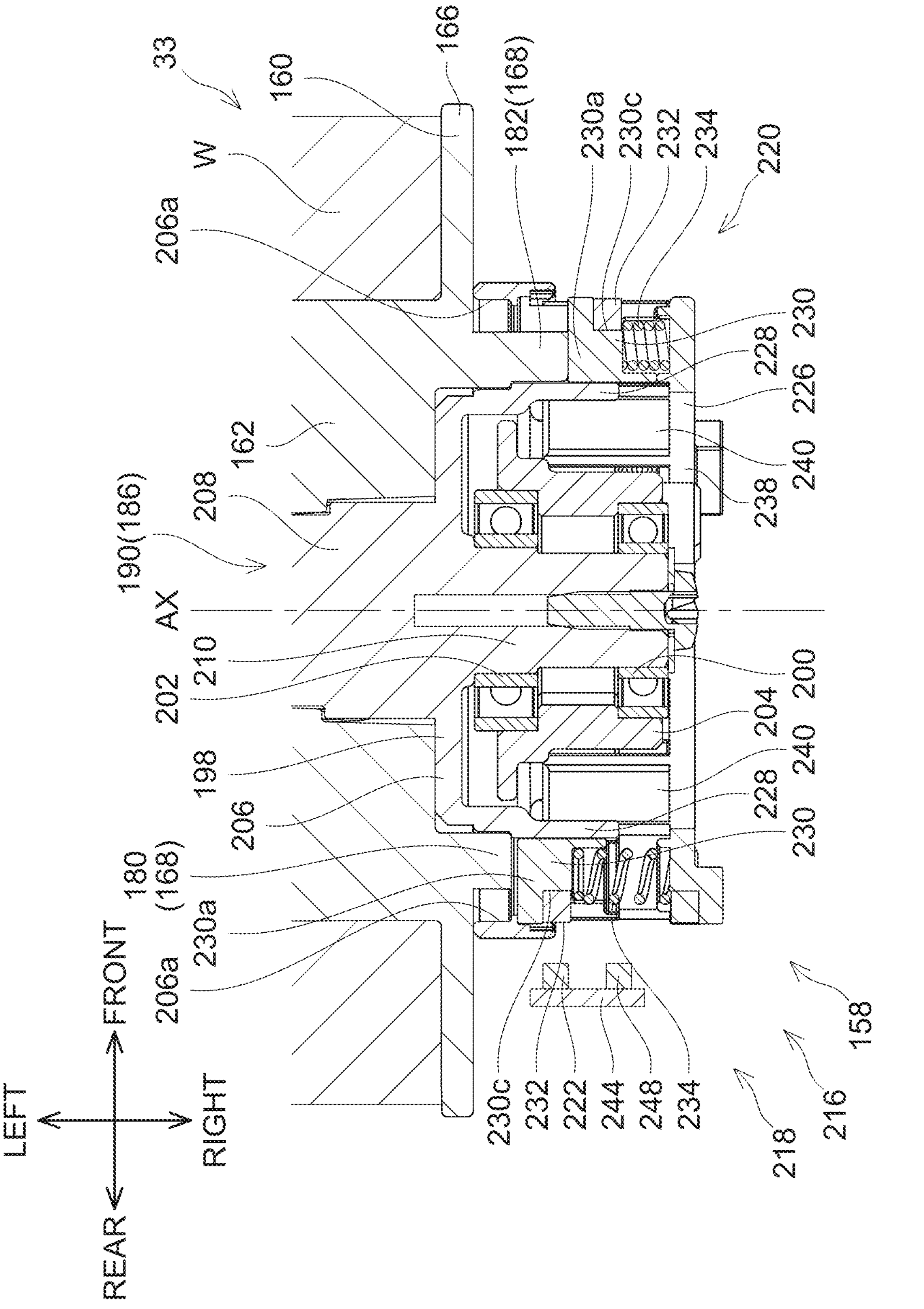
FIG. 30 is a cross-sectional view of the reel 33, the type detector 158, and the right reel attaching part 190 according to the second embodiment.
Figure 31:
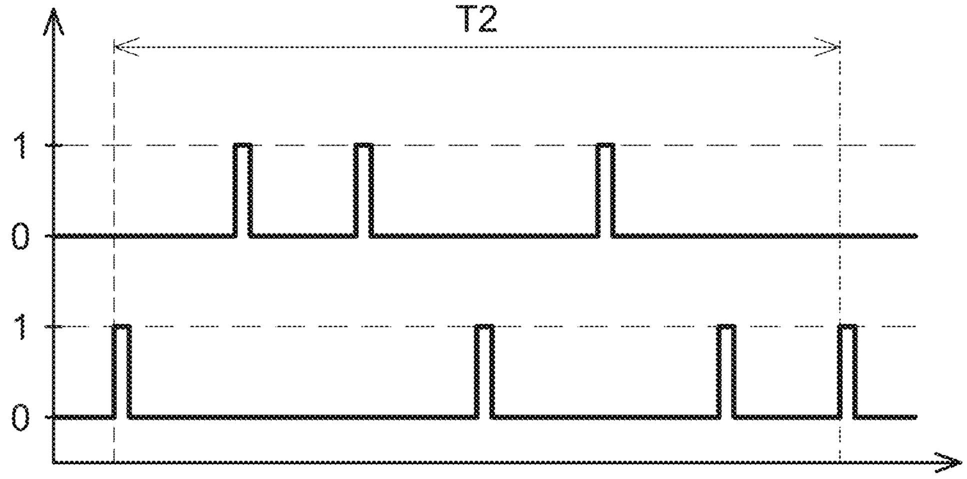
FIG. 31 illustrates signal charts detected by a type-detecting magnetic sensor 222 and a rotation-detecting magnetic sensor 248 according to the second embodiment.

A method of detecting the type of a reel 33 will be described. Hereinafter, only a type detecting process will be described. When a control circuit board 36 (see FIG. 3) rotates a feeding motor 50 (see FIG. 4) forward (in the direction D1 in FIG. 4), the reel 33 thereby rotates. With the rotation of the reel 33, a type detecting device 220 integrally rotates with a turntable 198. As shown in FIG. 30, every time each movable member 230 at the initial position passes a position facing a type-detecting magnetic sensor 222, the type-detecting magnetic sensor 222 faces the type-detecting magnet 232 and detects the type-detecting magnet 232, for example, by detecting a magnetic variation. A control circuit board 36 detects that the type-detecting magnets 232 were detected. Further, every time each movable member 230 at the attaching position passes a position facing the rotation-detecting magnetic sensor 248, the rotation-detecting magnetic sensor 248 faces the type-detecting magnet 232 and detects the type-detecting magnet 232, for example, by detecting a magnetic variation. The control circuit board 36 detects that the type-detecting magnets 232 were detected. The control circuit board 36 detects signal charts shown in FIG. 31 as the reel 33 rotates. In FIG. 31, among the two solid lines, the upper solid line indicates a signal chart associated with the detection of the type-detecting magnets 232 fixed to the movable members 230 at the initial position, and the lower solid line indicates a signal chart associated with the detection of the type-detecting magnets 232 fixed to the movable members 230 at the attaching position. In the example of FIG. 31, signal strength indicates "1" for when the type-detecting magnet 232 is detected, whereas the signal strength indicates "0" for when the type-detecting magnet 232 is not detected.

Upon when the signal strength "1" takes place six times after the signal strength "1" took place for the first time in the signal charts associated with the detection of the type-detecting magnets 232, the control circuit board 36 determines that the reel 33 has rotated once and stops a feeding motor 50. The control circuit board 36 determines that the feeding motor 50 stops when the number of rotations of the feeding motor 50 is decreased to or less than a predetermined number of rotations (e.g., 0). Then, the control circuit board 36 specifies shapes of the both signal charts within a time period T2 in FIG. 31. The control circuit board 36 then specifies reference signal charts that match the specified shapes of the signal charts. Since the movable members 230 pushed to the attaching position varies depending on the types of reels 33, the shapes of the reference signal charts vary depending on the types of reels 33. The control circuit board 36 stores a plurality of reference signal charts corresponding to types of reels 33. The control circuit board 36 specifies the type of the reel 33 based on the specified reference signal charts. Then, the control circuit board 36 sets conditions for tying rebars R with a wire W using a rebar tying tool 2 according to the specified type of the reel 33. Finally, the control circuit board 36 rotates the feeding motor 50 in reverse (in the direction D2 in FIG. 4) to pull back the wire W toward the reel 33.

Third Embodiment

Figure 32:
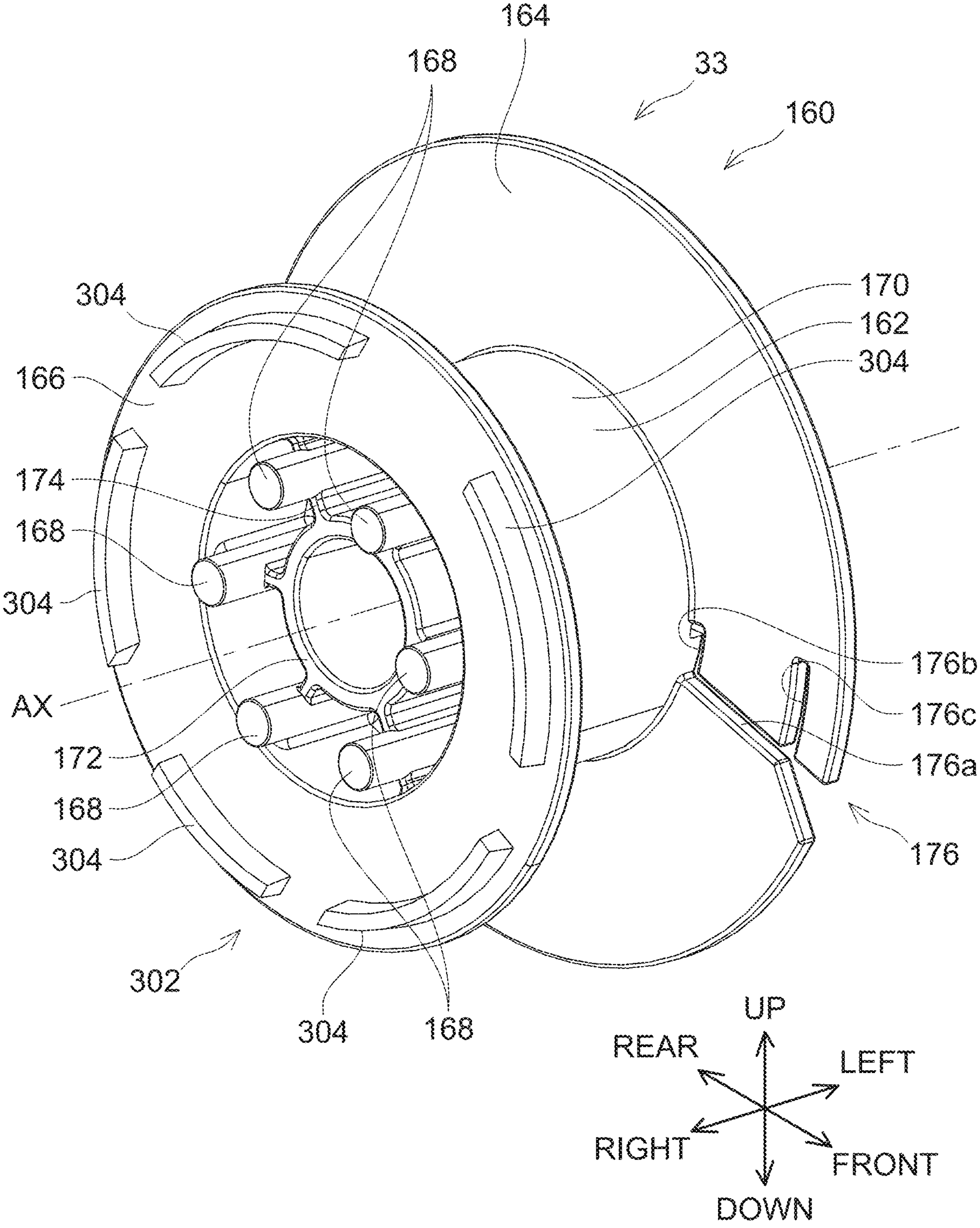
FIG. 32 is a perspective view of a bobbin 160 of a reel 33 according to a third embodiment.

Referring to the drawings, a third embodiment will be described. For the third embodiment, only differences from the first embodiment will be described, and like/same elements from the first embodiment will be labeled with like/same reference signs and description for them will be omitted. As shown in FIG. 32, in the third embodiment, a bobbin 160 further comprises a uniquely shaped portion 302. The uniquely shaped portion 302 has a shape designed depending on the type of a reel 33. The uniquely shaped portion 302 is disposed near a circumferential edge of an outer surface (right surface) of a right flange 166. The uniquely shaped portion 302 is integral with the right flange 166.

The uniquely shaped portion 302 comprises a plurality of ribs 304 (five ribs 304 in the present embodiment). The ribs 304 project rightward from the outer surface (right surface) of the right flange 166 along a rotation axis AX of the reel 33. The ribs 304 have an elongated shape having a longitudinal direction in a direction along a rotation direction of the reel 33. In the example of FIG. 32, four ribs 304 have the same length in the longitudinal direction, whereas the remaining one rib 304 has a shorter length in the longitudinal direction compared to the length of the four ribs 304 in the longitudinal direction. In the longitudinal direction of the ribs 304, all the ribs 304 are the same in height and width.

The number of the ribs 304 and the length of each rib 304 in the longitudinal direction vary depending on the types of reels 33. For example, in a reel 33 of another type, the number of ribs 304 is four. Further, three ribs 304 have the same length in the longitudinal direction, whereas the remaining one rib 304 has a shorter length in the longitudinal direction compared to the length of the three ribs 304 in the longitudinal direction.

The five ribs 304 are arranged along the rotation direction of the reel 33. The five ribs 304 are spaced from each other along the rotation direction of the reel 33. Further, the five ribs 304 are farther apart from the rotation axis AX of the reel 33 than projections 168 are.

In the third embodiment, the projections 168 have a cylindrical shape. The six projections 168 have the same shape. That is, the six projections 168 have the same length in their longitudinal direction.

Figure 33:
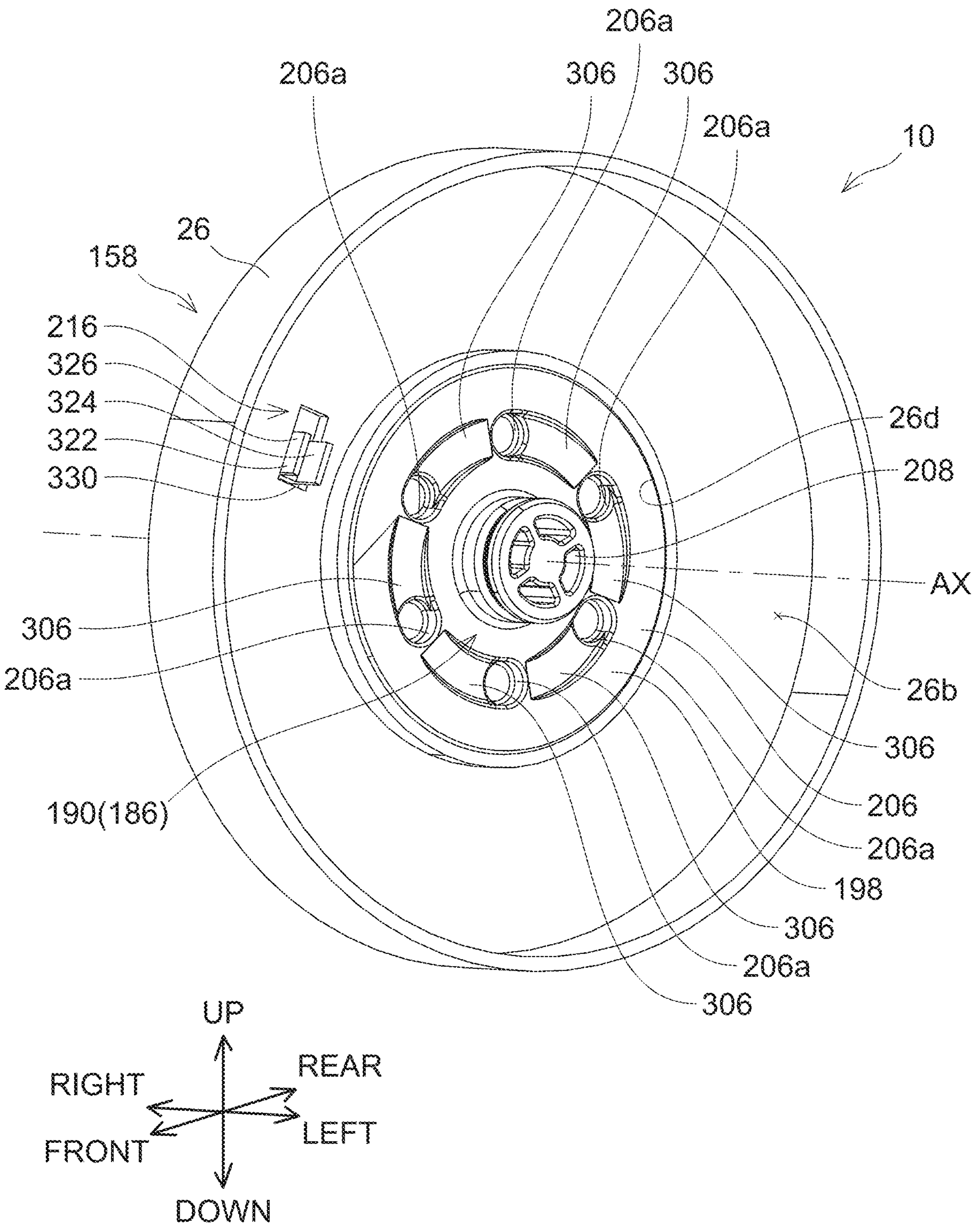
FIG. 33 is a perspective view of a holder housing 26, a type detector 158, and a turntable 198 according to the third embodiment.

In the third embodiment, as shown in FIG. 33, receivers 206*a* defined in a turntable body 206 do not penetrate the turntable body 206. The receivers 206*a* are recessed from a left surface of the turntable body 206, in FIG. 33 and subsequent drawings, a holder housing 26 is depicted with simplified configuration.

Figure 36:
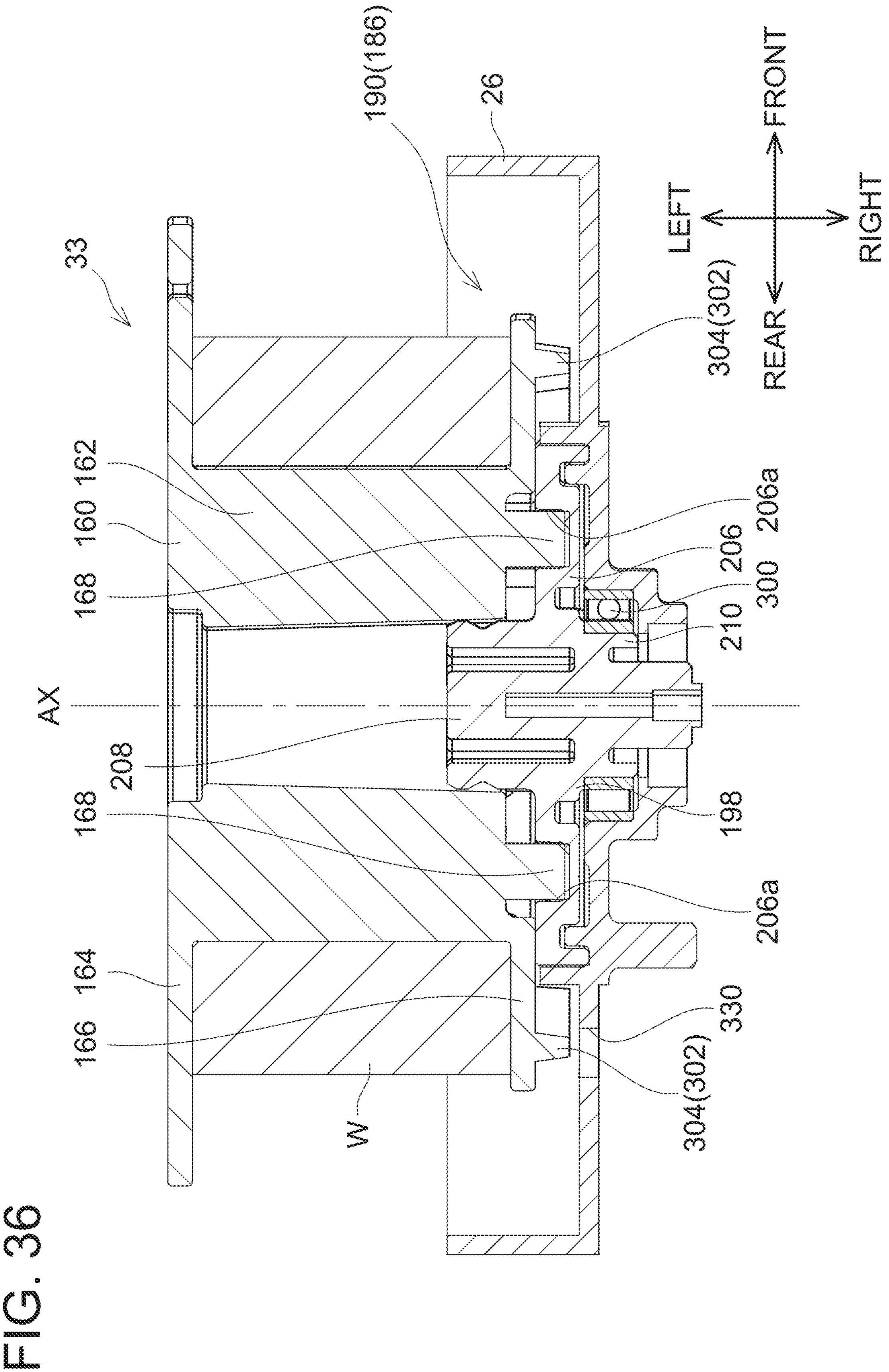
FIG. 36 is a cross-sectional view of the holder housing 26, the reel 33, and the right reel attaching part 190 according to the third embodiment.

A guide groove 306 is connected to each receiver 206*a*. The guide grooves 306 extend along the rotation direction of the reel 33 (see FIG. 32). The guide grooves 306 are recessed from the left surface of the turntable body 206. Each guide groove 306 becomes gradually deeper from one end thereof toward corresponding receiver 206*a*. The guide grooves 306 guide the projections 168 toward the receivers 206*a* in attaching the reel 33 to a turntable 198. As shown in FIG. 36, the projections 168 are received in and engage with the receivers 206*a*.

The turntable 198 is rotatably supported by the holder housing 26 of a reel holder 10 via a bearing 300. That is, in the third embodiment, a right reel attaching part 190 does not comprise the bearings 200, 202 nor the ring member 204 of the first embodiment.

Figure 34:
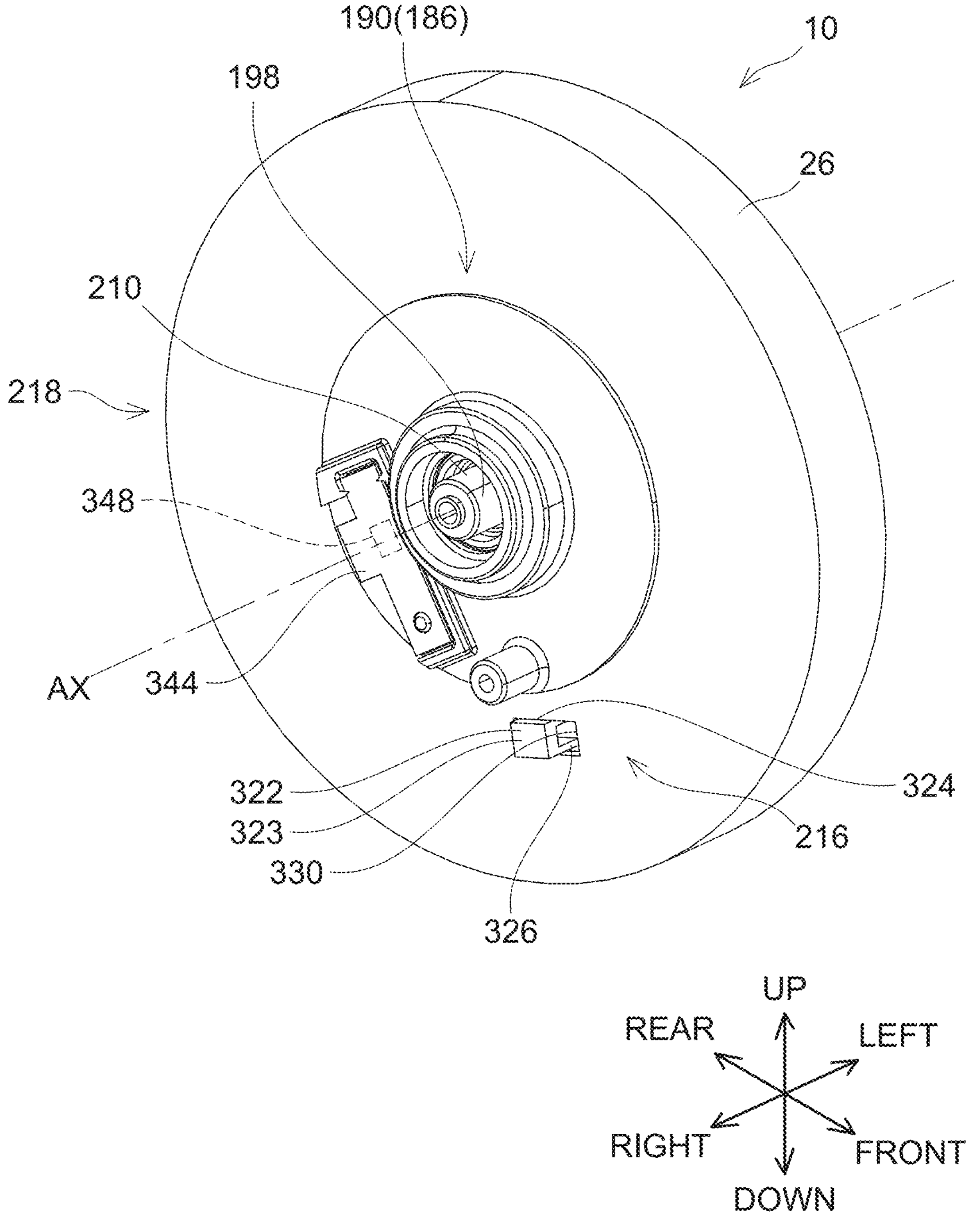
FIG. 34 is a perspective view of the holder housing 26, the turntable 198, a sensor substrate 344, and a photointerrupter 322 according to the third embodiment.
Figure 35:
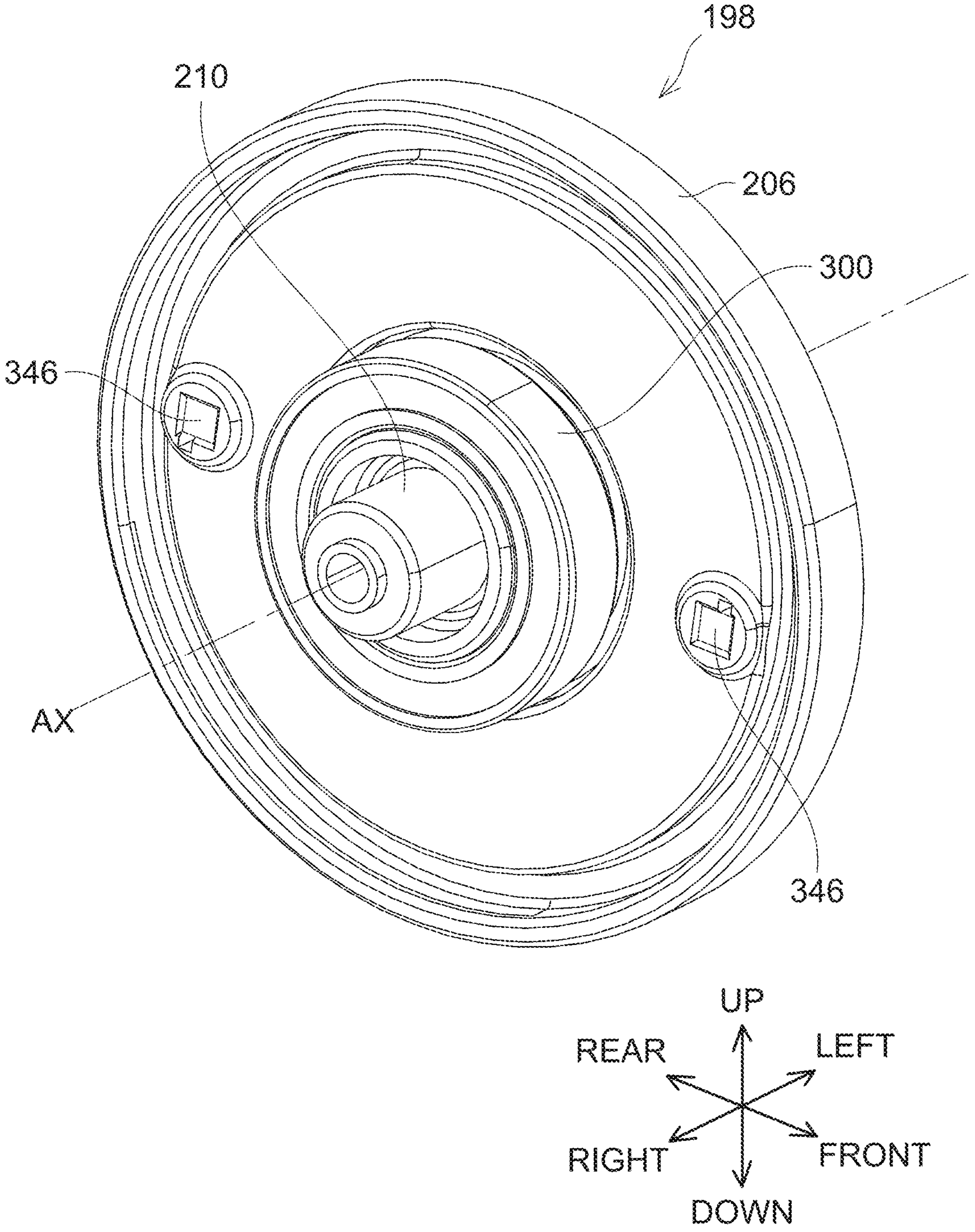
FIG. 35 is a perspective view of the turntable 198 and rotation-detecting magnets 346 according to the third embodiment.

As shown in FIG. 34, in the third embodiment, a rotation detecting unit 218 comprises a rotation-detecting magnetic sensor 348 and a plurality of rotation-detecting magnets 346 (two rotation-detecting magnets 346 in the present embodiment) (see FIG. 35). In FIG. 34, the rotation-detecting magnetic sensor 348 is depicted with a broken line. The rotation-detecting magnetic sensor 348 is fixed to a sensor substrate 344. The sensor substrate 344 is fixed to the holder housing 26. The rotation-detecting magnetic sensor 348 is positioned to overlap the turntable body 206 (see FIG. 33) in a direction along the rotation axis AX of the reel 33 (see FIG. 32), although this is not shown.

As shown in FIG. 35, the two rotation-detecting magnets 346 are fixed to a right surface of the turntable body 206. The two rotation-detecting magnets 346 are arranged at intervals corresponding to an angle of 180 degrees around the rotation axis AX of the reel 33 (rotation axis of the turntable 198). The rotation-detecting magnets 346 integrally rotate with the turntable body 206. The rotation-detecting magnets 346 pass a position facing the rotation-detecting magnetic sensor 348 (see FIG. 34) as the turntable 198 rotates. When facing the rotation-detecting magnets 346, the rotation-detecting magnetic sensor 348 detects the rotation-detecting magnets 346.

As shown in FIG. 34, a type detecting unit 216 comprises a photointerrupter 322. In the third embodiment, the type detecting unit 216 does not comprise the type detecting device 220 of the first embodiment.

The photointerrupter 322 is fixed to the holder housing 26. The holder housing 26 includes a through hole 330 penetrating the holder housing 26 and at least a part of the photointerrupter 322 is disposed in the through hole 330. The photointerrupter 322 is farther apart from the rotation axis AX of the reel 33 than the rotation-detecting magnetic sensor 348 is. The photointerrupter 322 is electrically connected to a control circuit board 36 (see FIG. 3) via a wire which is not shown. The wire can be arranged outside of a housing space 26*b* (see FIG. 3) and thus can be suppressed from contacting the rotating turntable 198 and/or reel 33.

Figure 37:
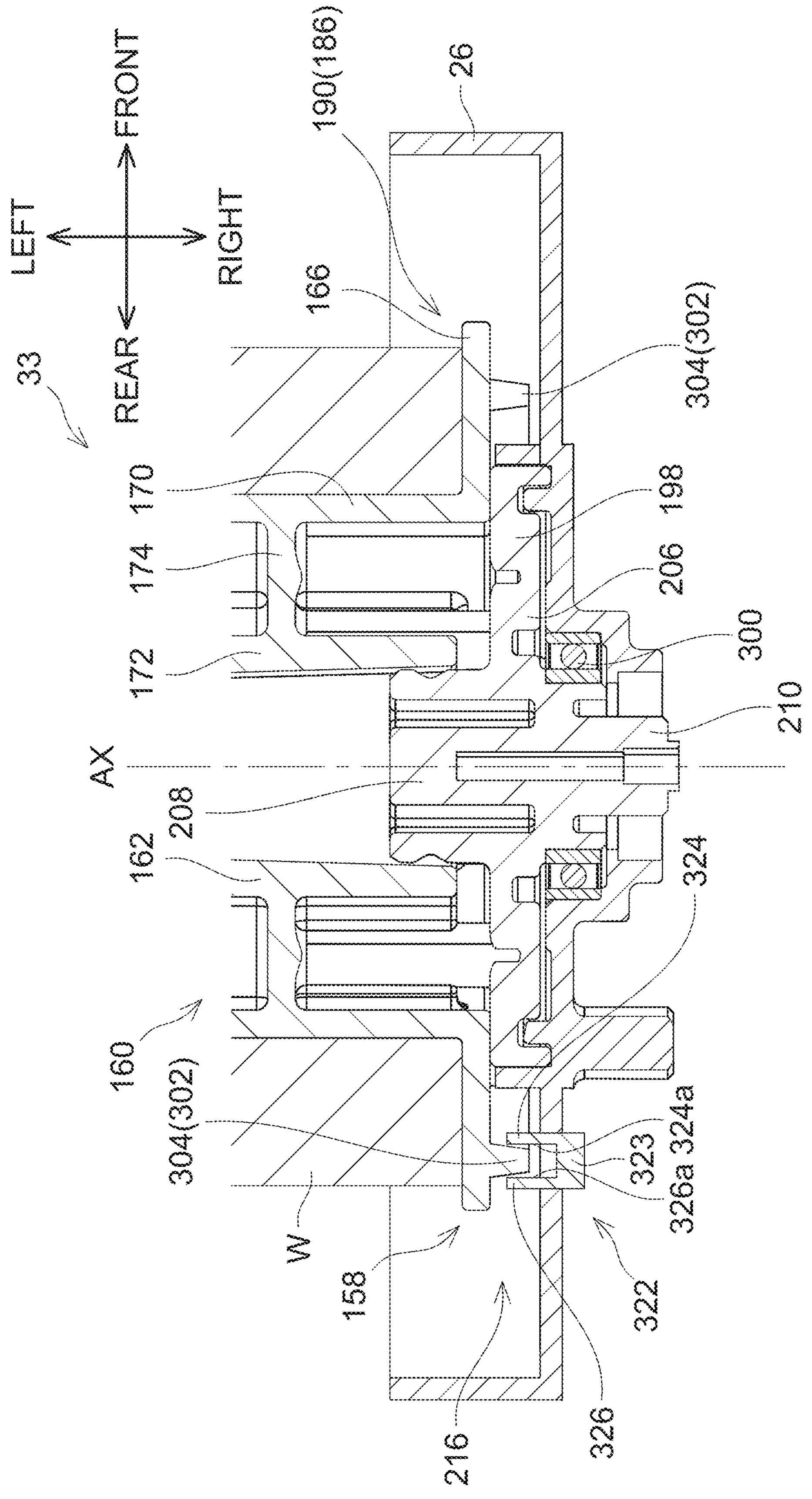
FIG. 37 is a cross-sectional view of the holder housing 26, the reel 33, the right reel attaching part 190, and the photointerrupter 322 according to the third embodiment.

As shown in FIG. 37, the photointerrupter 322 comprises a base 323, a light emitter 324, and a light receiver 326. The light emitter 324 and the light receiver 326 are fixed to the base 323. The light emitter 324 is spaced from the light receiver 326. A light emitting surface 324*a* of the light emitter 324 faces a light receiving surface 326*a* of the light receiver 326. The light emitter 324 outputs light from the light emitting surface 324*a* toward the light receiving surface 326*a* of the light receiver 326. The light receiver 326 is configured to detect the light outputted from the light emitter 324.

Next, a method of detecting the type of the reel 33 will be described. First, in the state where the main cover 28 (see FIG. 1) of the reel holder 10 is open, the projections 168 (see FIG. 32) of the reel 33 are moved along the guide grooves 306 (see FIG. 33) to the receivers 206*a* (see FIG. 33) and inserted therein. Thus, the projections 168 engage with the receivers 206*a*. Then, as shown in FIG. 18, the main cover 28 is closed and a lock lever 32 (see FIG. 1) is pivoted to maintain the main cover 28 in the closed state. In this way, the reel 33 is housed in the reel holder 10 such that the reel 33 is rotatable with respect to the holder housing 26.

Next, the control circuit board 36 (see FIG. 3) executes a type-detecting process for detecting the type of the reel 33. First, the control circuit board 36 controls the photointerrupter 322 (see FIG. 37) to cause it to output light from the light emitting surface 324*a* of the light emitter 324. Then, when the control circuit board 36 rotates a feeding motor 50 (see FIG. 4) forward (in the direction D1 in FIG. 4), the reel 33 thereby rotates. As shown in FIG. 37, the ribs 304 pass between the light emitting surface 324*a* of the light emitter 324 and the light receiving surface 326*a* of the light receiver 326 as the reel 33 rotates. Every time each rib 304 passes between the light emitting surface 324*a* of the light emitter 324 and the light receiving surface 326*a* of the light receiver 326, the light outputted from the light emitting surface 324*a* is blocked by the rib 304 and thus the light receiver 326 does not detect the light from the light emitting surface 324*a*. The control circuit board 36 detects that the light receiver 326 does not detect the light from the light emitting surface 324*a*. On the other hand, when none of the ribs 304 passes between the light emitting surface 324*a* of the light emitter 324 and the light receiving surface 326*a* of the light receiver 326, the light receiver 326 detects the light from the light emitting surface 324*a*. The control circuit board 36 detects that the light receiver 326 detects the light from the light emitting surface 324*a*. The control circuit board 36 detects a signal chart associated with the detection of the ribs 304 (the upper signal chart depicted with a solid line) shown in FIG. 38 as the reel 33 rotates. In the signal chart associated with the detection of the ribs 304, signal strength indicates "1" for when the light receiver 326 does not detect the light from the light emitting surface 324*a*, whereas the signal strength indicates "0" for when the light receiver 326 detects the light from the light emitting surface 324*a*. The control circuit board 36 counts how many times the signal strength indicates "1" during the rotation of the reel 33.

As the reel 33 rotates, the rotation-detecting magnets 346 integrally rotate with the turntable 198 shown in FIG. 35. Every time each rotation-detecting magnet 346 passes the position facing the rotation-detecting magnetic sensor 348 (see FIG. 34), the rotation-detecting magnetic sensor 348 detects the rotation-detecting magnet 346. The control circuit board 36 detects that the rotation-detecting magnets 346 were detected. The control circuit board 36 detects a signal chart associated with the detection of the rotation-detecting magnets 346 (the lower signal chart depicted with a solid line) shown in FIG. 38 as the reel 33 rotates. In the signal chart associated with the detection of the rotation-detecting magnets 346, signal strength indicates “1” for when the rotation-detecting magnet 346 is detected, while the signal strength indicates “0” for when the rotation-detecting magnet 346 is not detected.

Figure 38:
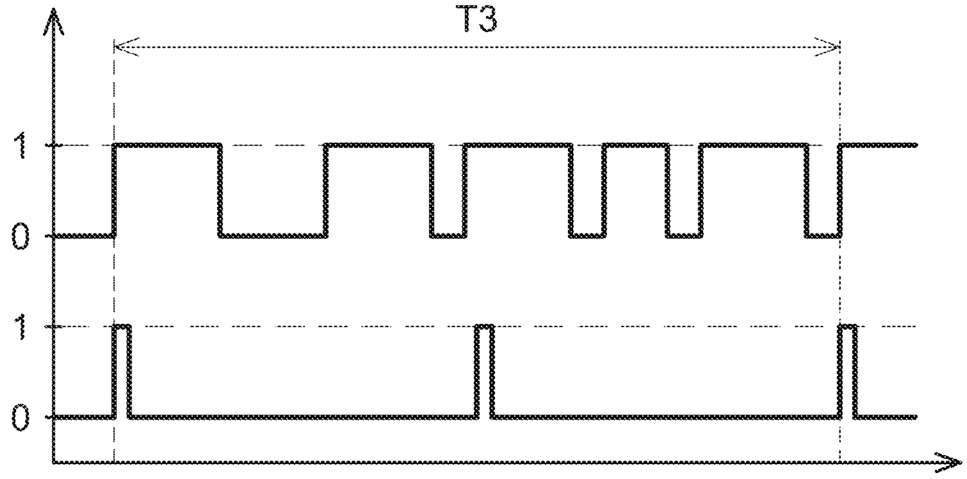
FIG. 38 illustrates signal charts detected by the photointerrupter 322 and a rotation-detecting magnetic sensor 348 according to the third embodiment.

Upon when the signal strength “1” takes place twice after the signal strength “1” took place for the first time in the signal chart associated with the detection of the rotation-detecting magnets 346, the control circuit board 36 determines that the reel 33 has rotated once and stops the feeding motor 50. The control circuit board 36 determines that the feeding motor 50 stops when the number of rotations of the feeding motor 50 is decreased to or less than a predetermined number of rotations (e.g., 0). Then, the control circuit board 36 counts how many times the signal strength had indicated “1” in the signal chart associated with the detection of the ribs 304 by the time the reel 33 has rotated once, that is, the number of ribs 304 that have passed between the light emitting surface 324*a* of the light emitter 324 and the light receiving surface 326*a* of the light receiver 326. In FIG. 38, the number of such ribs 304 is equal to the number of the signal strength indicating “1” within a time period T3 in the signal chart associated with the detection of the ribs 304. Then, the control circuit board 36 specifies the type of the reel 33 by using the counted number of ribs 304 and a type specifying table. The type specifying table indicates relationships between the numbers of ribs 304 and types of reels 33. The type specifying table is stored in the control circuit board 36. The control circuit board 36 then sets conditions for tying rebars R with a wire W using a rebar tying tool 2 according to the specified type of the reel 33. Finally, the control circuit board 36 rotates the feeding motor 50 in reverse (in the direction D2 in FIG. 4) to pull back the wire W toward the reel 33.

Effects

The rebar tying tool 2 comprise the reel 33 comprising the bobbin 160 and the wire W wound around the bobbin 160; the reel attaching part 186 to which the reel 33 is rotatably attached; the feeding unit 38 configured to feed the wire W from the bobbin 160 around the rebars R; the twisting unit 46 configured to twist the wire W around the rebars R; the support 15 supporting the reel attaching part 186, the feeding unit 38, and the twisting unit 46; the rotation-detecting magnets 346 configured to integrally rotate with the reel 33; the rotation-detecting magnetic sensor 348 fixed to the support 15 and configured to detect the rotation of the rotation-detecting magnets 346; and the photointerrupter 322 configured to detect the shape of the bobbin 160 as the reel 33 rotates.

According to the configuration above, the rotation-detecting magnetic sensor 348 detects that the reel 33 has rotated once by detecting the rotation-detecting magnets 346 integrally rotating with the reel 33. Further, the photointerrupter 322 detects the shape of the bobbin 160 as the reel 33 rotates. These enables detection of the shape of the bobbin 160 as the reel 33 rotates once. Where the shape of bobbin 160 varies depending on the types of reels 33, the type of the reel 33 can be detected based on the detected shape of the bobbin 160. The configuration thus enables detection of the type of the reel 33 and a reduced number of photointerrupters 322.

Further, the rebar tying tool 2 comprises the reel attaching part 186 to which the reel 33 is rotatably attached, wherein the reel 33 comprises the bobbin 160 and the wire W wound around the bobbin 160; the feeding unit 38 configured to feed the wire W from the bobbin 160 around the rebars R; the twisting unit 46 configured to twist the wire W around the rebars R; the support 15 supporting the reel attaching part 186, the feeding unit 38, and the twisting unit 46; the rotation-detecting magnets 346 configured to integrally rotate with the reel 33; the rotation-detecting magnetic sensor 348 fixed to the support 15 and configured to detect rotation of the rotation-detecting magnets 346; and the photointerrupter 322 configured to detect the shape of the bobbin 160 as the reel 33 rotates.

The configuration above can achieve the same effects as those of the rebar tying tool 2 above.

The reel 33 disclosed herein comprises the bobbin 160 and the wire W wound around the bobbin 160. The reel 33 is used by being rotatably attached to the reel attaching part 186 of the rebar tying tool 2. The rebar tying tool 2 comprises the support 15 supporting the reel attaching part 186; the rotation-detecting magnets 346 configured to integrally rotate with the reel 33; the rotation-detecting magnetic sensor 348 fixed to the support 15 and configured to detect rotation of the rotation-detecting magnets 346; and the photointerrupter 322. The bobbin 160 comprises a shape that is detectable by the photointerrupter 322 as the reel 33 rotates.

According to the configuration above, the rotation-detecting magnetic sensor 348 detects that the reel 33 has rotates once by detecting the rotation-detecting magnets 346 integrally rotating with the reel 33, after the reel 33 has been attached to the reel attaching part 186 of the rebar tying tool 2. Further, the photointerrupter 322 detects the shape of the bobbin 160 as the reel 33 rotates. These enables the rebar tying tool 2 to detect the shape of the bobbin 160 as the reel 33 rotates once. Where the shape of bobbin 160 varies depending on types of reels 33, the type of the reel 33 can be detected by the rebar tying tool 2 based on the detected shape of the bobbin 160. The configuration thus enables the rebar tying tool 2 to detect the type of the reel 33 and allows for a reduced number of photointerrupters 322 used in the rebar tying tool 2.

Further, the bobbin 160 comprises the uniquely shaped portion 302 having a shape based on which the photointerrupter 322 distinguishes the reel 33 from another reel 33. The uniquely shaped portion 302 passes between the light emitter 324 and the light receiver 326 of the photointerrupter 322 as the reel 33 rotates.

According to the configuration above, the type of the reel 33 can be detected accurately by detecting the uniquely shaped portion 302 passing between the light emitter 324 and the light receiver 326 of the photointerrupter 322 as the reel 33 rotates.

Further, the uniquely shaped portion 302 comprises the plurality of ribs 304 spaced apart from each other along the rotation direction of the reel 33. The rebar tying tool 2 further comprises the control circuit board 36 configured to count the number of ribs 304 passing between the light emitter 324 and the light receiver 326 of the photointerrupter 322 as the reel 33 rotates.

According to the configuration above, where the number of ribs 304 varies depending on the types of reels 33, the type of the reel 33 can be detected by a simple method of counting the number of ribs 304.

Further, the reel attaching part 186 comprises the turntable 198 rotatably supported by the support 15. The bobbin 160 is fixed to the turntable 198 when the reel 33 is attached to the reel attaching part 186.

According to the configuration above, since the turntable 198 is supported by the support 15, there is no need to attach/detach the turntable 198 to/from the support 15. Thus, displacement of the rotation axis of the turntable 198 can be suppressed. Displacement of the rotation axis AX of the reel 33 thus can be suppressed.

Further, the rotation-detecting magnets 346 are supported by the turntable 198 such that the rotation-detecting magnets 346 are integrally rotatable with the turntable 198. The rotation-detecting magnetic sensor 348 is positioned to overlap at least a part of the turntable 198 in the direction along the rotation axis AX of the reel 33.

According to the configuration above, the rotation of the reel 33 can be detected accurately with a simple configuration.

Further, the bobbin 160 comprises the projections 168. The turntable 198 comprises the receivers 206*a* configured to receive and engage with the projections 168.

According to the configuration above, the reel 33 can be fixed to the turntable 198 with a simple configuration.

Further, the photointerrupter 322 is fixed to the support 15.

According to the configuration above, the position of the photointerrupter 322 does not change even when the reel 33 rotates. Thus, the shape of the bobbin 160 can be detected accurately by the photointerrupter 322.

Further, the photointerrupter 322 is disposed farther apart from the rotation axis AX of the reel 33 than the rotation-detecting magnetic sensor 348.

According to the configuration above, the photointerrupter 322 and the rotation-detecting magnetic sensor 348 can be aligned in a direction perpendicular to the rotation axis AX of the reel 33.

Correspondence Relationships

The control circuit board 36 is an example of "counter".

Fourth Embodiment

Referring to the drawings, a fourth embodiment will be described. For the fourth embodiment, only differences from the first embodiment will be described, and like/same elements from the first embodiment will be labeled with like/same reference signs and description for them will be omitted. The shape of a bobbin 160 of a reel 33 in the fourth embodiment is different from the shape of the bobbin 160 in the first embodiment, and the shape of an engagement member 208 of a turntable 198 in the fourth embodiment is different from the shape of the engagement member 208 in the first embodiment.

Figure 39:
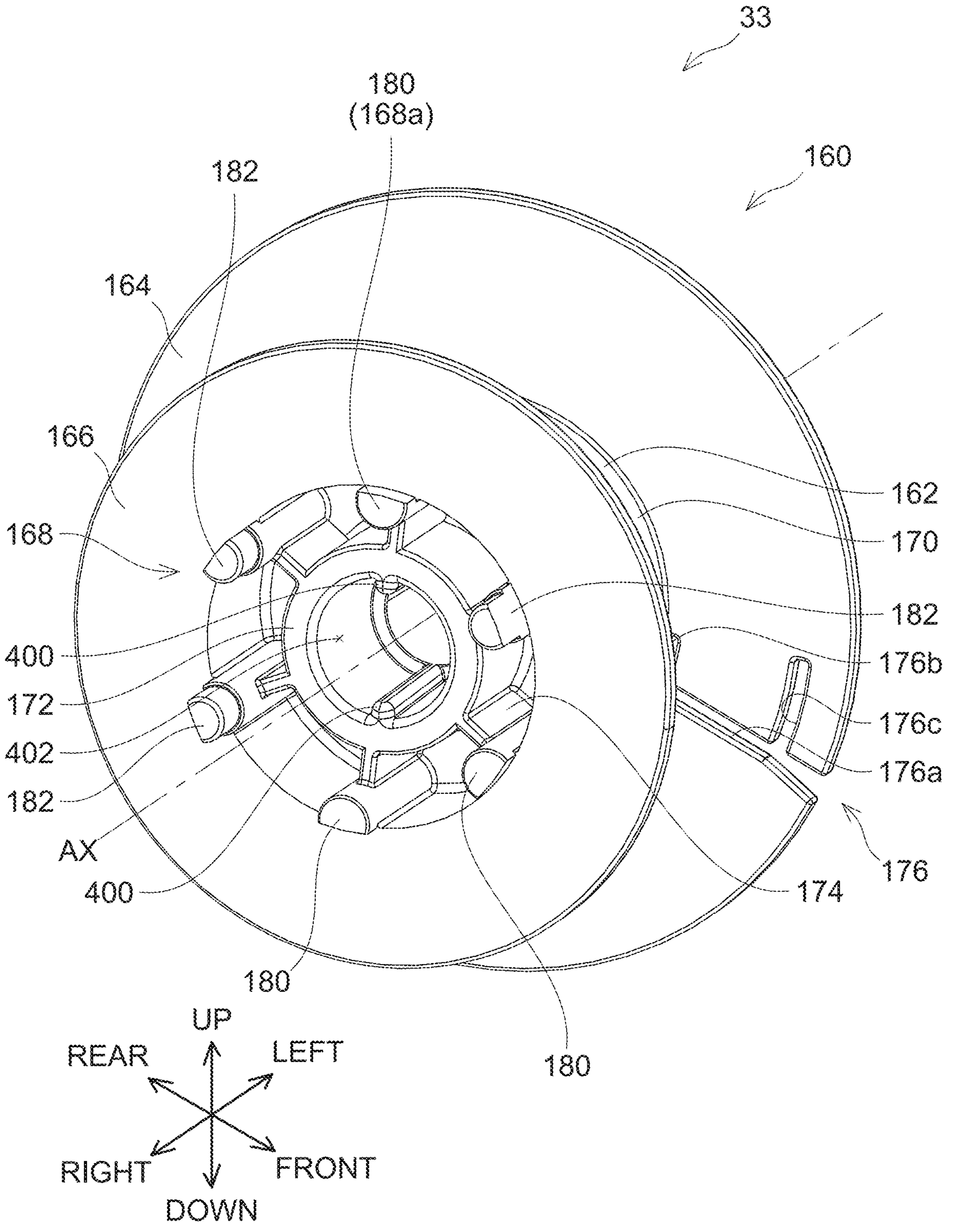
FIG. 39 is a perspective view of a bobbin 160 of a reel 33 according to a fourth embodiment.

As shown in FIG. 39, the bobbin 160 further comprises one or more ribs 400 (two ribs 400 in the present embodiment). The ribs 400 is formed on an inner circumferential surface of an inner cylinder 172. The inner circumferential surface of the inner cylinder 172 corresponds to an inner circumferential surface of a trunk 162 of the bobbin 160. The inner circumferential surface of the inner cylinder 172 defines an insert space 402. The engagement member 208 of the turntable 198 is inserted in the insert space 402. An outer circumferential surface of an outer cylinder 170 corresponds to an outer circumferential surface of the trunk 162 of the bobbin 160.

Figure 40:
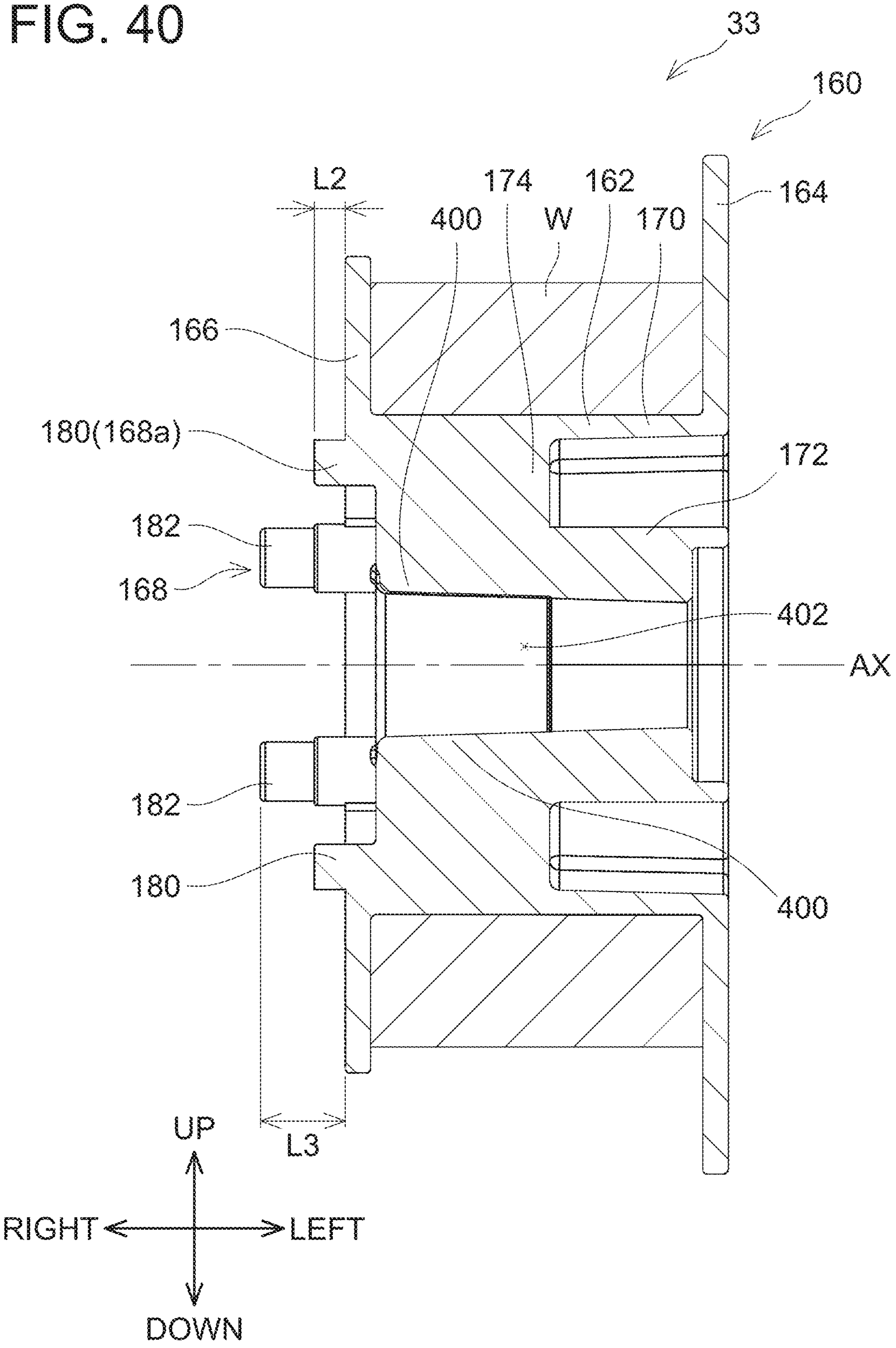
FIG. 40 is a cross-sectional view of the bobbin 160 of the reel 33 according to the fourth embodiment.

The ribs 400 project radially inward from the inner circumferential surface of the inner cylinder 172 toward the rotation axis AX. The ribs 400 are disposed in the insert space 402. The ribs 400 extend in the right-left direction along the rotation axis AX. The ribs 400 extend from near the center of the inner circumferential surface of the inner cylinder 172 in the right-left direction to a right end surface of the inner cylinder 172. As shown in FIG. 40, the right end surface of the inner cylinder 172 is positioned leftward of a right surface of a right flange 166. The ribs 400 are disposed closer to the rotation axis AX than the projections 168 of the bobbin 160 are (that is, disposed radially inward of the projections 168). The projections 168 correspond to an information portion that includes information indicating the type of reel 33. As described in connection with the first embodiment, when the reel 33 is attached to the turntable 198 (see FIG. 42), the projections 168 are received in receivers 206*a* (see FIG. 42), and the information indicating the type of reel 33 is detected by a rebar tying tool 2.

Figure 41:
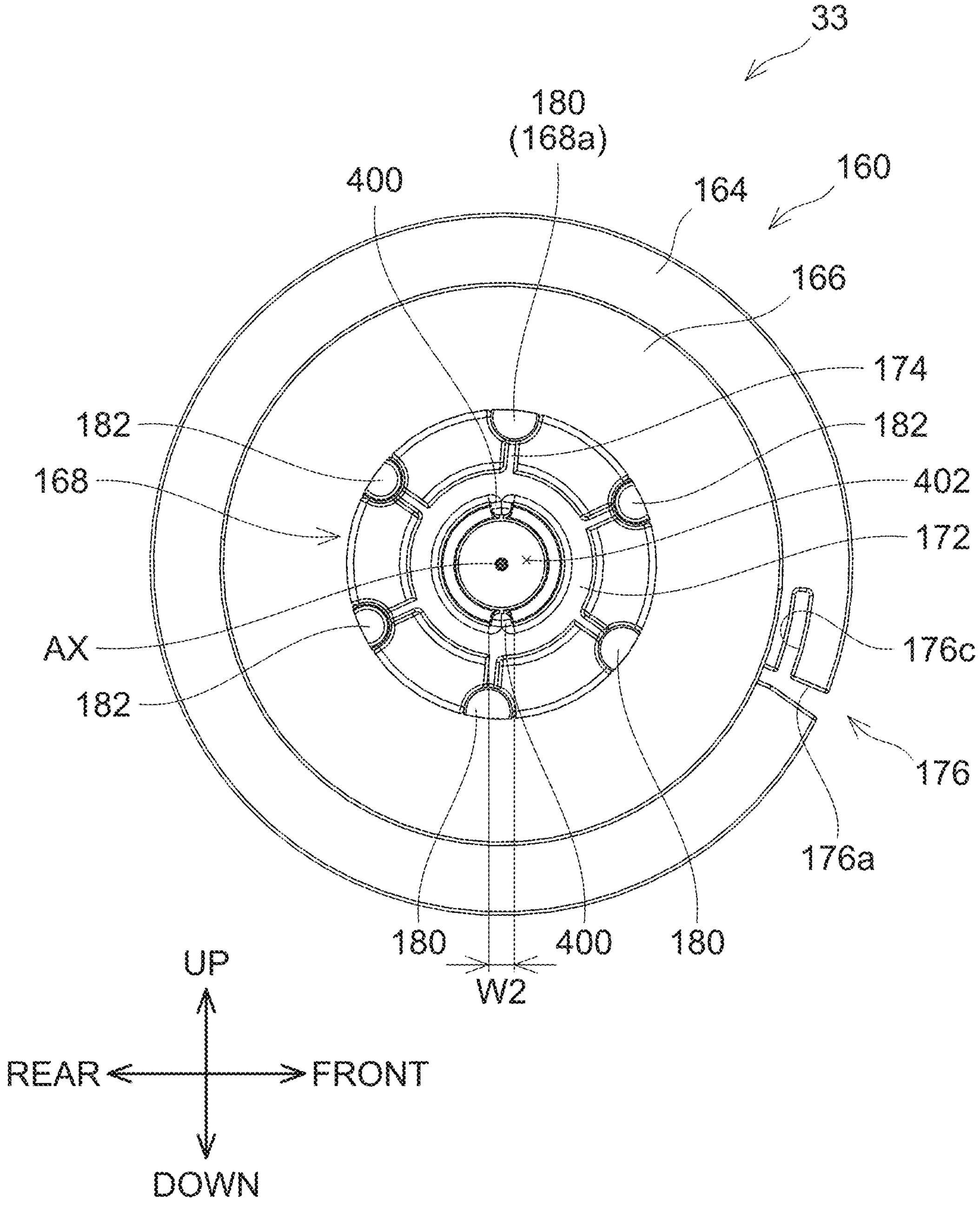
FIG. 41 is a side view of the bobbin 160 of the reel 33 according to the fourth embodiment.

As shown in FIG. 41, the two ribs 400 are arranged at regular intervals around the rotation axis AX (along the rotation direction of the reel 33). In the present embodiment, the two ribs 400 are arranged at intervals corresponding to an angle of 180 degrees around the rotation axis AX. Starting from a reference projection 168*a*, the two ribs 400 are arranged at a position of about 0 degree and at a position of about 180 degrees, respectively.

Figure 42:
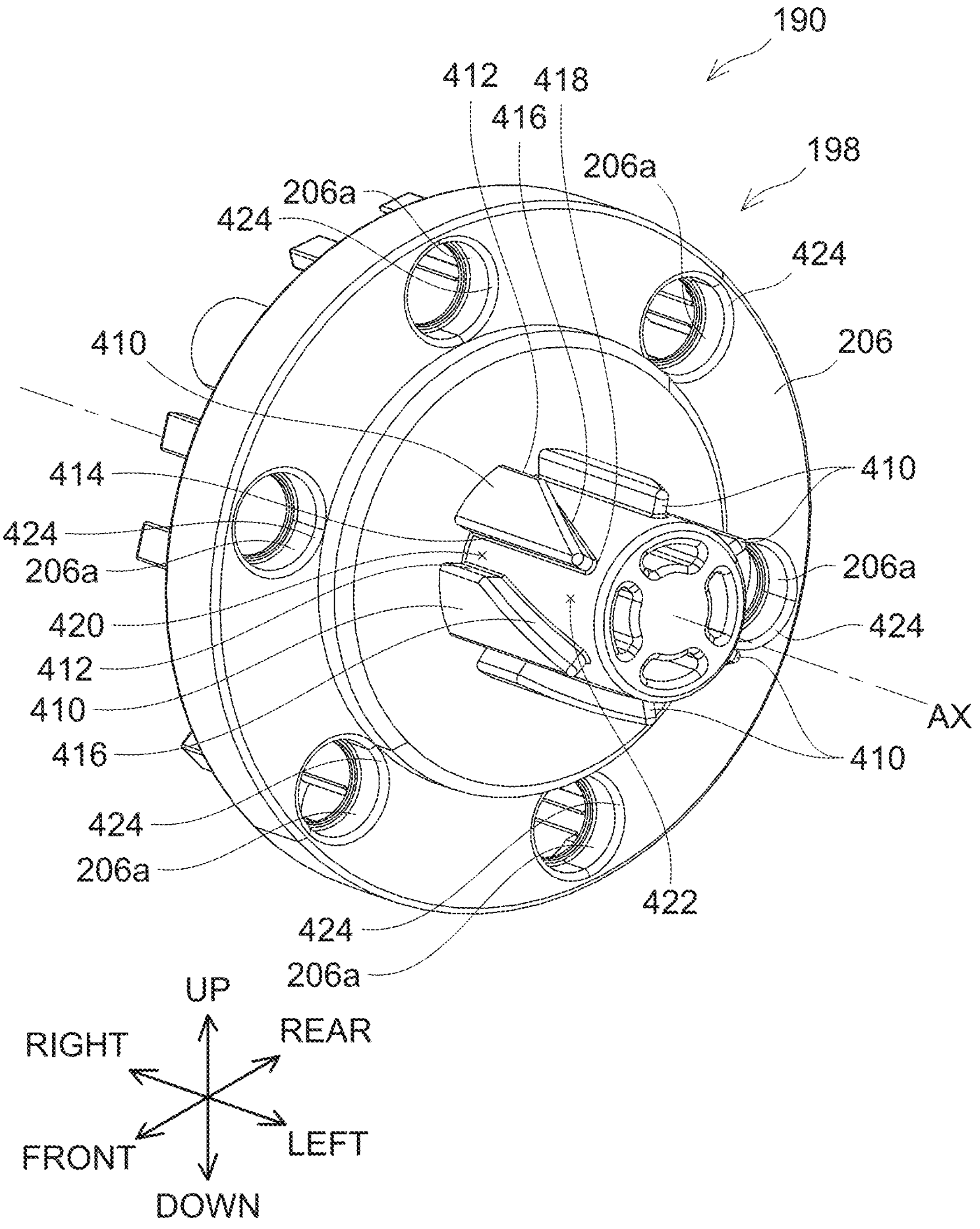
FIG. 42 is a perspective view of a turntable 198 according to the fourth embodiment.
Figure 43:
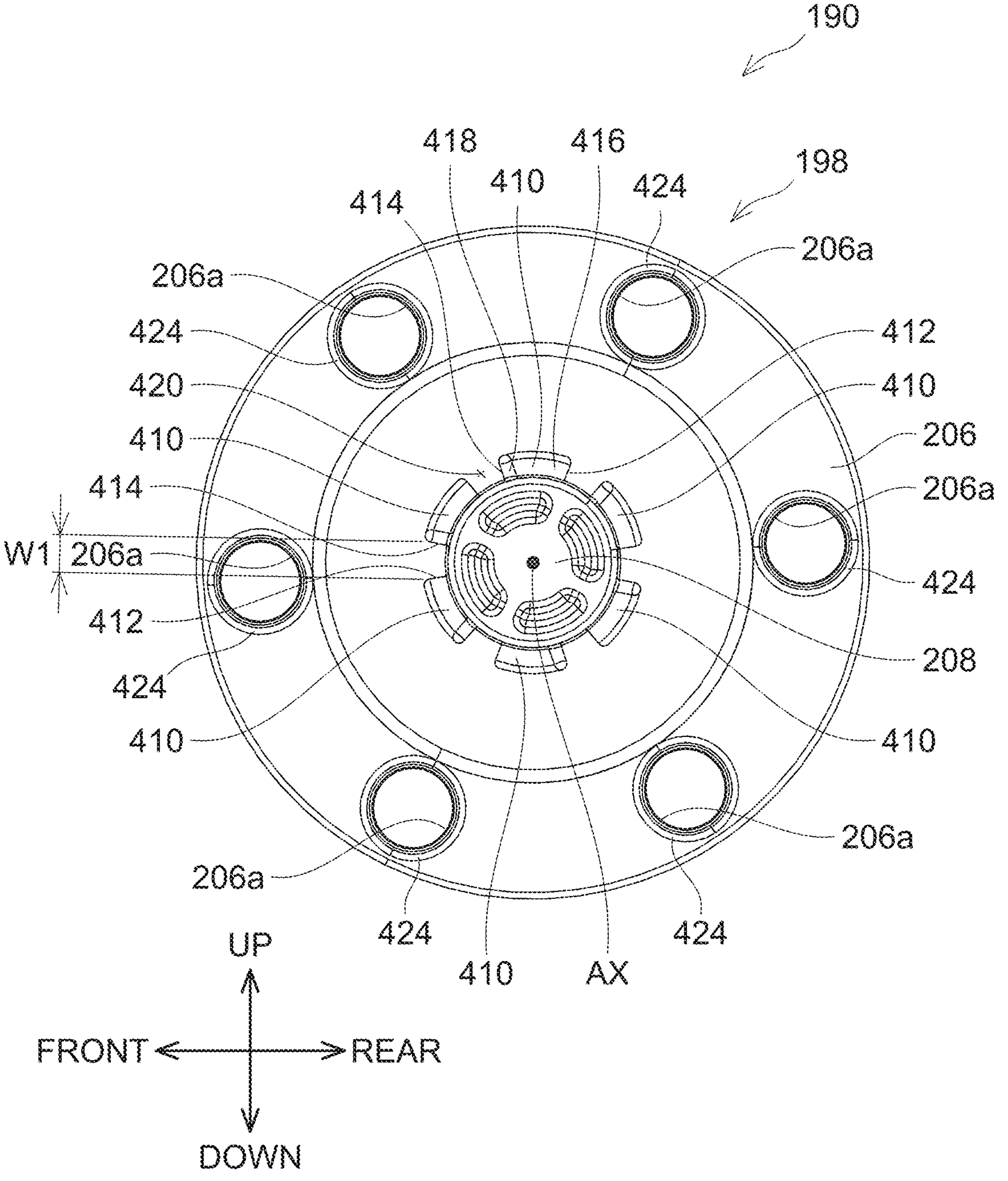
FIG. 43 is a left side view of the turntable 198 according to the fourth embodiment.

As shown in FIG. 42, the turntable 198 further comprises one or more guides 410 (six guides 410 in the present embodiment). The number of one or more guides 410 is equal to or larger than the number of one or more ribs 400. The ribs 400 and the guides 410 correspond to a positioner. The guides 410 are formed on an outer circumferential surface of the engagement member 208. The guides 410 project from the outer circumferential surface of the engagement member 208 in a direction away from the rotation axis AX. Right ends of the guides 410 are connected to a left surface of a turntable body 206 of the turntable 198. As shown in FIG. 43, the guides 410 are disposed closer to the rotation axis AX than the receivers 206*a* of the turntable body 206 are (that is, disposed radially inward of the receivers 206*a*). The six guides 410 are arranged at regular intervals around the rotation axis AX. In the present embodiment, adjacent guides 410 are arranged at intervals corresponding to an angle of 60 degrees around the rotation axis AX.

Figure 44:
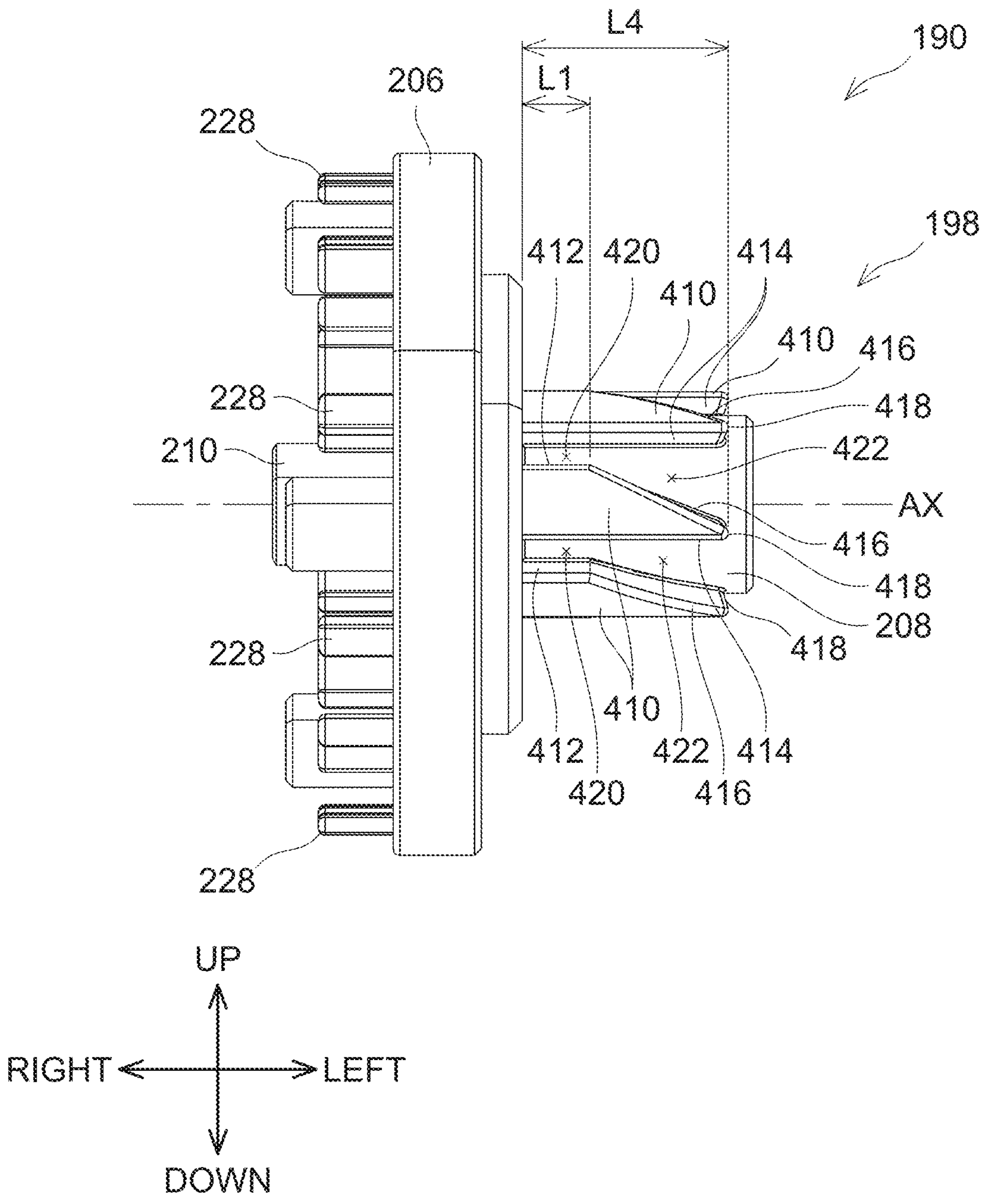
FIG. 44 is a front view of the turntable 198 according to the fourth embodiment.

As shown in FIG. 44, as viewed in a direction perpendicular to the rotation axis AX, the guides 410 have a substantially trapezoidal shape. The guides 410 each comprise a first non-inclined surface 412, a second non-inclined surface 414, and an inclined surface 416. The first non-inclined surfaces 412 extend leftward from a right end of the engagement member 208 along the rotation axis AX. The first non-inclined surfaces 412 are connected to a left surface of the turntable body 206. The first non-inclined surfaces 412 are substantially perpendicular to the left surface of the turntable body 206. A length L1 of the first non-inclined surfaces 412 in the right-left direction is longer than each of a length L2 of short projections 180 of the bobbin 160 in the right-left direction (see FIG. 40) and a length L3 of long projections 182 of the bobbin 160 in the right-left direction (see FIG. 40).

The second non-inclined surfaces 414 extend leftward from the right end of the engagement member 208 along the rotation axis AX. The second non-inclined surfaces 414 are connected to the left surface of the turntable body 206. The second non-inclined surfaces 414 are substantially perpendicular to the left surface of the turntable body 206. A length L4 of the second non-inclined surfaces 414 in the right-left direction is greater than the length L1 of the first non-inclined surfaces 412 in the right-left direction.

The inclined surfaces 416 are disposed around the rotation axis AX. Each inclined surface 416 is connected to a left end of corresponding first non-inclined surface 412 and a left end of corresponding second non-inclined surface 414. The inclined surfaces 416 are inclined to both the first non-inclined surfaces 412 and the second non-inclined surfaces 414. The inclined surfaces 416 are inclined to the first non-inclined surfaces 412 at an obtuse angle, and in the present embodiment, the inclination angle is about 150 degrees. The inclined surfaces 416 are inclined to the second non-inclined surfaces 414 at an acute angle, and in the present embodiment, the inclination angle is about 30 degrees. The inclined surfaces 416 and the second non-inclined surfaces 414 define corners 418 at their connections. The corners 418 are rounded.

For two adjacent guides 410, a first guide space 420 is defined between the second non-inclined surface 414 of one guide 410 of the two and the first non-inclined surface 412 of the other guide 410, and a second guide space 422 is defined between the second non-inclined surface 414 of the one guide 410 and the inclined surface 416 of the other guide 410. As shown in FIG. 43, a width W1 of the first guide spaces 420 (width W1 between the second non-inclined surface 414 of one guide 410 and the first non-inclined surface 412 of adjacent guide 410) is equal to or greater than a width W2 of the ribs 400 around the rotation axis AX (see FIG. 41). The first guide spaces 420 are positioned on lines connecting the rotation axis AX to the centers of the receivers 206*a*, respectively.

As shown in FIG. 42, the receivers 206*a* each comprise a guide surface 424. Each guide surface 424 circumferentially extends at a circumferential edge of corresponding receiver 206*a*. The guide surfaces 424 have a tapered shape inclined to the left surface of the turntable body 206. The receivers 206*a* correspond to a first portion.

Next, a method of attaching the reel 33 to the turntable 198 (i.e., a right reel attaching part 190) will be described.

Positioning Process

Figure 45:
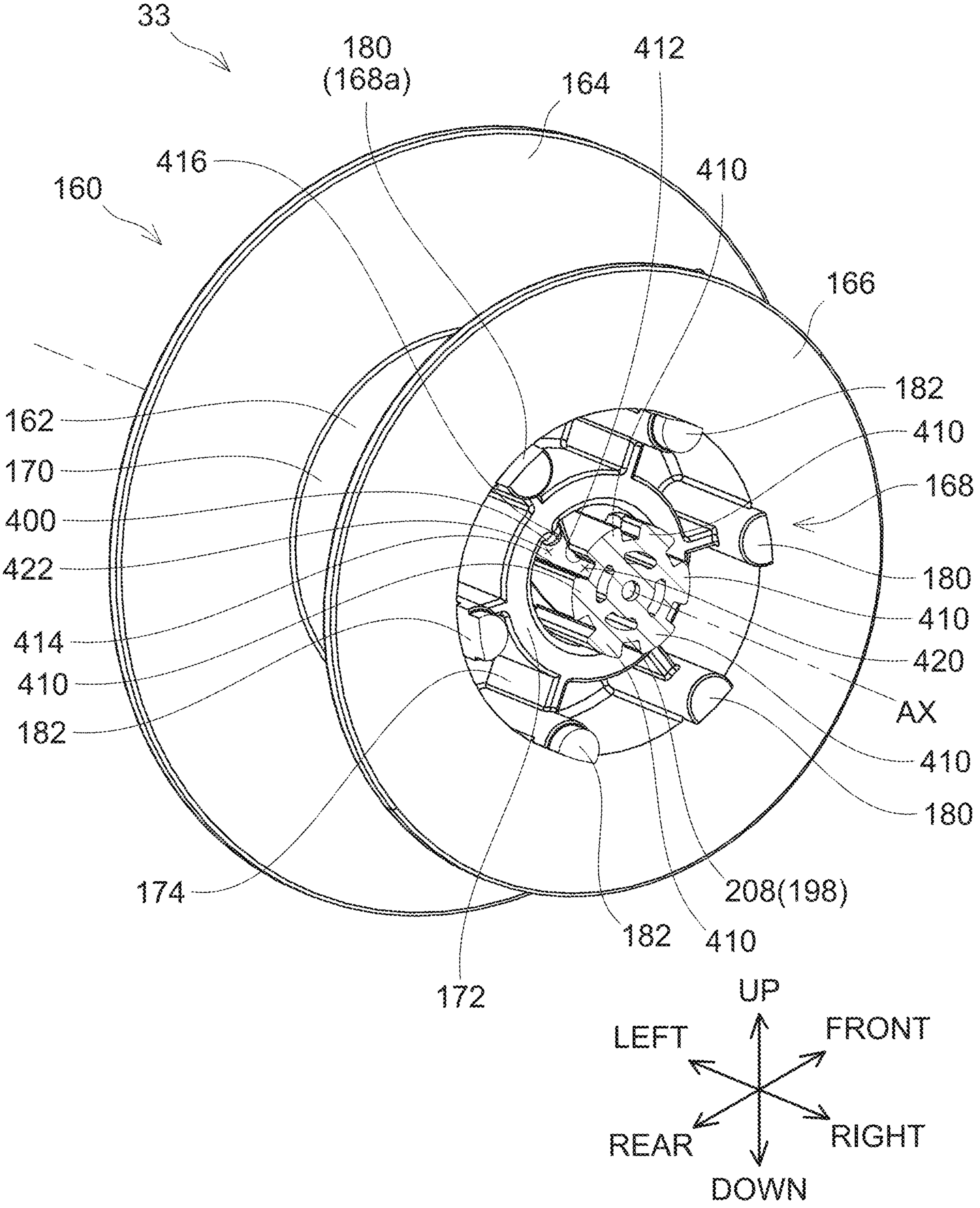
FIG. 45 is a cross-sectional perspective view of the reel 33 and the turntable 198 according to the fourth embodiment, illustrating a state where ribs 400 are positioned on inclined surfaces 416 in attaching the reel 33 to a right reel attaching part 190.

First, a user moves the reel 33 rightward with respect to the engagement member 208 along the rotation axis AX to insert the engagement member 208 into the insert space 402. As shown in FIG. 44, the ribs 400 (see FIG. 39) contact the corners 418 of the guides 410 and then move along the corners 418 into the second guide spaces 422. Then, as shown in FIG. 45, the ribs 400 are guided by the inclined surfaces 416 to move on the inclined surfaces 416 toward the first guide spaces 420 (toward the first non-inclined surfaces 412). Since the inclined surfaces 416 are disposed around the rotation axis AX, as the ribs 400 move closer to the first guide spaces 420 on the inclined surfaces. 416, the reel 33 rotates about the rotation axis AX with respect to the turntable 198. In the present embodiment, the reel 33 is grasped by the user and the turntable 198 is rotatably supported by a support 15 (see FIG. 2), and thus the turntable 198 rotates about the rotation axis AX.

Process of Bringing Reel Close to Turntable Body

Figure 46:
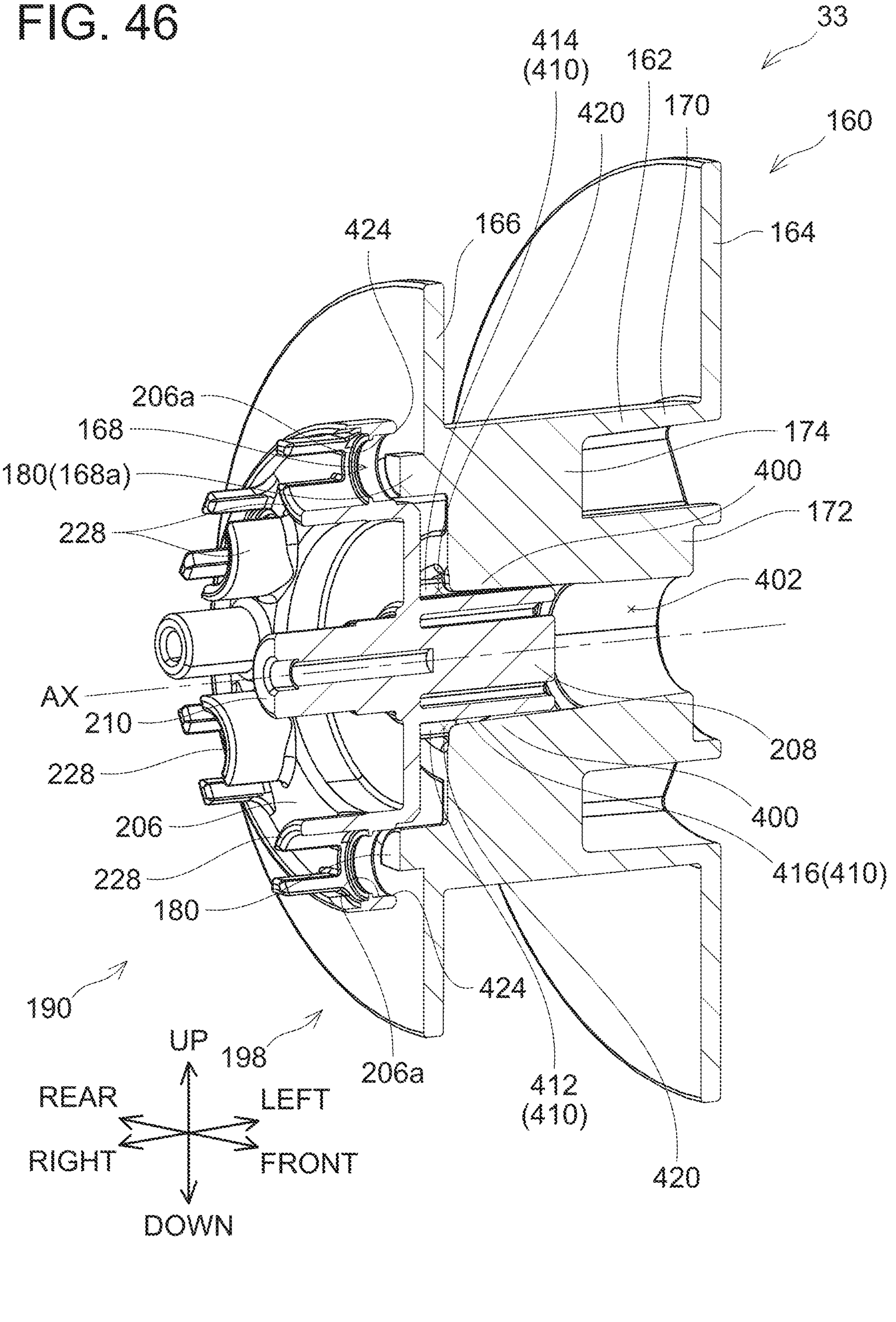
FIG. 46 is a cross-sectional perspective view of the reel 33 and the turntable 198 according to the fourth embodiment, illustrating a state where the ribs 400 are positioned on first non-inclined surfaces 412 in attaching the reel 33 to the right reel attaching part 190.
Figure 47:
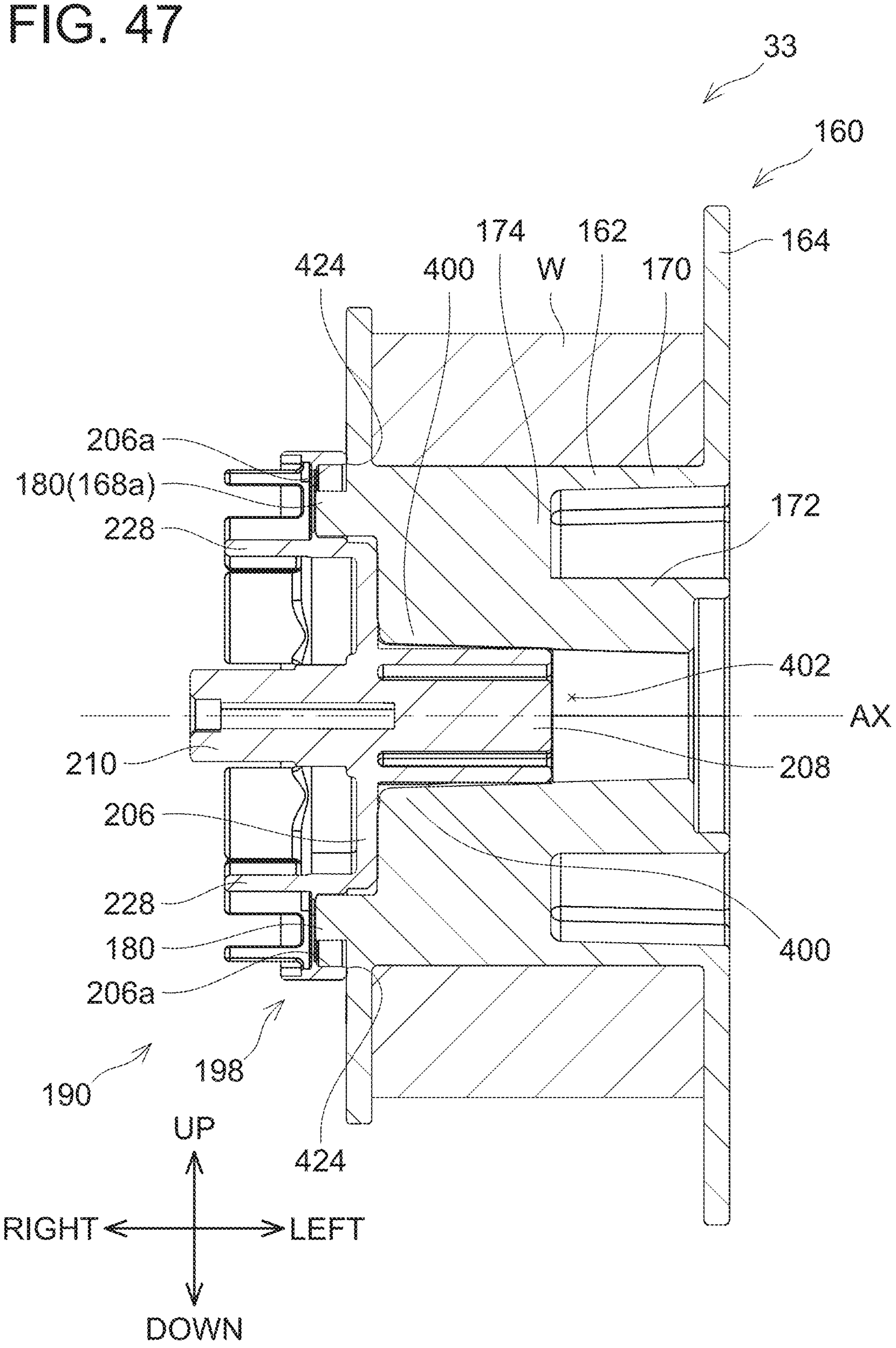
FIG. 47 is a cross-sectional view of the reel 33 and the turntable 198 according to the fourth embodiment, illustrating a state where the reel 33 has been attached to the right reel attaching part 190.

When the user moves the reel 33 further rightward with respect to the engagement member 208 along the rotation axis AX, the ribs 400 are guided by the first non-inclined surfaces 412 to move toward the left surface of the turntable body 206 along the first non-inclined surfaces 412. As shown in FIG. 46, while the ribs 400 are moving along the first non-inclined surfaces 412, the projections 168 are constantly positioned to overlap corresponding receivers 206*a* in the direction along the rotation axis AX. As the ribs 400 are brought closer to the left surface of the turntable body 206, the projections 168 come closer to the receivers 206*a* and contact the guide surfaces 424. As shown in FIG. 47, the projections 168 are guided by the guide surfaces 424 into the receivers 206*a*. Once the projections 168 are inserted in the receivers 206*a*, the reel 33 is attached to the right reel attaching part 190 and positioned at a predetermined rotation position with respect to a type detecting device 220 (see FIG. 26) of the reel 33. The type detecting device 220 corresponds to a reel information detector configured to detect information of the reel 33.

As shown in FIG. 26, in attaching the reel 33 to the right reel attaching part 190, the three long projections 182 push corresponding movable members 230 of the type detecting device 220 to the attaching position from the initial position. Thereafter, a process to detect the type of the reel 33 is executed to specify the type of the reel 33. Since the process to detect the type of the reel 33 has been described in detail in connection with the first embodiment, description for the process is omitted in the present embodiment.

Effects

The rebar tying tool 2 comprises the reel 33 comprising the bobbin 160 and the wire W wound around the bobbin 160; the right reel attaching part 190 (an example of reel attaching part) comprising the receivers 206*a* (an example of first portion), wherein the reel 33 is attached to the right reel attaching part 190; the feeding unit 38 configured to feed the wire W from the bobbin 160 around the rebars R; and the twisting unit 46 configured to twist the wire W around the rebars R. The bobbin 160 comprises the projections 168 (an example of information portion) including information of the reel 33 that is detected by the rebar tying tool 2 when the reel 33 is attached to the right reel attaching part 190, wherein the projections 168 correspond to the receivers 206*a*. The reel 33 is configured to rotate about the rotation axis AX when the reel 33 is attached to the right reel attaching part 190. The reel 33 comprises the ribs 400. The right reel attaching part 190 comprises the guides 410 configured to guide the ribs 400 as the reel 33 is attached to the right reel attaching part 190 along the rotation axis AX of the reel 33 such that the projections 168 overlap the receivers 206*a* in the direction along the rotation axis AX of the reel 33.

According to the configuration above, the guides 410 guide the ribs 400 as the reel 33 is attached to the right reel attaching part 190, so that the projections 168 overlap the receivers 206*a* in the direction along the rotation axis AX of the reel 33. The position adjustment of the reel 33 with respect to the right reel attaching part 190 can be facilitated in attaching the reel 33 to the right reel attaching part 190.

Further, the guides 410 each comprise the first non-inclined surface 412 extending along the rotation axis AX of the reel 33 and the inclined surface 416 inclined to the first non-inclined surface 412. Each first non-inclined surface 412 is connected to one end of corresponding inclined surface 416. The guides 410 are configured to guide the ribs 400 from the inclined surfaces 416 toward the first non-inclined surfaces 412 as the reel 33 is attached to the right reel attaching part 190.

According to the configuration above, position adjustment of the reel 33 with respect to the right reel attaching part 190 can be facilitated in attaching the reel 33 to the right reel attaching part 190 with a simple configuration of guiding the ribs 400 from the inclined surfaces 416 toward the first non-inclined surfaces 412.

Further, while the guides 410 guide the ribs 400 along the first non-inclined surfaces 412, the projections 168 are positioned to overlap the receivers 206*a* in the direction along the rotation axis AX of the reel 33.

According to the configuration above, by bringing the reel 33 closer to the right reel attaching part 190 along the rotation axis AX of the reel 33 after the ribs 400 has reached the first non-inclined surfaces 412, the user can bring the projections 168 closer to the receivers 206*a* while maintaining the projections 168 overlapping the receivers 206*a* in the direction along the rotation axis AX of the reel 33.

Further, the projections 168 project from the bobbin 160. The receivers 206*a* are configured to receive the projections 168 when the reel 33 is attached to the right reel attaching part 190. The right reel attaching part 190 comprises the guides 410. In the direction along the rotation axis AX of the reel 33, the length L1 of the first non-inclined surfaces 412 is equal to or longer than the lengths L2 and L3 of the projections 168.

If the length L1 of the first non-inclined surfaces 412 is shorter than the lengths L2 and L3 of the projections 168, the projections 168 contact the right reel attaching part 190 while the ribs 400 are moving on the inclined surfaces 416 and thus the projections 168 cannot overlap the receivers 206*a* in the direction along the rotation axis AX of the reel 33. According to the configuration above, the projections 168 are suppressed from failing to overlap the receivers 206*a* in the direction along the rotation axis AX of the reel 33.

Further, each guide 410 further comprises the second non-inclined surface 414 connected to the other end of corresponding inclined surface 416, wherein the inclined surface 416 is inclined to the second non-inclined surface 414 at an acute angle. The inclined surfaces 416 and the second non-inclined surfaces 414 define the corners 418 at their connections. The corners 418 are rounded.

For example, if the corners 418 are not rounded, when the ribs 400 contact the corners 418 of the guides 410 in attaching the reel 33 to the right reel attaching part 190, the ribs 400 cannot move to the inclined surfaces 416. According to the configuration above, even though the ribs 400 contact the rounded corners 418 in attaching the reel 33 to the right reel attaching part 190, the ribs 400 can move along the corners 418 to the inclined surfaces 416.

Further, the first non-inclined surfaces 412 extend from corresponding inclined surfaces 416 to an end of the engagement member 208 of the right reel attaching part 190 in the direction along the rotation axis AX of the reel 33.

According to the configuration above, the reel 33 can be attached to the right reel attaching part 190 by moving the ribs 400 along the first non-inclined surfaces 412 all the way to the end of the engagement member 208 of the right reel attaching part 190.

Further, the bobbin 160 comprises the trunk 162, wherein the trunk 162 comprises the outer circumferential surface around which the wire W is wound and the inner circumferential surface opposite to the outer circumferential surface and defining the insert space 402. The right reel attaching part 190 comprises the engagement member 208 (an example of insertion shaft) configured to be inserted into the insert space 402 of the trunk 162. The ribs 400 are formed on the inner circumferential surface of the trunk 162. The guides 410 are formed on the engagement member 208.

According to the configuration above, the reel 33 can be attached to the right reel attaching part 190 while positioned with respect to the right reel attaching part 190, by a simple method of inserting the engagement member 208 into the insert space 402 of the trunk 162.

Further, the rebar tying tool 2 further comprises the support 15 supporting the right reel attaching part 190, the feeding unit 38, and the twisting unit 46. The right reel attaching part 190 further comprises the turntable 198 including the engagement member 208 and rotatably supported by the support 15.

According to the configuration above, the turntable 198 rotates as the ribs 400 are guided by the guides 410 in attaching the reel 33 to the right reel attaching part 190. Thus, position adjustment of the reel 33 with respect to the right reel attaching part 190 can be further facilitated.

Further, the projections 168 project from the bobbin 160. The receivers 206*a* are defined in the turntable 198 and configured to receive the projections 168 when the reel 33 is attached to the right reel attaching part 190.

According to the configuration above, displacement of the projections 168 with respect to the receivers 206*a* can be suppressed when the reel 33 is attached to the right reel attaching part 190.

Further, the ribs 400 are formed on the inner circumferential surface of the trunk 162. The guides 410 are formed on the engagement member 208.

Typically, the ribs 400 have a simpler configuration than the guides 410. According to the configuration above, the configuration of the reel 33 can be simplified.

Further, the ribs 400 extend along the rotation axis AX of the reel 33.

According to the configuration above, the strength of the ribs 400 in the direction along the rotation axis AX of the reel 33 can be increased. Thus, even when the ribs 400 contact the guides 410 in attaching the reel 33 to the right reel attaching part 190, damage to the ribs 400 can be suppressed.

Further, the reel 33 comprises one or more ribs 400. The right reel attaching part 190 comprises one or more guides 410. The number of the ribs 400 is equal to or less than the number of the guides 410.

According to the configuration above, position adjustment of the reel 33 with respect to the right reel attaching part 190 can be facilitated in attaching the reel 33 to the right reel attaching part 190, with a reduced number of ribs 400.

The reel 33 is used by being attached to the right reel attaching part 190 (an example of reel attaching part) of the rebar tying tool 2. The reel 33 comprises the bobbin 160 and the wire W wound around the bobbin 160. The bobbin 160 comprises the projections 168 (an example of information portion) including information of the reel 33 that is detected by the rebar tying tool 2 when the reel 33 is attached to the right reel attaching part 190. The bobbin 160 comprises the ribs 400 configured to position the projections 168 at predetermined positions with respect to the right reel attaching part 190.

The right reel attaching part 190 of the rebar tying tool 2 comprises a corresponding configuration. In a case where the corresponding configuration guides the ribs 400 to position the projections 168 at predetermined positions with respect to the right reel attaching part 190, the projections 168 are positioned at the predetermined positions with respect to the right reel attaching part 190 by the ribs 400 of the reel 33 being guided by the corresponding configuration as the reel 33 is attached to the right reel attaching part 190. Thus, the position adjustment of the reel 33 with respect to the right reel attaching part 190 can be facilitated in attaching the reel 33 to the right reel attaching part 190.

An attaching method is a method of attaching the reel 33 to the right reel attaching part 190 (an example of reel attaching part) of the rebar tying tool 2 configured to tie the rebars R with the wire W. The reel 33 comprises the projections 168 (an example of information portion) including information of the reel 33 and is configured to rotate about the rotation axis AX when the reel 33 is attached to the right reel attaching part 190. The right reel attaching part 190 comprises the receivers 206*a* (an example of first portion) corresponding to the projections 168. The reel 33 comprises the ribs 400. The right reel attaching part 190 comprises the guides 410. The attaching method comprises positioning the projections 168 to overlap the receivers 206*a* in the direction along the rotation axis AX of the reel 33 by causing the reel 33 to rotate about the rotation axis AX of the reel 33 with respect to the right reel attaching part 190 by moving the ribs 400 along the guides 410 as the reel 33 is inserted rightward (an example of first direction) into the right reel attaching part 190; and bringing the projections 168 close to the receivers 206*a* by inserting the reel 33 rightward into the right reel attaching part 190 after the positioning.

According to the configuration above, the ribs 400 move along the guides 410 as the user inserts the reel 33 rightward to the right reel attaching part 190, so that projections 168 overlap the receivers 206*a* in the direction along the rotation axis AX of the reel 33. Thus, the position adjustment of the reel 33 with respect to the right reel attaching part 190 can be facilitated in attaching the reel 33 to the right reel attaching part 190.

The rebar tying tool 2 comprises the reel 33 comprising the bobbin 160 and the wire W wound around the bobbin 160; the right reel attaching part 190 (an example of reel attaching part) to which the reel 33 is attached; the type detecting device 220 (an example of reel information detector) configured to detect information of the reel 33 when the reel 33 is attached to the right reel attaching part 190, the feeding unit 38 configured to feed the wire W from the bobbin 160 around the rebars R; the twisting unit 46 configured to twist the wire W around the rebars R; and the ribs 400 and the guides 410 (an example of positioner) configured to rotate the reel 33 about the rotation axis AX of the reel 33 with respect to the right reel attaching part 190 to position the reel 33 with respect to the type detecting device 220 as the reel 33 is attached to the right reel attaching part 190.

According to the configuration above, as the reel 33 is attached to the right reel attaching part 190, the ribs 400 and the guides 410 rotate the reel 33 about the rotation axis AX of the reel 33 with respect to the right reel attaching part 190, so that the reel 33 is positioned at a predetermined position with respect to the type detecting device 220. Thus, the position adjustment of the reel 33 with respect to the type detecting device 220 can be facilitated in attaching the reel 33 to the right reel attaching part 190.

Variants

In one embodiment, the first embodiment may be combined with the third embodiment. Specifically, the bobbin 160 of the reel 33 comprises the plurality of projections 168 (i.e., the plurality of short projections 180 and the plurality of long projections 182) of the first embodiment and the uniquely shaped portion 302 (i.e., the plurality of ribs 304) of the third embodiment. In this instance, the rotation detecting unit 218 comprises the photointerrupter 322 of the third embodiment. The photointerrupter 322 is fixed to the holder housing 26. In a type detecting process of the present variant, the control circuit board 36 first controls the photointerrupter 322 to cause it to output light from the light emitting surface 324*a* of the light emitter 324. Then, when the control circuit board 36 rotates the feeding motor 50 (see FIG. 4) forward, the reel 33 rotates. The control circuit board 36 detects a signal chart associated with the detection of the ribs 304 (the upper signal chart depicted with a solid line) shown in FIG. 38 as the reel 33 rotates. When the signal strength "1" takes place five times after the signal strength "1" took place for the first time in the signal chart associated with the detection of the ribs 304, the control circuit board 36 determines that the reel 33 has rotated once and stops the feeding motor 50. The control circuit board 36 determines that the feeding motor 50 stops when the number of rotations of the feeding motor 50 is decreased to or less than a predetermined number of rotations (e.g., 0). Then, the control circuit board 36 specifies a shape of the signal chart associated with the detection of the type-detecting magnets 232 (the upper signal chart depicted with a solid line) within the time period T1 in FIG. 27. The control circuit board 36 then specifies a reference signal chart that matches the specified shape of the signal chart. The control circuit board 36 specifies the type of the reel 33 based on the specified reference signal chart. Then, the control circuit board 36 sets conditions for tying the rebars R with the wire W using the rebar tying tool 2 according to the specified type of the reel 33. Finally, the control circuit board 36 rotates the feeding motor 50 in reverse (in the direction D2 in FIG. 4) to pull back the wire W toward the reel 33.

In one embodiment, the control circuit board 36 may specify a shape of the signal chart associated with the detection of the ribs 304 within the time period T3 in FIG. 38 when determining the reel 33 has rotated once. In this instance, the control circuit board 36 specifies a reference signal chart that matches the specified shape of the signal chart. The control circuit board 36 stores a plurality of reference signal charts corresponding to types of reels 33. The control circuit board 36 specifies the type of the reel 33 based on the specified reference signal chart.

In one embodiment, the number of the projections 168 is not limited to six but may be any number. Further, the number of the short projections 180 and the number of the long projections 182 are not limited to three but may be any numbers.

In one embodiment, the projections 168 may not be arranged at regular intervals around the rotation axis AX of the reel 33.

In one embodiment, the ribs 400 may be formed on the outer circumferential surface of the engagement member 208 of the turntable 198. Further, the guides 410 may be formed on the inner circumferential surface of the inner cylinder 172 of the bobbin 160. In this embodiment, the ribs 400 may extend from predetermined positions on the outer circumferential surface of the engagement member 208 to a left end surface of the engagement member 208 along the rotation axis AX. Further, the guides 410 may extend from predetermined positions on the inner circumferential surface of the inner cylinder 172 to the right end surface of the inner cylinder 172 along the rotation axis AX.

In one embodiment, the information portion of the reel 33 may be disposed on the wire W. In this instance, the information portion may be disposed near an end of the wire W. The first portion may detect the information of the reel from the information portion.

In one embodiment, the reel 33 may comprise, as the information portion, an RFID tag that stores information indicating the type of the reel 33. In this instance, the turntable 198 may comprise an obtainer configured to obtain the information indicating the type of the reel 33 from the RFID tag. As the reel 33 is attached to the right reel attaching part 190 by the ribs 400 being guided by the guides 410, the RFID tag may overlap the obtainer in the direction along the rotation axis AX of the reel 33.

In one embodiment, the reel 33 may comprise a particularly shaped portion as the information portion. The particularly shaped portion may have, for example, a three-dimensional shape based on which the manufacturer of the rebar tying tool 2 can be distinguished from others. This three-dimensional shape may be, for example, a three-dimensional shape formed of character information indicating the manufacturer of the rebar tying tool 2. The turntable 198 may comprise a receiver configured to receive the particularly shaped portion.

In one embodiment, the positioner may comprise a first magnet and a second magnet. The first magnet may be disposed at the bobbin 160. The second magnet may be disposed at the engagement member 208. As the reel 33 is attached to the right reel attaching part 190, the projections 168 may overlap the receivers 206*a* in the direction along the rotation axis AX of the reel 33 by a magnetic force (one of attraction and repulsion) acting between the first magnet and the second magnet.

In one embodiment, the ribs 400 may be detachable from the inner cylinder 172.

In one embodiment, the bobbin 160 may comprise pins fixed to the inner circumferential surface of the inner cylinder 172 with an adhesive or the like. In this instance, as the reel 33 is attached to the right reel attaching part 190, the projections 168 may overlap the receivers 206*a* in the direction along the rotation axis AX of the reel 33 by the pins being guided by the guides 410.

In one embodiment, the ribs 400 may be disposed on the left flange 164 or the right flange 166.

What is claimed is:

1. A rebar tying tool comprising:
- a reel attaching part to which a reel is rotatably attached, wherein the reel comprises a bobbin and a wire wound around the bobbin;
- a feeding unit configured to feed the wire from the bobbin around rebars;
- a twisting unit configured to twist the wire around the rebars;
- a type detector configured to detect a type of the reel; and
- a support supporting the reel attaching part, the feeding unit, the twisting unit, and the type detector, wherein the type detector comprises:
- a movable body configured to move with respect to the support in a direction along a rotation axis of the reel and including a contact surface configured to be in contact with the reel;
- a type-detecting magnet configured to move with the movable body in the direction along the rotation axis of the reel, wherein a position of the type-detecting magnet is fixed to the movable body; and
- a type-detecting magnetic sensor, wherein a position of the type-detecting magnet sensor is fixed to the support, the movable body is at an initial position when the reel is not attached to the reel attaching part, the movable body is at an attaching position according to the type of the reel when the reel is attached to the reel attaching part, the type detector is configured to detect the type of the reel by detecting a position of the type-detecting magnet in the direction along the rotation axis of the reel using the type-detecting magnetic sensor, the bobbin comprises:
- a trunk around which the wire is wound;
- a flange disposed at one end of the trunk; and
- a projection that projects along the rotation axis of the reel, wherein the projection is inward of the flange in relation to the rotation axis, the reel attaching part comprises a receiver configured to receive the projection, and the projection pushes the movable body from the initial position toward the attaching position when the projection is received in the receiver.

2. The rebar tying tool according to claim 1, wherein the type detector further comprises a spring configured to bias the movable body toward the initial position.

3. The rebar tying tool according to claim 1, wherein the type detector further comprises a rotation detector configured to detect a rotation angle of the reel.

4. The rebar tying tool according to claim 3, wherein the rotation detector comprises:
- a rotation-detecting magnet, wherein a position of the rotation-detecting magnet is fixed to the movable body; and
- a rotation-detecting magnetic sensor configured to detect the rotation angle of the reel by detecting the rotation-detecting magnet, wherein a position of the rotation-detecting magnetic sensor is fixed to the support.

5. The rebar tying tool according to claim 1, wherein the reel attaching part comprises a turntable rotatably supported by the support, a position of the bobbin is fixed to the turntable when the reel is attached to the reel attaching part, the receiver is configured to receive and engage with the projection, and the turntable comprises the receiver.

6. The rebar tying tool according to claim 5, wherein the movable body is supported by the turntable such that the movable body is movable between the initial position and the attaching position.

7. The rebar tying tool according to claim 1, wherein the type-detecting magnetic sensor is outward of the type-detecting magnet in relation to the rotation axis when the movable body is at the initial position.

8. A rebar tying tool comprising:
- a reel attaching part to which a reel is rotatably attached, wherein the reel comprises a bobbin and a wire wound around the bobbin;
- a feeding unit configured to feed the wire from the bobbin around rebars;
- a twisting unit configured to twist the wire around the rebars;
- a reel detector configured to detect whether the reel is attached to the reel attaching part; and
- a support supporting the reel attaching part, the feeding unit, the twisting unit, and the reel detector, wherein the reel detector comprises:

a movable body configured to move with respect to the support and including a contact surface configured to be in contact with the reel;

a reel-detecting magnet configured to move with the movable body, wherein a position of the reel-detecting magnet is fixed to the movable body; and a reel-detecting magnetic sensor, wherein a position of the reel-detecting magnetic sensor is fixed to the support, the movable body is at an initial position when the reel is not attached to the reel attaching part, the movable body is at an attaching position when the reel is attached to the reel attaching part, the reel detector is configured to detect whether the reel is attached to the reel attaching part by detecting the position of the reel-detecting magnet using the reel-detecting magnetic sensor, the bobbin comprises:

a trunk around which the wire is wound;

a flange disposed at one end of the trunk; and a projection disposed inward of the flange in relation to a rotation axis of the reel, the reel attaching part comprises a receiver configured to receive the projection, and the projection pushes the movable body from the initial position toward the attaching position when the projection is received in the receiver.

9. The rebar tying tool according to claim 8, wherein the reel detector further comprises a spring configured to bias the movable body toward the initial position.

10. The rebar tying tool according to claim 8, wherein the reel detector further comprises a rotation detector configured to detect a rotation angle of the reel.

11. The rebar tying tool according to claim 10, wherein the rotation detector comprises:

a rotation-detecting magnet, wherein a position of the rotation-detecting magnet is fixed to the movable body; and a rotation-detecting magnetic sensor configured to detect the rotation angle of the reel by detecting the rotation-detecting magnet, wherein a position of the rotation-detecting magnetic sensor is fixed to the support.

12. The rebar tying tool according to claim 8, wherein the reel attaching part comprises a turntable rotatably supported by the support, a position of the bobbin is fixed to the turntable when the reel is attached to the reel attaching part, the receiver is configured to receive and engage with the projection, and the turntable comprises the receiver.

13. The rebar tying tool according to claim 12, wherein the movable body is supported by the turntable such that the movable body is movable between the initial position and the attaching position.

14. The rebar tying tool according to claim 8, wherein the reel-detecting magnetic sensor is outward of the reel-detecting magnet in relation to the rotation axis when the movable body is at the initial position.

* * * * *